US012182214B1

(12) United States Patent
Sanchez et al.

(10) Patent No.: US 12,182,214 B1
(45) Date of Patent: Dec. 31, 2024

(54) SYSTEMS AND METHODS FOR HANDLING EMAIL IN A CUSTOMER MANAGEMENT SYSTEM

(71) Applicant: GROWPATH, LLC, Durham, NC (US)

(72) Inventors: Eric Jason Sanchez, Cary, NC (US); Jan Schroeder, Chapel Hill, NC (US); Richard Christopher Low, Durham, NC (US)

(73) Assignee: GrowPath, LLC, Durham, NC (US)

( * ) Notice: Subject to any disclaimer, the term of this patent is extended or adjusted under 35 U.S.C. 154(b) by 0 days.

(21) Appl. No.: 18/204,668

(22) Filed: Jun. 1, 2023

Related U.S. Application Data

(63) Continuation of application No. 18/046,975, filed on Oct. 17, 2022, now Pat. No. 11,709,904, which is a continuation of application No. 17/175,659, filed on Feb. 13, 2021, now Pat. No. 11,520,843, which is a continuation of application No. 16/409,809, filed on May 11, 2019, now Pat. No. 10,956,527, which is a (Continued)

(51) Int. Cl.
| | |
|---|---|
| *G06F 16/9535* | (2019.01) |
| *G06F 16/242* | (2019.01) |
| *G06F 40/169* | (2020.01) |
| *G06Q 10/107* | (2023.01) |
| *G06Q 30/01* | (2023.01) |

(52) U.S. Cl.
CPC ...... *G06F 16/9535* (2019.01); *G06F 16/2428* (2019.01); *G06F 40/169* (2020.01); *G06Q 10/107* (2013.01); *G06Q 30/01* (2013.01)

(58) Field of Classification Search
CPC ............. G06F 16/9535; G06F 16/2428; G06F 40/169; G06Q 10/107; G06Q 30/01
See application file for complete search history.

(56) References Cited

U.S. PATENT DOCUMENTS

| | | |
|---|---|---|
| 5,604,897 A | 2/1997 | Travis |
| 5,666,139 A | 9/1997 | Thielens et al. |
| 6,044,387 A | 3/2000 | Angiulo et al. |

(Continued)

FOREIGN PATENT DOCUMENTS

WO  2012024580 A1  2/2012

OTHER PUBLICATIONS

Needles Case Management Software for Law Firms, web printed Feb. 16, 2017.

(Continued)

*Primary Examiner* — Albert M Phillips, III
(74) *Attorney, Agent, or Firm* — Wells St. John P.S.

(57) ABSTRACT

A method includes providing a server having a system email address for receiving emails and including a processor and a memory coupled to the processor and defining a database organized to store data for a plurality of customer matters, respective matters having matter numbers, and, for each matter, the database including a notes location associated with the matter; providing a graphical user interface using which a user can review information relating to matters, including notes; determining, in response to receiving an email having a subject line and body, if the email contains a matter number matching a database matter number and, if not, rejecting the email; and if the email is not rejected, routing at least a portion of the non-rejected email to the notes location of the matter. Other systems and methods are provided.

20 Claims, 114 Drawing Sheets

Related U.S. Application Data continuation of application No. 15/828,382, filed on Nov. 30, 2017, now Pat. No. 10,339,192.

(56) References Cited

U.S. PATENT DOCUMENTS

| | | | |
|---|---|---|---|
| 6,085,206 | A | 7/2000 | Domini et al. |
| 6,249,805 | B1 | 6/2001 | Fleming, III |
| 7,010,546 | B1 | 3/2006 | Kolawa et al. |
| 7,024,462 | B1 | 4/2006 | McEriean |
| 7,076,731 | B2 | 7/2006 | Brill et al. |
| 7,106,850 | B2 | 9/2006 | Campbell et al. |
| 7,117,432 | B1 | 10/2006 | Shanahan |
| 7,386,477 | B2 | 6/2008 | Fano |
| 7,949,633 | B1 | 5/2011 | Shaver et al. |
| 8,041,344 | B1 | 10/2011 | Coughlan et al. |
| 8,108,763 | B2 | 1/2012 | Gao et al. |
| 8,171,387 | B2 | 5/2012 | Lombardo |
| 8,176,004 | B2 | 5/2012 | Malaney et al. |
| 8,204,949 | B1 | 6/2012 | Krajec |
| 8,548,997 | B1 | 10/2013 | Wu |
| 8,694,904 | B2 | 4/2014 | Verlaan et al. |
| 8,700,653 | B2 | 4/2014 | Hansson et al. |
| 8,706,750 | B2 | 4/2014 | Hansson et al. |
| 8,713,109 | B1 | 4/2014 | Baker et al. |
| 8,996,391 | B2 | 3/2015 | Stibel et al. |
| 9,230,257 | B2 | 1/2016 | Makanawala et al. |
| 9,886,794 | B2 | 2/2018 | van Os et al. |
| 9,953,076 | B2 | 4/2018 | Hansson et al. |
| 10,038,653 | B2 | 7/2018 | Gao et al. |
| 10,069,892 | B2 | 9/2018 | Wu |
| 10,339,192 | B1 | 7/2019 | Sanchez et al. |
| 10,956,527 | B1 | 3/2021 | Sanchez et al. |
| 11,520,843 | B1 | 12/2022 | Sanchez et al. |
| 11,620,318 | B2 | 4/2023 | Hansson et al. |
| 11,709,904 | B1 | 7/2023 | Sanchez et al. |
| 2001/0024497 | A1 | 9/2001 | Campbell et al. |
| 2003/0037077 | A1 | 2/2003 | Brill et al. |
| 2003/0061508 | A1 | 3/2003 | Bhat |
| 2003/0130904 | A1 | 7/2003 | Katz et al. |
| 2005/0047395 | A1 | 3/2005 | Narin et al. |
| 2005/0091118 | A1 | 4/2005 | Fano |
| 2005/0096926 | A1 | 5/2005 | Eaton et al. |
| 2005/0108103 | A1 | 5/2005 | Roberts et al. |
| 2005/0177599 | A1 | 8/2005 | Goodman |
| 2005/0257158 | A1 | 11/2005 | Lombardo |
| 2006/0059031 | A1 | 3/2006 | Hertel-Szabadi et al. |
| 2006/0111943 | A1 | 5/2006 | Wie |
| 2006/0184617 | A1 | 8/2006 | Nicholas et al. |
| 2006/0235745 | A1 | 10/2006 | Yano |
| 2007/0208573 | A1 | 9/2007 | Malden et al. |
| 2007/0244892 | A1 | 10/2007 | Narancic |
| 2008/0147790 | A1 | 6/2008 | Malaney et al. |
| 2008/0178073 | A1 | 7/2008 | Gao et al. |
| 2009/0259949 | A1 | 10/2009 | Vertaan et al. |
| 2009/0299998 | A1 | 12/2009 | Kim et al. |
| 2010/0325539 | A1 | 12/2010 | Nedzlek et al. |
| 2011/0173437 | A1 | 7/2011 | Basir et al. |
| 2012/0047025 | A1 | 2/2012 | Strohman |
| 2012/0047134 | A1 | 2/2012 | Hansson et al. |
| 2012/0047135 | A1 | 2/2012 | Hansson et al. |
| 2012/0323804 | A1 | 12/2012 | Lee et al. |
| 2013/0253910 | A1 | 9/2013 | Turner et al. |
| 2013/0262598 | A1 | 10/2013 | Makanawala et al. |
| 2013/0326407 | A1 | 12/2013 | van Os et al. |
| 2014/0101296 | A1 | 4/2014 | Li et al. |
| 2014/0181135 | A1 | 6/2014 | Hansson et al. |
| 2014/0189532 | A1 | 7/2014 | Sivaraman et al. |
| 2014/0351693 | A1 | 11/2014 | Glassop |
| 2014/0358518 | A1 | 12/2014 | Wu et al. |
| 2015/0026573 | A1 | 1/2015 | Meng et al. |
| 2016/0094681 | A1 | 3/2016 | Wu |
| 2016/0321270 | A1 | 11/2016 | Hansson et al. |
| 2016/0364992 | A1 | 12/2016 | Krishnamurthy et al. |
| 2017/0093768 | A1 | 3/2017 | Gatti et al. |
| 2017/0097968 | A1 | 4/2017 | Colodny et al. |
| 2018/0203863 | A1 | 7/2018 | Hansson et al. |
| 2023/0394072 | A1 | 12/2023 | Hansson et al. |

OTHER PUBLICATIONS

Algoriz lets you build trading algorithms with no coding required, posted Mar. 3, 2017 to Techcrunch.com.

Faivre, 4 CRM Options Built for Lawyers, Oct. 26, pp. 1-6 (Year: 2016).

Practice Technology, Inc., "Learning to Use the Prevail Case Management System", Version 7, 2013, Revised Sep. 23, 2015, United States, 212 pages.

Salesforce.com, Inc., "Using Subject Line & Email Address to Identify Existing Case", Discussion Forums, 2016, 4 pages.

Screening Rules

| Specialty | Description | Screening Conditions | Score | |
|---|---|---|---|---|
| IP Intake for Demonstration -IP | Description = Mouse Trap | How would you best describe it?: in [ Better than the Mouse Trap ] | 1000 | Edit |
| IP Intake for Demonstration -IP | Description = Not Worth Time | How would you best describe it?: in [ Probably not worth anyone's time ] | -1000 | Edit |
| IP Intake for Demonstration -IP | Description = Potential | How would you best describe it?: in [It has real potential] | 25 | Edit |
| IP Intake for Demonstration -IP | Great Idea = Yes | Do you have a great idea: yes | 50 | Edit |
| IP Intake for Demonstration -IP | Idea = No | Do you have a great idea: no | -1000 | Edit |
| IP Intake for Demonstration -IP | Perfect | Do you have a great idea: yes<br>Will it generate a lot of revenue?: yes<br>How would you best describe it?: in [ Better than the Mouse Trap ] | 1000000 | Edit |
| IP Intake for Demonstration -IP | Revenue = No | Will it generate a lot of revenue?: no | -50 | Edit |
| IP Intake for Demonstration -IP | Revenue = Yes | Will it generate a lot of revenue?: yes | 25 | Edit |

[New Screening Rule]    [Download CSV]    [Download Condition Details CSV]

FIG. 17

| FIG. 18A | FIG. 18B |
|---|---|

FIG. 18

🌼 ConverTrack  ✕

⬇ 🔲 https://intake.upcyclelegal.com/caals    ⓒ 🔍 mac print screen whole page  ↑

— 236  — 237  — 238  — 239  — 240

▸Home | ▸Admin | ▸Questionnaires | ▸Calls | ▸Intakes

Calls

Any Client/Line ▾ — 520

| Started | Line Name | Picked Up At | Station | Duration |
|---|---|---|---|---|
| 12/16/15 04:29:24PM | 5016 | | | |
| 12/16/15 04:28:59PM | Main Number (916-688-4991) 🔍→ | 12/16/15 04:29:01PM | 14104 → | 44s |
| 12/16/15 04:27:13PM | Main Number (916-688-4991) 🔍→ | 12/16/15 04:27:16PM | 14102 → | 142s (2 minutes) |
| 12/16/15 04:26:36PM | 1010 | 12/16/15 04:26:36PM | 14152 → | |
| 12/16/15 04:25:39PM | Main Number (916-688-4991) 🔍→ | 12/16/15 04:25:41PM | 18127 → | 42s |
| 12/16/15 04:25:14PM | 1004 | 12/16/15 04:25:24PM | 13402 → | 22s |
| 12/16/15 04:24:25PM | Main Number (916-688-4991) 🔍→ | 12/16/15 04:24:28PM | 17101 → | 46s |
| 12/16/15 04:23:22PM | Main Number (916-688-4991) 🔍→ | 12/16/15 04:23:24PM | 13102 → | 42s |
| 12/16/15 04:22:07PM | 0498 🔍→ | 12/16/15 04:22:17PM | 18150 → | 68s (1 minutes) |
| 12/16/15 04:21:50PM | 1010 🔍→ | 12/16/15 04:21:55PM | 17300 → | 23s |
| 12/16/15 04:21:45PM | Main Number (916-688-4991) 🔍→ | 12/16/15 04:22:03PM | 18111 → | 522s (9 minutes) |
| 12/16/15 04:21:27PM | Main Number (916-688-4991) 🔍→ | 12/16/15 04:22:02PM | 14108 → | 101s (2 minutes) |
| 12/16/15 04:20:14PM | Main Number (916-688-4991) 🔍→ | 12/16/15 04:20:22PM | 13120 → | 41s |
| 12/16/15 04:20:04PM | Main Number (916-688-4991) 🔍→ | 12/16/15 04:20:06PM | 18150 → | 113s (2 minutes) |
| 12/16/15 04:19:41PM | Fax Server 🔍→ | 12/16/15 04:19:51PM | 14119 → | 69s (1 minutes) |
| 12/16/15 04:18:45PM | Main Number (916-688-4991) 🔍→ | 12/16/15 04:18:49PM | 17200 → | 27s |
| 12/16/15 04:17:08PM | Main Number (916-688-4991) 🔍→ | 12/16/15 04:17:11PM | 18150 → | 23s |
| 12/16/15 04:16:33PM | 4676 🔍→ | | 13102 → | |
| 12/16/15 04:15:49PM | Main Number (916-688-4991) 🔍→ | 12/16/15 04:15:55PM | 13130 → | |
| ... | ... | ... | 18150 → | 21s |
| | | | ... | ... |

Total  18,240,529,534min (about 34704 years) — 512

Previous  1 2 3 4 5 6 7 8 9 ... 13656 13657 Next→
— 504  — 506  — 508  — 510

FIG. 18A

| Caller Number | Caller ID | OAI Call ID | Intake |
|---|---|---|---|
| 17045443503 | Insurers | 1XX5301 | Create Intake |
| 19195258233 | DEE MALHOTRA | 1XX5201 | Create Intake |
| 19195911983 | WIRELESS CALLER | 1XX4*01 | Create Intake |
| 19198143222 | KCDS | 1XX4501 | Create Intake |
| 12523436037 | WIRELESS CALLER | 1XX4001 | Create Intake |
| 19197436185 | NDSG MC IND COM | 1XX3F01 | Create Intake |
| 12522887726 | WIRELESS CALLER | 1XX3901 | Create Intake |
| 12522539311 | WIRELESS CALLER | 1XX3201 | Create Intake |
| ... | | 1XX2#01 | Create Intake |
| 19198143222 | KCDS | 1XX2501 | Create Intake |
| 19104018065 | WIRELESS CALLER | 1XX2201 | Create Intake |
| 19192653069 | NADIA YUNIKOV | 1XX2101 | Create Intake |
| 19602377282 | UNKNOWN NAME | 1XX1801 | Create Intake |
| 18004422075 | UNKNOWN NAME | 1XX1701 | Create Intake |
| 16032451054 | CARCO | 1XX1301 | Create Intake |
| 19192693135 | MICHAEL SMITH | 1XX0P01 | Create Intake |
| 19199045134 | WIRELESS CALLER | 1XX0*01 | Create Intake |
| 19199415549 | FAMILY DENTAL | 1XX0501 | Create Intake |
| 19193230722 | WIRELESS CALLER | 1XX0201 | Create Intake |
| ... | | ... | ... |

| Case Admin | 550 ▸ General | ▸ Configure 574 |
|---|---|---|
| Checklists 570 Client | ^ Name 572 | Checklistable Type |
| ▸James Scott Farrin 552 | ED - Appraiser | Involvement |
| ▸James Scott Farrin 553 | ED - Condemnation | Case |
| ▸James Scott Farrin 554 | ED - Demand | Case |
| ▸James Scott Farrin 555 | ED - Discovery (fr Nor) | Case |
| ▸James Scott Farrin 556 | ED - Discovery (to Nor) | Case |
| ▸James Scott Farrin 557 | ED - Initial | Case |
| ▸James Scott Farrin 558 | ED - Mediation | Case |
| ▸James Scott Farrin 559 | ED - NEG | Case |
| ▸James Scott Farrin 560 | ED - Pre-DMD-Review | Case |
| ▸James Scott Farrin 561 | ED - PRR | Case |
| ▸James Scott Farrin 562 | ED - Rec'd Complaint | Case |
| ▸James Scott Farrin 563 | ED - Trial | Case |
| ▸James Scott Farrin 564 | ED - WOC | Case |
| ▸James Scott Farrin 565 | PI - ALL-Defendant DWI | Case |
| ▸James Scott Farrin 566 | PI - ALL-Property Damage | Case |

▸ Operations  🏠  ▦  👤  🔍  👥  📄  ☺  ▸EJS        HELP

Filter condition                                           582         -Select Checklistable ▲
                                                                            Type-
- Case Practice Area:ED
- Involvement Type:["Appraiser-Condemnors", "Appraiser-PO"]
                                                                       Case
- Case Practice Area:ED                                                Record Request
- Case DOI during:["after"=>"01/01/0001","before"=>" "]                Insurance Policy
                                                                       Involvement
- Case Practice Area:ED                                                Note

- Case Practice Area:ED                                            2              Edit
- Case DOI during:["after"=>" ","before=>"01/01/0001"]

- Case Practice Area:ED                                            4              Edit
- Case DOI during:["after"=>" ","before"=>"01/01/0001"]
                                                                                   ↗
- Case Practice Area:ED                                            3              Edit
                                                                        580

- Case Practice Area:ED                                            5              Edit
- Case Question ID answered: 109
- Case DOI during:["after"=>" ","before"=>01/01/0001"]

- Case Practice Area:ED                                            1              Edit
- Case Status:["Neg"]

- Case Practice Area:ED                                            2              Edit
- Case Status:["HDP"]

- Case Practice Area:ED                                            5              Edit

- Case Practice Area:ED                                            5              Edit
- Case DOI during:["after"=>" ","before"=>01/01/0001"]

- Case Practice Area:ED                                            9              Edit
- Case Question ID answered: 152
- Case DOI during:["after"=>" ","before"=>01/01/0001"]

- Case Practice Area:ED                                            2              Edit
- Case Status:["WOC"]

- Case Question ID answered: 428                                   1              Edit
- Case Practice Area:PI

- Case Practice Area:PI                                            1              Edit
- Case Question ID answered: 419

FIG. 19B

| Checklists 570 Client | 572 ∧ Name | Checklistable Type |
|---|---|---|
| James Scott Farrin | ED - Condemnation | Case |
| James Scott Farrin | ED - Demand | Case |
| James Scott Farrin | ED - Discovery (fr Nor) | Case |
| James Scott Farrin | ED - Discovery (to Nor) | Case |
| James Scott Farrin | ED - Initial | Case |
| James Scott Farrin | ED - Mediation | Case |
| James Scott Farrin | ED - NEG | Case |
| James Scott Farrin | ED - Pre-DMD-Review | Case |
| James Scott Farrin | ED - PRR | Case |
| James Scott Farrin | ED - Rec'd Complaint | Case |
| James Scott Farrin | ED - Trial | Case |
| James Scott Farrin | ED - WOC | Case |
| James Scott Farrin | PI - ALL-Defendant DWI | Case |
| James Scott Farrin | PI - ALL-Property Damage | Case |
| James Scott Farrin | PI - ALL-WOM | Case |

| | | | | | 632 |
|---|---|---|---|---|---|
| Case Admin | | ▸ General | | ▸ Configure | |

Checklist Items      Checklist  `ED Condemnation ✕ ▾`

| Id (600) | Checklist template^ (602) | Position^ (604) | Name (606) | Filter condition (608) | Trigger method (610) |
|---|---|---|---|---|---|
| 373 / 584 | ED-Condemnation | 0 | Appraiser | | |
| 375 / 585 | ED-Condemnation | 0 | Discovery (from Nor) | | |
| 472 / 586 | ED-Condemnation | 0 | Discovery Served on Condemnor | | |
| 474 / 587 | ED-Condemnation | 0 | Discovery to Client for review | • Question ID date answer during: Answer for Question 114 is after "14 days ago" | |
| 374 / 588 | ED-Condemnation | 0 | Discovery (to Nor) | | |
| 471 / 589 | ED-Condemnation | 0 | Draft Discovery | | |
| 475 / 590 | ED-Condemnation | 0 | Draft Extension of Time for Discovery | • Case Question ID answered:114 | |
| 376 / 591 | ED-Condemnation | 0 | Mediation | | |
| 473 / 592 | ED-Condemnation | 0 | Nor Discovery to Atty for Review | • Case Question ID answered:114 | |
| 372 / 593 | ED-Condemnation | 0 | Received Complaint | | |
| 476 / 594 | ED-Condemnation | 0 | Send Extension of Time for Discovery | | |
| 377 / 595 | ED-Condemnation | 0 | Trial | | |

[New Checklist Item]   583

FIG. 21A

| | | | | | | | | Eric | – | □ | ✕ | filter%5Bchecklis_template_id%5D=42

| Operations | 🏠 | ⊞ | 👤 | 🔍 | 👥 | 📄 | ⊙ | ▶EJS | | HELP |

| Name | Child Item Of | Select Parent Checklist Item ▼ | ☐ Roots only Only |

| Days due | Repeating | Limitations | Keep once triggered | Assignee/ Assgn. Inv. Type | Mail merge template | Parent | Children | Comment |
|---|---|---|---|---|---|---|---|---|
| 0 | No | No | No | Primary Paralegal | | | 0 | Edit |
| 0 | No | No | No | Primary Paralegal | | | 0 | Edit |
| 7 | No | No | No | Primary Paralegal | | Draft Discovery | 0 | Edit |
| 0 | No | No | No | Primary Paralegal | | | 0 | Edit |
| 0 | No | No | No | Primary Paralegal | | | 0 | Edit |
| 30 | No | No | No | Primary Paralegal | | Received Complaint | 1 | Edit |
| 0 | No | No | No | Primary Paralegal | | | 1 | Edit |
| 0 | No | No | No | Primary Paralegal | | | 0 | Edit |
| 0 | No | No | No | Primary Paralegal | | | 0 | Edit |
| 0 | No | No | No | Primary Paralegal | | | 1 | Edit |
| 7 | No | No | No | Primary Paralegal | | Draft Extension of Time for Discovery | 0 | Edit |
| 0 | No | No | No | Primary Paralegal | | | 0 | Edit |

Displaying all 12 Checklist Items

FIG. 21B

☒ Casee   ×   ☐

← → C ⇧   🔒 Secure | https://farrin.caseesoftware.com/checklist_template_items?filter%5Bchecklist_template_id%5D=42

■ ☐ Bookmarks   ☐ConverTrack   🌸ConverTrack   🌸Casee   🌸STAGING   🌸Audit Logs

643

Checklist Items for Checklist "ED-Condemnation"
for Checklist Type Case

Position   Name    644    Comment ⟵ 640

| 0 | Draft Discovery | |

Additional Conditions for Qualifying Cases
Note: This Checklist Item is only applicable if all Filter condition are fulfilled in addition to Checklist's Filter condition (   -Case Practice
Add Rule — 646    If you pick a Parent, this Checklist Item will be applicable
Parent Checklist Item — 648    completed. The default Trigger Method (when left blank
Received Complaint   × ▽ — 652   of the Parent Checklist Item.

Who will be assigned to the Task — 650

| Primary Paralegal   × ▽ | OR | Staff Person   ▽ |

When is the Task due?
Days due   Trigger method         Repeating
| 30 | days after |   ▽ | of the Case. | ☐ — 657
654        656

When Task completed, trigger Mail Merge
Mail merge template    ▽
660

[Update Checklist Item] — 662

FIG. 22A

| FIG. 22A | FIG. 22B | FIG. 22 |

Limitation        Keep once triggered
☐                 ☐

Aria:ED     - Case DOI during: ["after"=>"01/01/0001","before"=>""] ).

only when the parent task is
will be the completion date

If the Trigger Method is provided, the Due Date will be Days Due after the date returned by sending that trigger method to the Case. If no date is returned, the calculation is based on the date that this task becomes applicable.

If no Trigger Method is provided, and this Checklist Item has a Parent Checklist Item, the Due Date calculation is based on the Completion Date of the parent.

Otherwise the Due Date is will be Days Due after the day that the task is being created (the day the checklist template item first becomes applicable).

Leave blank if no Mail Merge should be triggered.
Only Mail Merges applicable to Cases are available.
Mail Merges might trigger a Record Request, but this is up to the Mail Merge Template itself!

[Cancel] [Delete]

Created by EJS on 12/01/2016 at 08:46am
Updated by EJS on 12/01/2016 at 08:59am

FIG. 23B

Checklist Items for Checklist "ED-Condemnation"
for Checklist Type Case

Position    Name
0           Draft Discovery — 644

Additional Conditions for Qualifying Cases — 640
Note: This Checklist Item is only applicable if all Filter condition are fulfilled in addition to Checklist's Filter condition ( - Case Practice Add Rule — 648
Parent Checklist Item    If you pick a Parent, this Checklist Item will be applicable
Received Complaint       completed. The default Trigger Method (when left blank
                         of the Parent Checklist Item.

Received Complaint
Appraiser
Discovery (to NOR)
Discovery (from NOR)                          of the Case.         Repeating
Mediation                                                          ☐ — 657
Trial
Nor Discovery to Atty for Review
Discovery to Client for review When Task completed, trigger Mail Merge
Mail merge template Update Checklist Item

FIG. 24A

| FIG. 24A | FIG. 24B | FIG. 24

Casee

← → C ⇧ | 🔒 Secure | https://farrin.caseesoftware.com/checklist_template_items?filter%5Bchecklist_template_id%5D=42
☐ Bookmarks ☐ ConverTrack 🐾 ConverTrack 🐾 Casee 🐾 STAGING 🐾 Audit Logs Checklist Items for Checklist "ED-Condemnation" — 640
for Checklist Type Case
Position  Name — 644
[ 0 ]    [ Draft Discovery ]

── Additional Conditions for Qualifying Cases ──────────────────────────────
Note: This Checklist Item is only applicable if all Filter condition are fulfilled in addition to Checklist's Filter condition ( - Case Practice
Add Rule                     — 648                 — 652     If you pick a Parent, this Checklist Item will be applicable
Parent Checklist Item                 — 450                   completed. The default Trigger Method (when left blank
[ Received Complaint ]           [ ✗ ▽ ]                       of the Parent Checklist Item.

Who will be assigned to the Task
[ Primary Paralegal ]  [ ✗ ▽ ]   OR  [ Staff Person ▽ ]

When is the Task due?
Days due    Trigger method                    of the Case.     Repeating
[ 30 ]  days after  [                    ▽ ]                    ☐ — 657
         — 654              ┌──────────────────────┐  — 656
                            │ ░░░░░░░░░░░░░░░░░░░▲ │
                            │ case_close_date     ░ │
                            │ case_date_of_incident ░│
                            │ case_date_of_incident_change ░│
                            │ case_open_date      ░ │
                            │ closed_on           ░ │
                            │ created_at          ░ │
                            │ explicit_statute_of_limitations_on │
                            │ status_change_date  ▼ │
                            └──────────────────────┘
When Task completed
Mail merge template [                                    ]

[ Update Checklist Item ]

Limitation    Keep once triggered
☐

Aria:ED    - Case DOI during: ["after"=>"01/01/0001","before"=>" "] ).
only when the parent task is
will be the completion date If the Trigger Method is provided, the Due Date will be Days Due after the date returned by sending that trigger method to the Case. If no date is returned, the calculation is based on the date that this task becomes applicable.

If no Trigger Method is provided, and this Checklist Item has a Parent Checklist Item, the Due Date calculation is based on the Completion Date of the parent.

Otherwise the Due Date is will be Days Due after the day that the task is being created (the day the checklist template item first becomes applicable).

Leave blank if no Mail Merge should be triggered.
Only Mail Merges applicable to Cases are available.
Mail Merges might trigger a Record Request, but this is up to the Mail Merge Template itself!

[Cancel] [Delete]    Created by EJS on 12/01/2016 at 08:46am
                     Updated by EJS on 12/01/2016 at 08:59am

Casee ✕

← → C ⇧ | 🔒 Secure | https://farrin.caseesoftware.com/checklist_template_items?filter%5Bchecklist_template_id%5D=42

☐ Bookmarks ☐ ConverTrack ❀ ConverTrack ❀ Casee ❀ STAGING ❀ Audit Logs

Checklist Items for Checklist "ED-Condemnation"
for Checklist Type Case

Position  Name
[0]       [Draft Discovery                    ]

─ Additional Conditions for Qualifying Cases ──────────────────
Note: This Checklist Item is only applicable if all Filter condition are fulfilled in addition to Checklist's Filter condition (  - Case Practice
Add Rule — 643
Parent Checklist Item                    If you pick a Parent, this Checklist Item will be applicable
[Received Complaint            ×▾]       completed. The default Trigger Method (when left blank
                                         of the Parent Checklist Item.

─ Who will be assigned to the Task ──────────────────
[Primary Paralegal          ×▾]  OR  [Staff Person          ▾]

─ When is the Task due? ──────────────────
Days due   Trigger method
[ 30 ] days after [                ] of the Case.    Repeating ☐ — 657

─ When Task completed, trigger Mail Merge ──────────────────   ▸
Mail merge template                    658
┌──────────────────────────────────────────────┐▴
│ ▓▓▓▓▓▓▓▓▓▓▓▓▓▓▓▓▓▓▓▓▓▓▓▓▓▓▓▓▓▓▓▓▓▓▓▓▓▓▓▓▓▓▓▓ │
│ 000 CLIENT SATISFACTION SURVEY 000           │
│ 902 WC NCIC FORM 18M 902                     │
│ 1007 WC Mot to Strike Reduce WC Lien 1007    │
│ 862 ED-BANK LTR RE SEND BORROWER AUTH 862    │
│ 856 ED-Fax Cover Sheet 856                   │
│ 205 LIT MOET 205                             │
│ 869 ED-PLEADING AND DISCOVERY INDEX 869      │
│ 000P CLIENT SATISFACTION SURVEY 000SP        │▾
└──────────────────────────────────────────────┘

[ Update Checklist Item ]

FIG. 26A

Limitation ☐ Keep once triggered ☐

Aria:ED ☐ Case DOI during: ["after"=>"01/01/0001","before"=>" " ] ).

only when the parent task is
will be the completion date

If the Trigger Method is provided, the Due Date will be Days Due after the date returned by sending that trigger method to the Case. If no date is returned, the calculation is based on the date that this task becomes applicable.

If no Trigger Method is provided, and this Checklist Item has a Parent Checklist Item, the
Due Date calculation is based on the Completion Date of the parent.

Otherwise the Due Date is will be Days Due after the day that the task is being created (the day the checklist template item first becomes applicable).

Leave blank if no Mail Merge should be triggered.
Only Mail Merges applicable to Cases are available.
Mail Merges might trigger a Record Request, but this is up to the Mail Merge Template itself!

Cancel ☐ Delete

Created by EJS on 12/01/2016 at 08:46am
Updated by EJS on 12/01/2016 at 08:59am

| | FIG. 27A | FIG. 27B |
|---|---|---|
| | FIG. 27C | FIG. 27D |

| | | | |
|---|---|---|---|
| 1165411 | DMD | L1 | 10/19/2016 | CDJ
| 1165335 | WOO | L2 | 10/19/2016 | FOG
| 1165356 | WOO | L2C | 10/19/2016 | EPH
| 1165379 | PDI | L1 | 10/20/2016 | AFR
| 1165390 | TRE | L1 | 10/20/2016 | FOG
| 1165378 | CHK | L1 | 10/20/2016 | AFR
| 1165400 | WOM | L2 | 10/20/2016 | MLS
| 1165387 | WOO | L1 | 10/24/2016 | AFR
| 1165406 | TRE | L1 | 10/24/2016 | MLS
| 1165454 | TRE | L2 | 10/25/2016 | MLS

↳ 704

| | | | |
|---|---|---|---|
| 1163904 | CHK | L2 | 06/01/2016 | AFR
| 1164557 | SA | L2 | 08/02/2016 | AFR
| 1164598 | CHK | L2C | 08/04/2016 | EPH
| 1164693 | CLR | L2 | 08/12/2016 | AFR
| 1164695 | WOO | L2 | 08/13/2016 | AFR
| 1165012 | SET | L2 | 09/14/2016 | AFR
| 1165093 | WOO | L2 | 09/21/2016 | AFR
| 1165191 | SA | L2 | 09/30/2016 | AFR
| 1165792 | WOO | L2 | 11/22/2016 | AFR
| 1165793 | WOO | L2 | 11/22/2016 | AFR

Example - Dashboard List 4   Example
765
- Marketing Source: ["172"]
- Language: ["Spanish"]
- Case Type: ["L2","L2C"]

Title
Internal name
[ Example - Dashboard ]   [ Example ]

Columns
[ ✗ case_status ] [ ✗ case_type ] [ ✗ case_open_date ] [ ✗ attorney ]

Filter condition   ⓘ

Add Rule

902
Sort By
[ case_open_date          ✗ ▽ ]
[                              ]
closed_on
case_age
case_date_of_incident
case_open_date
case_status
case_type
claimant
imported_case_key

[ New Case List for Dashboard ]

FIG. 31C

Example - Dashboard List 4   Example
765
- Marketing Source: ["172"]
- Language: ["Spanish"]
- Case Type:["L2","L2C"]

Title
Internal name
Example - Dashboard    Example

Columns
[✕ case_status] [✕ case_type] [✕ case_open_date] [✕ attorney]

Sort By
case_open_date

Filter condition
908
906
- Case Type    ✕

LS
WCN
WDN
L1
L2C
L3C
WP3
SS

Add Rule

New Case List for Dashboard

FIG. 33C

Example - Dashboard List 4   Example
765

- Marketing Source: ["172"]
- Language: ["Spanish"]
- Case Type: ["L2","L2C"]

Title
Example - Dashboard

Internal name
Example

Columns
[× case_status] [× case_type] [× case_open_date] [× attorney]

Filter condition    908                906
- Case Type    [× ▽]    [× L1]    ?
- Case Status  [× ▽]    [×]
        912              CLO
                         INV
                         WOM
                         ADR
                         LIT
                         BHD
                         FDC
                         DHG
                                    910

Add Rule

Sort By
case_open_date  [× ▽]

New Case List for Dashboard

FIG. 34C

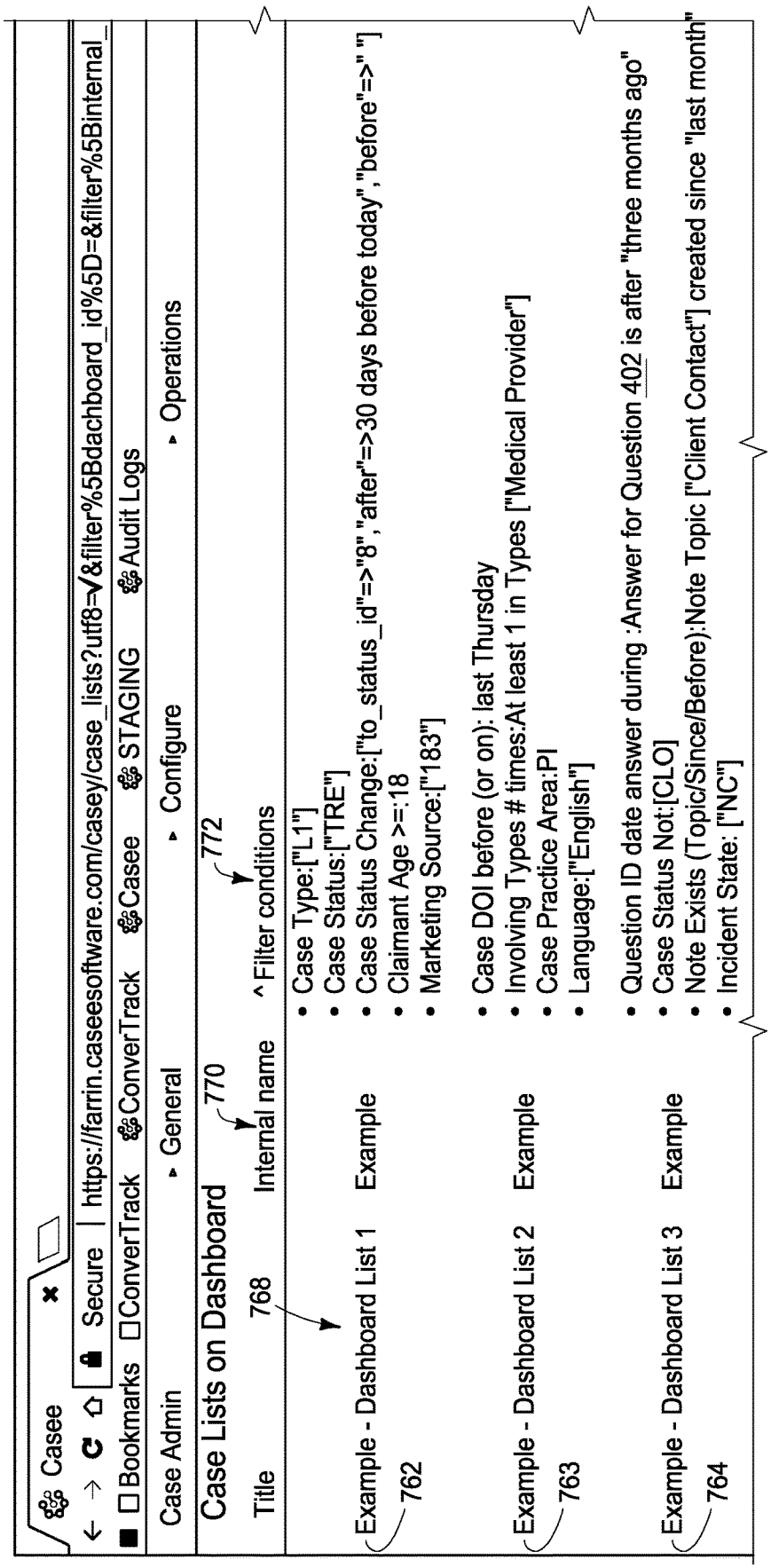
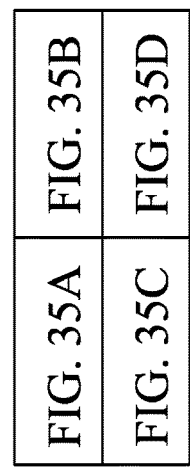
FIG. 35A
FIG. 35

Example - Dashboard List 4   Example
765
- Marketing Source: ["172"]
- Language: ["Spanish"]
- Case Type:["L2","L2C"]

Title
| Example - Dashboard |

Internal name
| Example |

Columns
| ×case_status | ×case_type | ×case_open_date | ×attorney |

Sort By
| case_open_date | × ▽ |

Filter condition 908
- Case Type    [× ▽]  [×L1]  906
- Case Status  [× ▽]  [×TRE]
- Case Status Change 916   TRE
                 912
                 914

? Enter a relative date or an absolute date.
View Examples
This would currently resolve to
12/31/2016 08:00:00PM

910

| 30 days before today | ? | Before (leave blank for "Unlimited") | ? |

Add Rule

New Case List for Dashboard

FIG. 35C

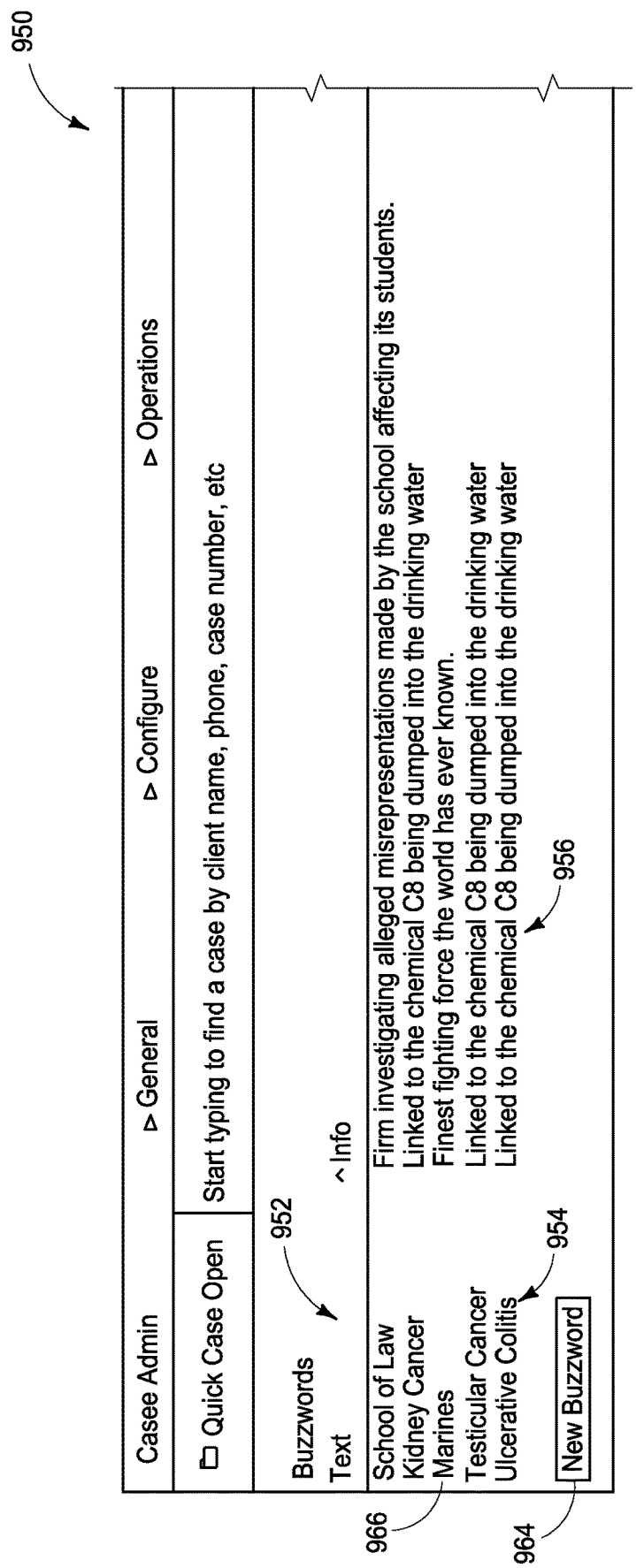
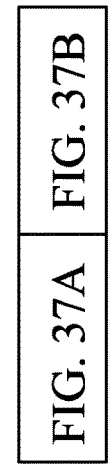
FIG. 37A
FIG. 37

| FIG. 39A | FIG. 39B |
| FIG. 39C | FIG. 39D |

```
                                                             HELP
 ⌂  ▣  ♀  ♀/⌂  ⌕  ⊙  ⊞  ▸ DWB
                                                        ▦
                                                        Watch
                                     1028
                          1026     Case Age
              1024      SOL State    9.6 mo            ⚙ Tools
   1018   1022        Incident State  NC              ⚲ Share
1016    Source        NC           Case Value
Case Status  Department  Referred By  SOL Date
ADR     Pre-Lit   Closed   Incident Date  12/10/2019
Health Insurance  Opened   12/10/2016              1030
Health  12/10/2016                        ADR       1082
CHK|WOC|PL1|COJ |REJ|INV ADR INV|              1091  Add Note
1042         1040     1038    1036    1034   1032
1065 1061
  1067
   1063
    ⊤
    ∨
    ∧
    ⊤
 ⊤
1074  1084  Note 6218862 for Case #1000000
         1088  Topic: Email
            1089
         From Eric J Sanchez  To: Deepak Malhotra, Farrin Case   Subject: Test send from Casee [1000000]
         Sent: Tue, 09/12/17 14:01  Cc: Tara J. Williams          Created By: EJS at 09/12/17 02:00pm
         PM                                                        Updated By: EJS at 09/12/17 02:00pm
                         1086                          1092
                                                      1090
```

FIG. 39B

| | | | | | |
|---|---|---|---|---|---|
| 6105528 | SMS | ✓EJS | 07/23/17 11:44am - Sun | call me - From Farrin at 900-688-4991 | Open |
| 6105491 | Email | EJS | 07/23/17 11:34am - Sun | https://farrin.caseesoftware.com/casey/case... | Open |
| 6089329 | Other | PLM | 07/14/17 11:35am - Fri | Rec'd file scanned file and saved file to RRG | Open |
| 6087138 | Email | PLM | 07/13/17 02:10pm - Thu | Potential New Case from Existing Client: 100000... | Open |
| 6028008 | Email | DWB | 06/14/17 09:25pm - Wed | Sent from my Phone... | Open |
| 6027007 | Email | DWB | 06/14/17 09:23pm - Wed | Sent from my Phone... | Open |
| 6020890 | File Review✓ | MEL | 06/13/17 08:18am - Tue | yep On Jun 9 2017, at 9:50AM, Tara J. Will... | Open |

FIG. 39C

Cases

☐ Quick Case Open | Start typing to find a case by client name, phone, case number, etc

| Case Number | | | 1004 | | 1006 | 1008 | 1010 | 1012 |
|---|---|---|---|---|---|---|---|---|
| 1000000 | | Client | Mr Eric J.Sanchez (44) | DOB 01/02/1982 | Role Former Involvee | Language English | Case Type ⊙ L1 | Damage Category Subjective |
| Alt # 1002 | | Last Note 09/12/2017 | | Paralegal RRG | Primary Attorney TJW | Physical File RRG | Negotiator | Primary Recovery Nation (Liability) |

| INV | TST | | | INV | | 1050 | PL1 | INV | PRR | DMD | NER | SER |

Synopsis:
Damages: 1055 1054 1052

📧 NOTES (65/65)

| All things ▽ | All Topics | | | Search Note Bodies |
|---|---|---|---|---|
| ID | | Author | Created At | |
| 6218862 | Email | EJS | 09/12/17 02:00pm - Tue | |
| 6218844 | Email | EJS | 09/12/17 01:56pm - Tue | |
| 6212120 | Email | SYS | 09/12/17 11:56pm - Fri | |
| 6212093 | Email | EJS | 09/08/17 11:51pm - Fri | |
| 6212090 | Email | EJS | 09/08/17 11:51pm - Fri | |
| 6150000 | Email | EJS | 08/10/17 05:58pm - Thu | |
| 6149992 | Email | EJS | 08/10/17 05:58pm - Thu | |

Note for Case #1000000

Topic 1095

1097 — 1099

B  *I*  U  S  ☰ ☰ ☰ ☰

This is an example of a rich text note.

We can do a number of things like:

FIG. 40A

| FIG. 40A | FIG. 40B |
|---|---|
| FIG. 40C | FIG. 40D |

| | | | |
|---|---|---|---|
| 6105528 | SMS | ✓ EJS | 07/23/17 11:44am - Sun |
| 6105491 | Email | EJS | 07/23/17 11:34am - Sun |
| 6089329 | Other | PLM | 07/14/17 11:35am - Fri |
| 6087138 | Email | PLM | 07/13/17 02:10pm - Thu |
| 6028008 | Email | DWB | 06/14/17 09:25pm - Wed |
| 6027007 | Email | DWB | 06/14/17 09:23pm - Wed |
| 6020890 | File Review | ✓ MEL | 06/13/17 08:18am - Tue |

1. bold
2. <u>underline</u>
3. *strike* through - and it has spell check.

Add Reviewer [Add Reviewers from Distribu...▽]

[Create Note]

FIG. 40C

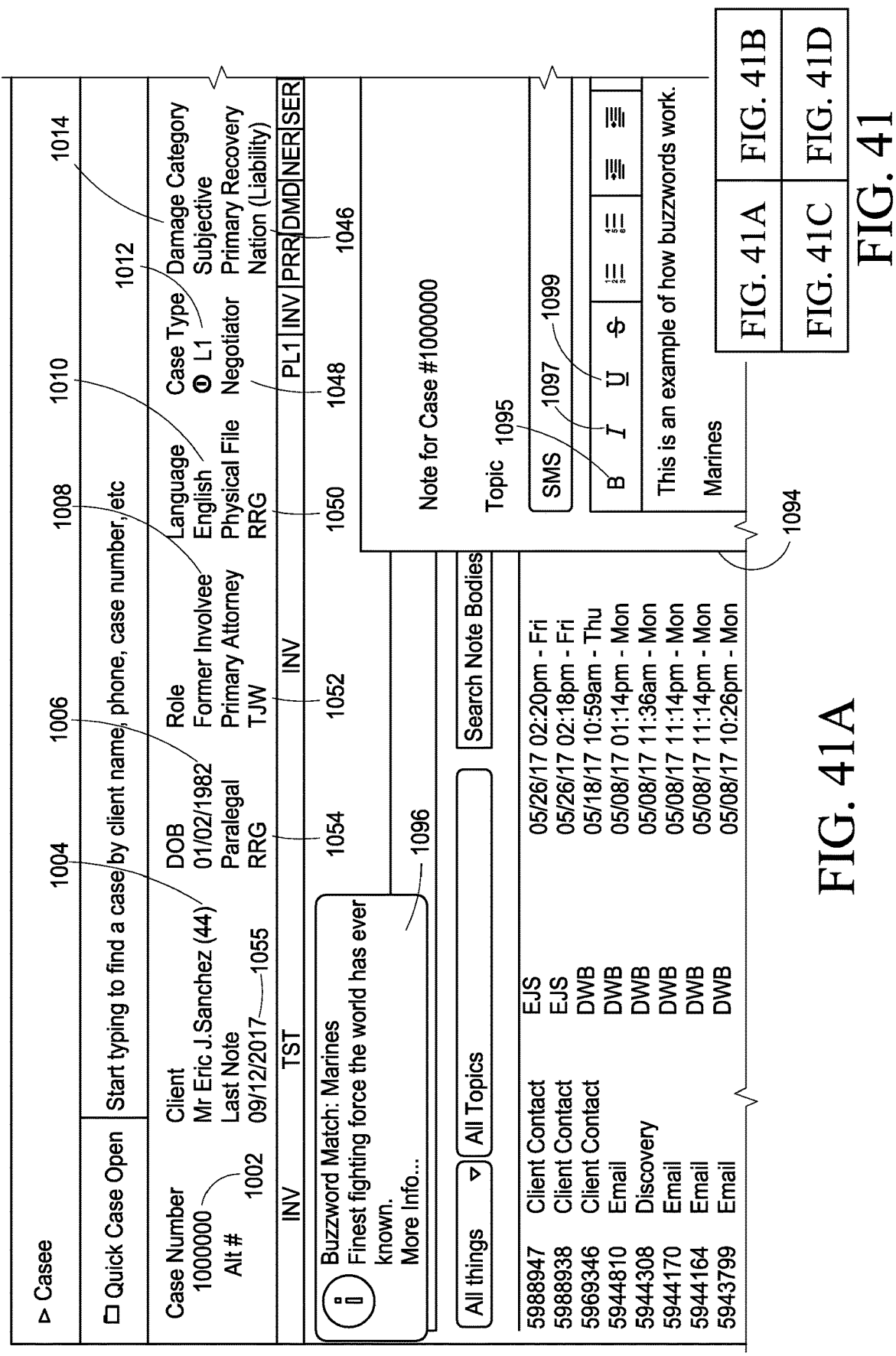

FIG. 41B

| 5861659 | Client Contact | EJS | 03/27/17 11:45am - Mon |
| 5821970 | SMS | ⊘ SYS | 03/05/17 11:19am - Sun |
| 5821969 | Value Memo | ⊘ SYS | 03/05/17 11:17am - Sun |
| 5821968 | SMS | TOPSAILTECH | 03/05/17 11:17am - Sun |
| 5818827 | Workers' Comp | ✓ SYS | 03/02/17 04:24am - Thu |
| 5818827 | SMS | ✓ SYS | 03/02/17 04:01am - Thu |
| 5818823 | SMS | TOPSAILTECH | 03/02/17 04:01am - Thu |

Add Reviewer [Add Reviewers from Distribu...▽]

[Update Note]

| ▷ Casee | | | | | | |
|---|---|---|---|---|---|---|
| ☐ Quick Case Open | Start typing to find a case by client name, phone, case number, etc | | | | | |
| Case Number 1000000 Alt # | Client Mr Eric J.Sanchez (44) Last Note 09/12/2017 | DOB 01/02/1982 Paralegal RRG | Role Former Involvee Primary Attorney TJW | Language English Physical File RRG | Case Type ⓘ L1 ✎ Negotiator | Damage Category Subjective ✎ Primary Recovery Nation (Liability) |
| INV | TST | | INV | | PL1 | INV | PRR | DMD | NER | SER |

Synopsis: ✎
Damages: ✎

NOTES (65/65)

| All things ▽ | All Topics | | | Search Note Bodies | | |
|---|---|---|---|---|---|---|
| ID | Topic | Author | Created At | Body | | |
| 6259341 | Email | EJS | 10/01/17 02:21pm - Sun | This is an example of an email ... | | Open |
| 6218862 | Email | EJS | 09/12/17 02:00pm - Tue | See the attached images as well... | | Open |
| 6218844 | Email | EJS | 09/12/17 01:56pm - Tue | I did review the linked patent... | | Open |
| 6212120 | Email | SYS | 09/08/17 11:56pm - Fri | This is an example of Buzzwords in use...Mari... | | Open |
| 6212093 | Email | EJS | 09/08/17 11:51pm - Fri | Test | | Open |
| 6112090 | Email | EJS | 09/08/17 11:51pm - Fri | From Micro... | | Open |
| 6150000 | Email | EJS | 08/10/17 05:58pm - Thu | Capture From: | | Open |

FIG. 45A

| FIG. 45A | FIG. 45B |
|---|---|
| FIG. 45C | FIG. 45D |

| | | | | |
|---|---|---|---|---|
| 6149992 | Email | | EJS | 01/1017 05:55pm - Thu | What's up? | Open |
| 6105528 | SMS | ✓ | EJS | 07/23/17 11:44am - Sun | call me - From Farrin at 900-688-4991 | Open |
| 6105491 | Email | | EJS | 07/23/17 11:34am - Sun | https://farrin.caseesoftware.com/casey/case... | Open |
| 6089329 | Other | | PLM | 07/14/17 11:35am - Fri | Rec'd file scanned file and saved file to RRG | Open |
| 6087138 | Email | | PLM | 07/13/17 02:10pm - Thu | Potential New Case from Existing Client: 100000... | Open |
| 6027007 | Email | | DWB | 06/14/17 09:25pm - Wed | Sent from my Phone | Open |
| 6027007 | Email | | DWB | 06/14/17 09:23pm - Wed | Sent from my Phone | Open |
| 6020890 | File Review | ✓ | MEL | 06/13/17 08:18am - Tue | yep On Jun 9 2017, at 9:50AM, Tara J. Will... | Open |

FIG. 45C

○ Primary - Citrix XenApp Plugins for Hosted Apps
1000000 -Sanchez, Eric ×
← → C | 🔒 Secure | https://farrin.caseesoftware.com/casey/cases/1000000
Apps Casee - Staging ConverTrack ▷ Casee

| Case Number | Client | | DOB | Role | Language | Case Type | Damage Category |
|---|---|---|---|---|---|---|---|
| 1000000 | Mr Eric J.Sanchez (44) | | 01/02/1982 | Former Involvee | English | ⊙ L1 | Subjective |
| Alt # | Last Note | | Paralegal | Primary Attorney | Physical File | Negotiator | Primary Recovery |
| | 10/01/2017 | | RRG | TJW | RRG | | Nation (Liability) |
| 6089329 | Other | PLM | 07/14/17 11:35am - Fri | Rec'd file scanned file and saved file to RRG | | | Open |
| 6087138 | Email | PLM | 07/13/17 02:10pm - Thu | Potential New Case from Existing Client: 1000000... | | | Open |
| 6027008 | Email | DWB | 06/14/17 09:25pm - Wed | Sent from my Phone | | | Open |
| 6027007 | Email | DWB | 06/14/17 09:23pm - Wed | Sent from my Phone | | | Open |
| 6020890 | File Review | ✓MEL | 06/13/17 08:18am - Tue | yep On Jun 9 2017, at 9:50AM, Tara J. Will... | | | Open |

FIG. 47A

| FIG. 47A | FIG. 47B |
|---|---|
| FIG. 47C | FIG. 47D |

FIG. 47

| Past Due(6) | Due Today(0) | Due later(1) | Done(58) | | | Recalculate | Add Reminder |
|---|---|---|---|---|---|---|---|
| | | | N/A(0) | | | | |
| Due | ^N/A | Staff ^ | ▸Task Name clear filters | ^Task | ^Involvement | | |
| 12/10/2016 | | EJS | 12/20/2016 by TOPS... | Schedule 21-Day Call w Attorney | Manual Task | | Edit |
| 12/10/2016 | | EJS | 06/15/2017 by EJS | This is an example | | | Edit |

Show: Scroll All 2

FIG. 47C

| ∨ Record Requests (4/4) | | | | | | |
|---|---|---|---|---|---|---|
| (Document (3)) (Medical Record (1))   Only Not Rec'd (0)   clear filters | | | | | | Add |
| | | | | | | Record Request |
| Type | With | | Sent | Rec'd | Due On | |
| > Document | Eric J. Sanchez (Plaintiff) | | 7/21/17 | 7/31/17 | | Edit\|Note |
| > Document | Malhotra (Defendant) | | 7/21/17 | 7/31/17 | | Edit\|Note |
| > Document | Malhotra (Defendant) | | 7/21/17 | 7/31/17 | | Edit\|Note |
| > Medical Records | Wellness Center (Chiropractor) | | 8/29/17 | 8/30/17 | | Redo Mail Merge\|Edit\|Note |

Show: Scroll All 4
> Files (13/23)

(Email Attachments (12)) Merge Documents (2) Other URL (1) Photos & Video (1) Social Media URL (1)

Uncategorized (5)  clear filters

| Name | ∧ Category | ∧ Created By | Created On ∨ |
|---|---|---|---|
| > [20170912124848.pdf] | Email Attachments | EJS | 10/1/17 |
| > image008.jpg | Email Attachments | EJS | 9/12/17 |
| > Emailer_Example 1.JPG | | EJS | 9/12/17 |
| > Emailer_Example 2.JPG | | EJS | 9/12/17 |
| > image003.jpg | Email Attachments | EJS | 9/12/17 |
| > image001.jpg | Email Attachments | EJS | 8/10/17 |

Refresh   Add File

FIG. 47D

| FIG. 48A | FIG. 48B |
|---|---|

FIG. 48

○ Primary - Citrix XenApp Plugins for Hosted Apps
❀ #1000000 -Sanchez, Eric  ×

← → ⟳ | ⓘ Secure | https://farrin.caseesoftware.com/casey/cases/1000000

▦ Apps ❀Casee ❀Casee - Staging ❀ConverTrack

▽ Casee

☐ Quick Case Open | Start typing to find a case by client name, phone, case number, etc

| Case Number 1000000 Alt # | Client Mr Eric J.Sanchez (44) Last Note 10/01/2017 | DOB 01/02/1982 Paralegal RRG | Role Former Involve Primary Attorney TJW | Language English Physical File RRG | Case Type ⊙ L1 Negotiator | Damage Category Subjective Primary Recovery Nation (Liability) |
|---|---|---|---|---|---|---|
| INV | TST | | | INV | PL1\|INV\|PRR\|DMD\|NER\|SER | |

Synopsis:  ✎
Damages:  ✎

| 🗎 NOTES (66/66) | | | | | ⚙ |
| ☑ REMINDERS (2 / 65) | | | | | ⚙ |
| $ LEDGER ENTRIES | | | | | ⚙ |
| 🗎 LITIGATION | | | | | ⚙ |
| 🗎 LITIGATION (SECONDARY) | | | | | ⚙ |
| 🗎 SETTLEMENT ADMINISTRATION | | | | | |
| 🗎 INCIDENT | | | | | ⚙ |
| 🗎 COVERAGE | | | | | |

[Screenshot of application interface]

Primary - Citrix XenApp Plugins for Hosted Apps
❀ #1000000 -Sanchez, Eric ×
← → C | 🔒 Secure | https://farrin.caseesoftware.com/casey/case/1000000 — 1420
▦ Apps ❀ Casee ❀ Casee - Staging ❀ ConverTrack ▽ Casee ☐ Quick Case Open | Start typing to find a ca Case Number    Client
1000000        Mr Eric J.Sanchez (44)
Alt #          Last Note
               10/01/2017

INV    TST

Synopsis:
Damages:

Casee Mail originating from case #1000000 — 1422
From
Eric Sanchez <esanchez@farrin.com — 1426
To
Cc — 1428
esanchez@farrin.com — 1430
Bcc — 1432
Subject — 1434
[1000000]
Body — 1436
https://farrin.caseesoftware.com/casey/cases/1000000

Select attachments to include in the email
☐ 1000000_1500_PI_CLT_Attorney_Departure_
☑ 20170912124848.pdf
☐ 468 SS FOLLOW UP MER LETTER.docx
☐ casee_schema.pdf
☐ Emailer_Example 1.JPG — 1440
1446 — Send Email    Cancel 📝 NOTES (66/66)
☑ REMINDERS (2 / 65)
$ LEDGER ENTRIES — 1438
📄 LITIGATION
📄 LITIGATION (SECONDARY) — 1442
📄 SETTLEMENT ADMINISTRATION
📄 INCIDENT
📄 COVERAGE

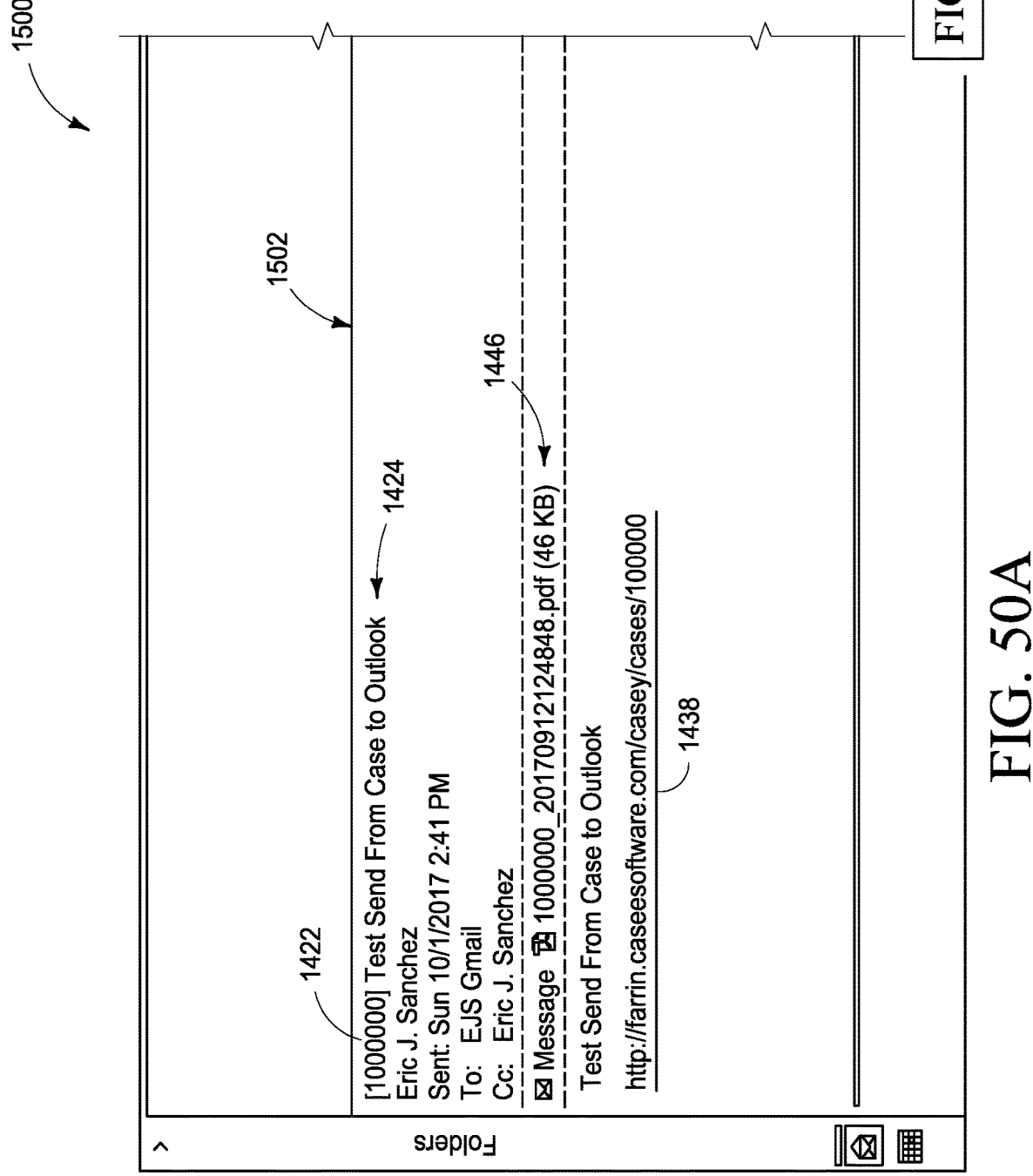

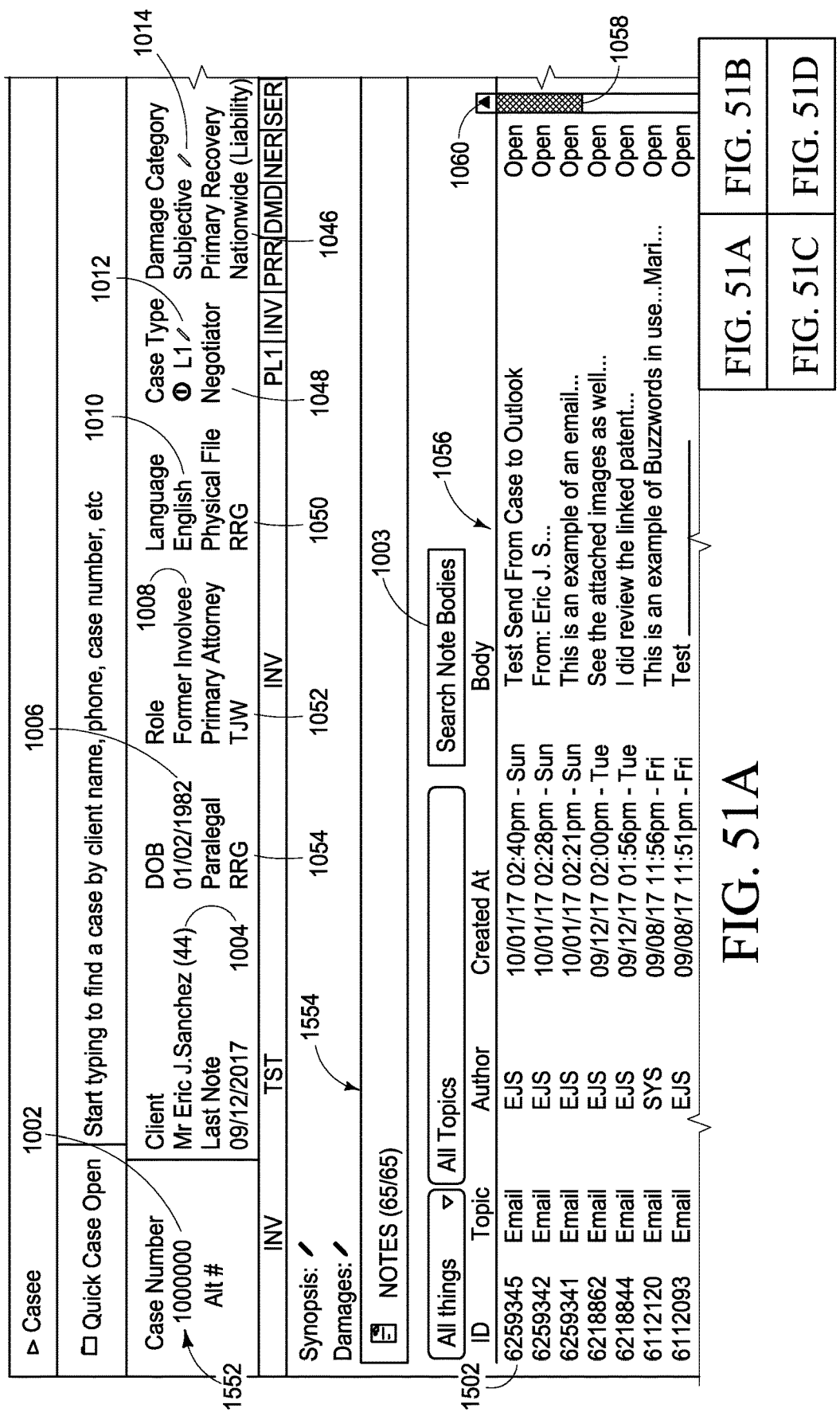

```
                                                                    ╱ 1550
┌─────────────────────────────────────────────────────────────────────────────┐
│ [🏠] [▦] [⚙] [🔍] [⚙🏛] [⏱] ▲ DWB                                     HELP │
├─────────────────────────────────────────────────────────────────────────────┤
│  │1016       │1018        │1020    │1022         │1024           │1026     │1028       ▦     │
│  │           │            │        │             │               │         │           Watch │
│  Case Status  Department   Source   Referred By   Incident State  SOL State Case Age   [⚙]   │
│  ADR╱        Pre-Lit                              NC╱             NC╱      9.6 mo      Tools │
│  Health       Opened        Closed   Incident Date SOL Date       Tolling   Case Value Share │
│  Insurance    12/10/2016╱          ╱ 12/10/2016╱  12/10/2019╱     Date    ╱       ╲         │
│  Health                                                                  ╲       1030  [⚙]   │
│  CHK│WOC│PL1│COJ╲│REJ│INV│ADR│INV│                                     ADR                    │
│  │          ╲1040 Quick information                                   ╱1032                   │
│  1042            ╲ 1038                                                                        │
├─────────────────────────────────────────────────────────────────────────────┤
│  1065 1061                                                  ╱1556                    ┌──┐     │
│    │ 1063                                                                            1082    │
│    ▼ ∧∨                                                                           Add Note   │
│    ━ ↑                                                                                        │
│     ╲ ╲1067                                                                                   │
│      1084 1086                                                                                │
│  Note 6259345 for Case #1000000                                                               │
│  Topic: Email ╲1088                                                                           │
│                                                                                               │
│  From Eric J Sanchez<esanchez@farrin.com     Cc: esanchez@farrin.com   Created By: EJS at 10/01/17 02:40pm │
│  Sent: Sunday, October 1 2017 14:40 PM       Subject: [1000000] Test Send From Case to Outlook  │
│  To: ejsjsf@gmail.com                                                  Updated By: EJS at 10/01/17 02:40pm │
│                                                         ╲              ╲                       │
│                                                         1091           1092                    │
└─────────────────────────────────────────────────────────────────────────────┘
```

FIG. 51B

| | | | | |
|---|---|---|---|---|
| 6212090 | Email | EJS | 09/08/17 11:51am - Fri | From Micro... | Open |
| 6150000 | Email | EJS | 08/10/17 05:58pm - Thu | Capture From: ... | Open |
| 6149992 | Email | EJS | 08/10/17 05:55pm - Thu | What's up? | Open |
| 6105528 | SMS | ✓EJS | 07/23/17 11:44am - Sun | Call me - From Farrin at 900-688-4991 | Open |
| 6105491 | Email | EJS | 07/23/17 11:34am - Sun | htpps://farrin.casseesoftware.com/casey/case... | Open |
| 6089329 | Other | PLM | 07/14/17 11:35am - Fri | Rec'd file scanned file and saved file to RRG | Open |
| 6087138 | Email | PLM | 07/13/17 02:10pm - Thu | Potential New Case from Existing Client: 100000... | Open |
| 6027008 | Email | DWB | 06/14/17 09:25pm - Wed | Sent from my Phone | Open |

☑ REMINDERS (2 / 65)

Past Due(6)  Due Today(0)  Due later(1)  Done(58)  
N/A(0)

[◇] [Task Name] clear filters    EJS    ⟳ Recalculate    ⊕ Add Reminder    ⚙

FIG. 51C

SYSTEMS AND METHODS FOR HANDLING EMAIL IN A CUSTOMER MANAGEMENT SYSTEM

CROSS REFERENCE TO RELATED APPLICATION

This is a continuation of U.S. patent application Ser. No. 18/046,975 to Sanchez et al., filed Oct. 17, 2022, which is a continuation of U.S. patent application Ser. No. 17/175,659 to Sanchez et al., filed Feb. 13, 2021, which is in turn a continuation of U.S. patent application Ser. No. 16/409,809 to Sanchez et al., filed May 11, 2019 (now U.S. Pat. No. 10,956,527), which in turn is a continuation of U.S. patent application Ser. No. 15/828,382 to Sanchez et al., filed Nov. 30, 2017 (now U.S. Pat. No. 10,339,192), all of which are incorporated herein by reference.

TECHNICAL FIELD

The technical field also comprises database and file management. The technical field also comprises operator interface processing.

BACKGROUND

Various types of businesses use and maintain data related to the company's business, such as information about customers, existing projects, business opportunities, and completed projects. The data is stored in a database that is accessible to company employees.

To facilitate effective use of data, many business organizations have a system to help manage the company's interactions with customers, clients and sales prospects, commonly known as a customer relationship management (CRM) system or client management system (CMS).

SUMMARY

Various embodiments provide a system including a server having a system email address for receiving emails for multiple users, the server including: a processor; and a memory coupled to the processor and defining a database organized to store data for respective matters having matter numbers, the database including a notes location associated with each matter, and the database further includes a files location associated with respective matters for storing files other than notes; the system being configured to provide a graphical user interface to a workstation using which a user can review information relating to matters, including notes, the system being further configured, in response to receiving an email, to determine whether the email is from a whitelisted domain and, if not, reject the email, and if the email is not rejected, the system being configured to route at least a portion of the non-rejected email to the notes location of one of the matters, wherein a user can access the non-rejected email pertaining to a matter from a screen showing notes for the matter; and a workstation including a display screen configured to show the graphical user interface.

Some embodiments provide a system including an email server; a case management server in communication with the email server, the case management server having a system email address for receiving emails and including: a processor; and a memory coupled to the processor and defining a database organized to store data for respective matters having matter numbers, and the database including a notes location associated with each matter; the system being configured to provide a graphical user interface to a workstation using which a user can review information relating to matters, including notes, the system being further configured, in response to receiving an email having a subject line and body, to determine whether the email is addressed to a system email address for the case management server and, if not, reject the email, and to determine if the email subject line contains a matter number matching a database matter number and, if not, reject the email, and if the email is not rejected, the system being configured to route at least a portion of the non-rejected email to the notes location of the matter having the matter number that matches the number contained in the email subject line, wherein a user can access the non-rejected email pertaining to a matter directly from a screen showing notes for the matter; and a workstation including a display screen configured to show the graphical user interface.

Other embodiments provide a method including providing a server having a system email address for receiving emails and including a processor and a memory coupled to the processor and defining a database organized to store data for a plurality of customer matters, respective matters having matter numbers, and, for each matter, the database including a notes location associated with the matter; providing a graphical user interface using which a user can review information relating to matters, including notes; determining, in response to receiving an email having a subject line and body, if the email subject line contains a matter number matching a database matter number and, if not, rejecting the email; and if the email is not rejected, routing at least a portion of the non-rejected email to the notes location of the matter having the matter number that corresponds to the number contained in the email subject line.

Other embodiments provide a system including an email server; a case management server in communication with the email server, the case management server having a system email address for receiving emails and including: a processor; and a memory coupled to the processor and defining a database organized to store data for respective matters having case numbers, and the database including a notes location associated with respective matters, and the database including a plurality of notes including text, in the notes locations for respective matters, and the database including a plurality of buzzwords and hyperlinks pointing to descriptive pages that describe the buzzwords; the system being configured to provide a graphical user interface to a workstation using which a user can review information relating to matters, including notes, the system being further configured, in response to receiving an email having a subject line and body, to determine whether the email is addressed to a system email address for the case management server and, if not, reject the email, to determine whether the email originated from a preapproved domain and, if not, reject the email, and to determine if the email subject line contains a case number matching a database matter case number and, if not, reject the email, and if the email is not rejected, the system being configured to route at least a portion of the non-rejected email to the notes location of the matter having the matter number that matches the number contained in the email subject line wherein a user can access the non-rejected email pertaining to a matter directly from a screen showing notes for the matter; the case management server being configured to: associate respective buzzwords with descriptive pages; generate a user interface including a text editing screen area in which a user can type or edit text for a note, the text including a plurality of terms;

and display the descriptive page associated with the typed buzzword in response to the user interacting with the buzzword area of the user interface; and a workstation including a display screen configured to show the graphical user interfaces.

Still other embodiments provide a method for displaying notes associated with a matter in a client management system on a graphical user interface, the method comprising storing a list of buzzwords in a memory; displaying a list in a note list display region, the list including a plurality of rows, each row being associated with a note including text, respective rows including a note ID number, a note type, a note author name, a creation date, and a part of the body of the note, the list being navigable; displaying a preview of a note corresponding to a row selected in response to a row being selected by a user; causing a text editor screen area to appear in response to a user opening the previewed note; in response to a user typing a term in the text editor screen matching a buzzword, displaying an indication that the term is a buzzword.

Other embodiments provide a system including a server having a system email address for receiving emails for multiple users and the server including: a processor; and a memory coupled to the processor and defining a database organized to store data for respective matters having matter numbers, the database including a notes location associated with each matter, and the database including, for respective matters, a files location for storing files other than notes; the system being configured to provide a graphical user interface to a workstation using which a user can review information relating to matters, including notes, the system being further configured, in response to receiving an email having a subject line and body, to determine whether the email is from a whitelisted domain and, if not, reject the email, and if the email is not rejected, the system being configured to route at least a portion of the non-rejected email to the notes location of the matter having the matter number that matches the number contained in the email subject line, wherein a user can access the non-rejected email pertaining to a matter from a screen showing notes for the matter; and a workstation including a display screen configured to show the graphical user interface.

Still other embodiments provide a method including providing a server having a system email address for receiving emails for multiple users, and the server including a processor and a memory coupled to the processor and defining a database organized to store data for a plurality of customer matters, respective matters having matter numbers, and, for each matter, the database including a notes location associated with the matter, and the database including, for respective matters, a files location for storing files other than notes; providing, using a workstation, a graphical user interface using which a user can review information relating to matters, including notes; determining, in response to receiving an email having a subject line and body, whether the email is from a preapproved domain and, if not, rejecting the email; determining if the email subject line contains a matter number matching a database matter number and, if not, rejecting the email; and if the email is not rejected, routing at least a portion of the non-rejected email to the notes location of the matter having the matter number that corresponds to the number contained in the email subject line, wherein a user can access the non-rejected email pertaining to a matter directly from a screen showing notes for the matter

BRIEF DESCRIPTION OF THE VIEWS OF THE DRAWINGS

Figure 7:
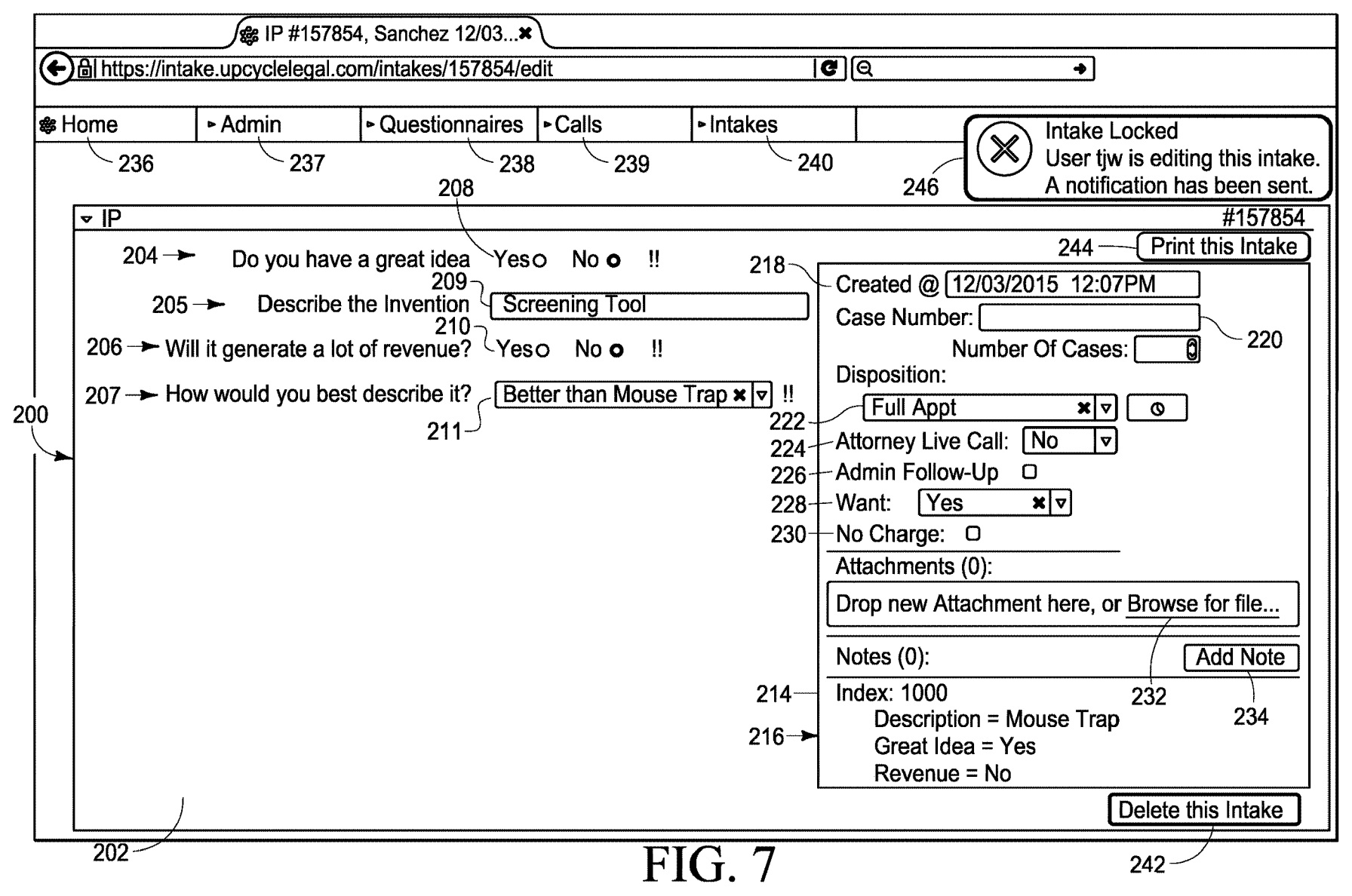

FIG. 7 is a screen shot illustrating a graphical user interface for inputting intake questionnaire screening information, using the system of FIG. 1, in accordance with various embodiments.

FIG. 10 is a screen shot illustrating the graphical user interface of FIG. 9 being filled out, in accordance with some embodiments.

FIG. 14 is a screen shot illustrating a graphical user interface for inputting intake questionnaire screening information, similar to FIG. 7, after a question has been added, in accordance with various embodiments.

FIG. 15 is a screen shot illustrating a graphical user interface for inputting client or customer information, associated with the questionnaire of FIG. 14.

FIG. 16A is a portion of a screen shot illustrating a graphical user interface for viewing, adding, or editing questions used in connection with the screening rules of FIGS. 11-13.

FIG. 16B is a second portion of the screen shot of FIG. 16B.

FIG. 17 is a screen shot illustrating a graphical user interface for viewing, adding, or editing the screening rules of FIGS. 11-13.

FIG. 18 is a map illustrating how FIGS. 18A and 18B are to be assembled.

FIG. 18A is a portion of a screen shot illustrating a graphical user interface for displaying calls received by the system of FIG. 1 and for starting intake questionnaires for calls.

FIG. 18B is a second portion of the screen shot of FIG. 18A.

FIG. 19 is a map illustrating how FIGS. 19A and 19B are to be assembled.

FIG. 19A is a portion of a screen shot illustrating a graphical user interface listing a plurality of checklists in a law firm case management system hosted by the server of FIG. 5 or a different server.

FIG. 19B is a second portion of the screen shot of FIG. 19A.

FIG. 20 is a map illustrating how FIGS. 20A and B are to be assembled.

FIG. 20A is a portion of a screen shot illustrating the graphical user interface of FIGS. 19A and 19B after a checklist type has been selected.

FIG. 20B is a second portion of the screen shot of FIG. A.

FIG. 21 is a map illustrating how FIGS. 21A and 21B are to be assembled.

FIG. 21A is a portion of a screen shot illustrating a graphical user interface listing a plurality of checklist items included in one of the checklists of FIGS. 19A and 19B.

FIG. 21B is a second portion of the screen shot of FIG. 21A.

FIG. 22 is a map illustrating how FIGS. 22A and 22B are to be assembled.

FIG. 22A is a portion of a screen shot illustrating a graphical user interface showing logic details of one of the checklist items of FIGS. 21A and 21B.

FIG. 22B is a second portion of the screen shot of FIG. 22A.

FIG. 23 is a map illustrating how FIGS. 23A and 23B are to be assembled.

FIG. 23A is a portion of a screen shot illustrating a graphical user interface showing a case type being added to the logic of the checklist item of FIGS. 22A and 22B.

FIG. 23B is a second portion of the screen shot of FIG. 23A.

FIG. 24 is a map illustrating how FIGS. 24A and 24B are to be assembled.

FIG. 24A is a portion of a screen shot illustrating a graphical user interface showing a condition pull down menu being pulled down from the graphical user interface of FIGS. 23A and 23B.

FIG. 24B is a second portion of the screen shot of FIG. 24A.

FIG. 25 is a map illustrating how FIGS. A and B are to be assembled.

FIG. 25A is a portion of a screen shot illustrating a graphical user interface showing a task due timing pull down menu being pulled down from the graphical user interface of FIGS. 24A and 24B.

FIG. 25B is a second portion of the screen shot of FIG. 25A.

FIG. 26 is a map illustrating how FIGS. 26A and 26B are to be assembled.

FIG. 26A is a portion of a screen shot illustrating a graphical user interface showing a mail merge options pull down menu being pulled down from the graphical user interface of FIGS. 25A and 25B.

FIG. 26B is a second portion of the screen shot of FIG. 26A.

Figure 27B:
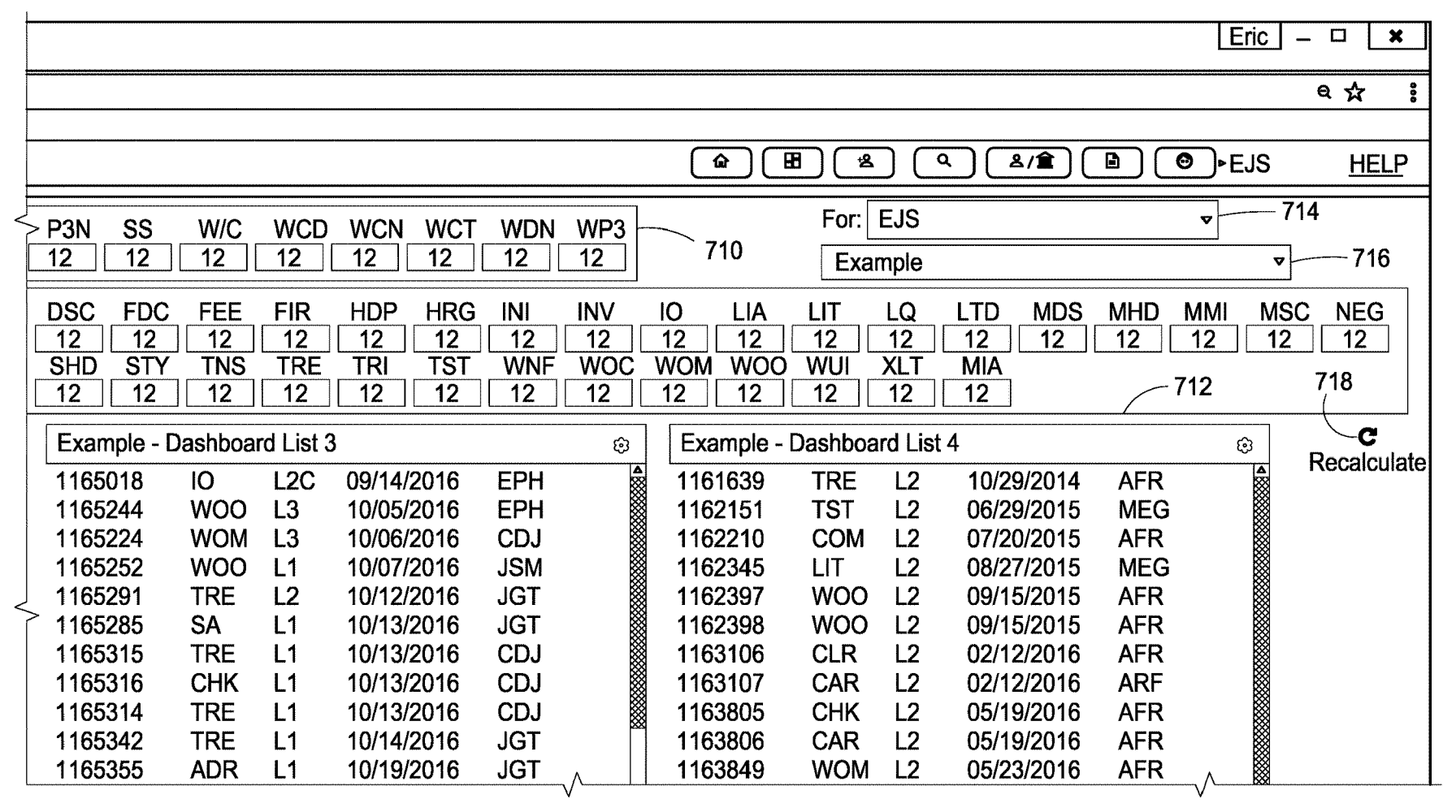

FIG. 27 is a map illustrating how FIGS. 27A, 27B, 27C, and 27D are to be assembled.

FIG. 27A is a portion of a screen shot illustrating a graphical user interface listing a plurality of dashboard lists in a law firm case management system.

FIG. 27B is a second portion of the screen shot of FIG. 27A.

FIG. 27C is a third portion of the screen shot of FIG. 27A.

FIG. 27D is a fourth portion of the screen shot of FIG. 27A.

FIG. 28 is a map illustrating how

FIG. 28A is a portion of a screen shot illustrating a graphical user interface showing dashboard items and showing filter conditions defining each dashboard list as well as columns included in each dashboard list.

FIG. 28B is a second portion of the screen shot of FIG. 28A.

FIG. 29 is a map illustrating how

FIG. 29A is a portion of a screen shot illustrating a graphical user interface showing how rules can be added or deleted to define one of the dashboard lists.

FIG. 29B is a second portion of the screen shot of FIG. 29A.

FIG. 29C is a third portion of the screen shot of FIG. 29A.

FIG. 29D is a fourth portion of the screen shot of FIG. 29A.

FIG. 30A is a portion of a screen shot illustrating a graphical user interface showing how a new dashboard list definition is added.

FIG. 30B is a second portion of the screen shot of FIG. 30A.

FIG. 30C is a third portion of the screen shot of FIG. 30A.

FIG. 30D is a fourth portion of the screen shot of FIG. 30A.

FIGS. 31A, 31B, 31C, and 31D are to be assembled.

FIG. 31A is a portion of a screen shot illustrating a graphical user interface showing a first case rule pull down menu being pulled down from the graphical user interface of FIGS. 30A and 30B.

FIG. 31B is a second portion of the screen shot of FIG. 31A.

FIG. 31C is a third portion of the screen shot of FIG. 31A.

FIG. 31D is a fourth portion of the screen shot of FIG. 31A.

FIG. 32 is a map illustrating how

FIG. 32A is a portion of a screen shot illustrating a graphical user interface showing a second case pull down menu being pulled down from the graphical user interface of FIGS. 30A and 30B.

FIG. 32B is a second portion of the screen shot of FIG. 32A.

FIG. 32C is a third portion of the screen shot of FIG. 32A.

FIG. 32D is a fourth portion of the screen shot of FIG. 32A.

FIG. 33 is a map illustrating how FIGS. 33A, 33B, 33C, and 33D are to be assembled.

FIG. 33A is a portion of a screen shot illustrating a graphical user interface showing how a rule is added to the screens of FIG. 30A and FIG. 30B using pull down menus.

FIG. 33B is a second portion of the screen shot of FIG. 33A.

FIG. 33C is a third portion of the screen shot of FIG. 33A.

FIG. 33D is a fourth portion of the screen shot of FIG. 33A.

FIGS. 34A, 34B, 34C, and 34D are to be assembled.

FIG. 34A is a portion of a screen shot illustrating a graphical user interface showing a second rule being added.

FIG. 34B is a second portion of the screen shot of FIG. 34A.

FIG. 34C is a third portion of the screen shot of FIG. 34A.

FIG. 34D is a fourth portion of the screen shot of FIG. 34A

FIG. 35 is a map illustrating how FIGS. 35A, 35B, 35C, and 35D are to be assembled.

FIG. 35A is a portion of a screen shot illustrating a graphical user interface showing a third rule being added.

FIG. 35B is a second portion of the screen shot of FIG. 35A.

FIG. 35C is a third portion of the screen shot of FIG. 35A.

FIG. 35D is a fourth portion of the screen shot of FIG. 35A.

FIG. 36 is a map illustrating how

FIG. 36A is a portion of a screen shot illustrating a graphical user interface showing a fourth rule being added.

FIG. 36B is a second portion of the screen shot of FIG. 36A.

FIG. 36C is a third portion of the screen shot of FIG. 36A.

FIG. 36D is a fourth portion of the screen shot of FIG. 36A.

FIG. 37 is a map illustrating how FIGS. 37A and 37B are to be assembled.

FIG. 37A is a portion of a screen shot illustrating a graphic user interface showing an administrative screen for managing buzzwords.

FIG. 37B is a second portion of the screen of FIG. 37A.

FIG. 38A is a portion of a screen shot illustrating a graphic user interface showing a buzzword being edited.

FIG. 38B is a second portion of the screen of FIG. 38A.

FIG. 39 is a map illustrating how FIGS. 39A, 39B, 39C, and 39D are to be assembled.

FIG. 39A is a portion of a screen shot illustrating a graphical user interface showing a notes screen or screen portion.

FIG. 39B is a second portion of the screen shot of FIG. 39A.

FIG. 39C is a third portion of the screen shot of FIG. 39A.

FIG. 39D is a fourth portion of the screen shot of FIG. 39A.

Figure 40B:
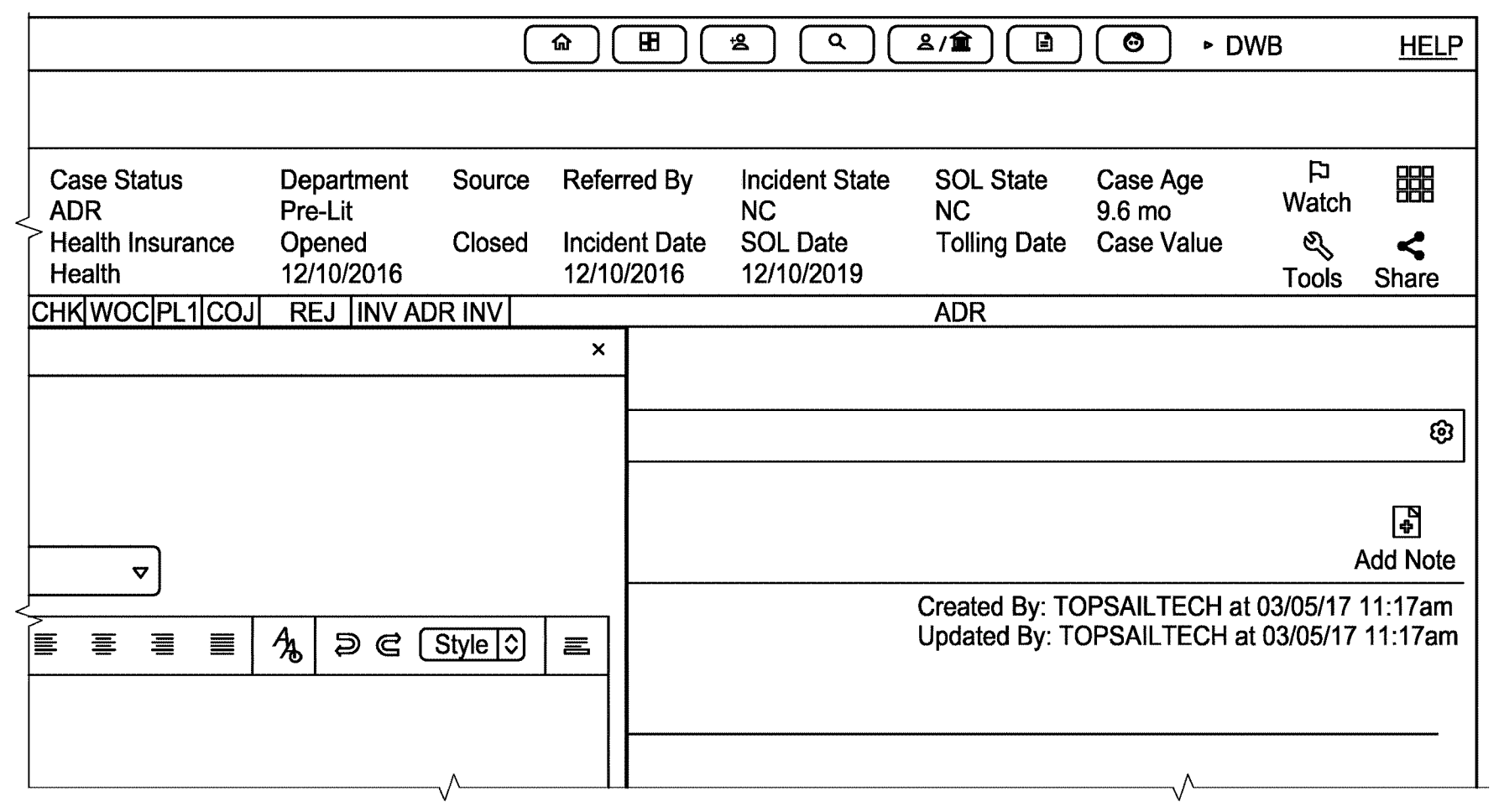

FIG. 40 is a map illustrating how FIGS. 40A, 40B, 40C, and 40D are to be assembled.

FIG. 40A is a portion of a screen shot illustrating a graphical user interface including a text editor screen portion.

FIG. 40B is a second portion of the screen shot of FIG. 40A.

FIG. 40C is a third portion of the screen shot of FIG. 40A.

FIG. 40D is a fourth portion of the screen shot of FIG. 40A.

Figure 41B:
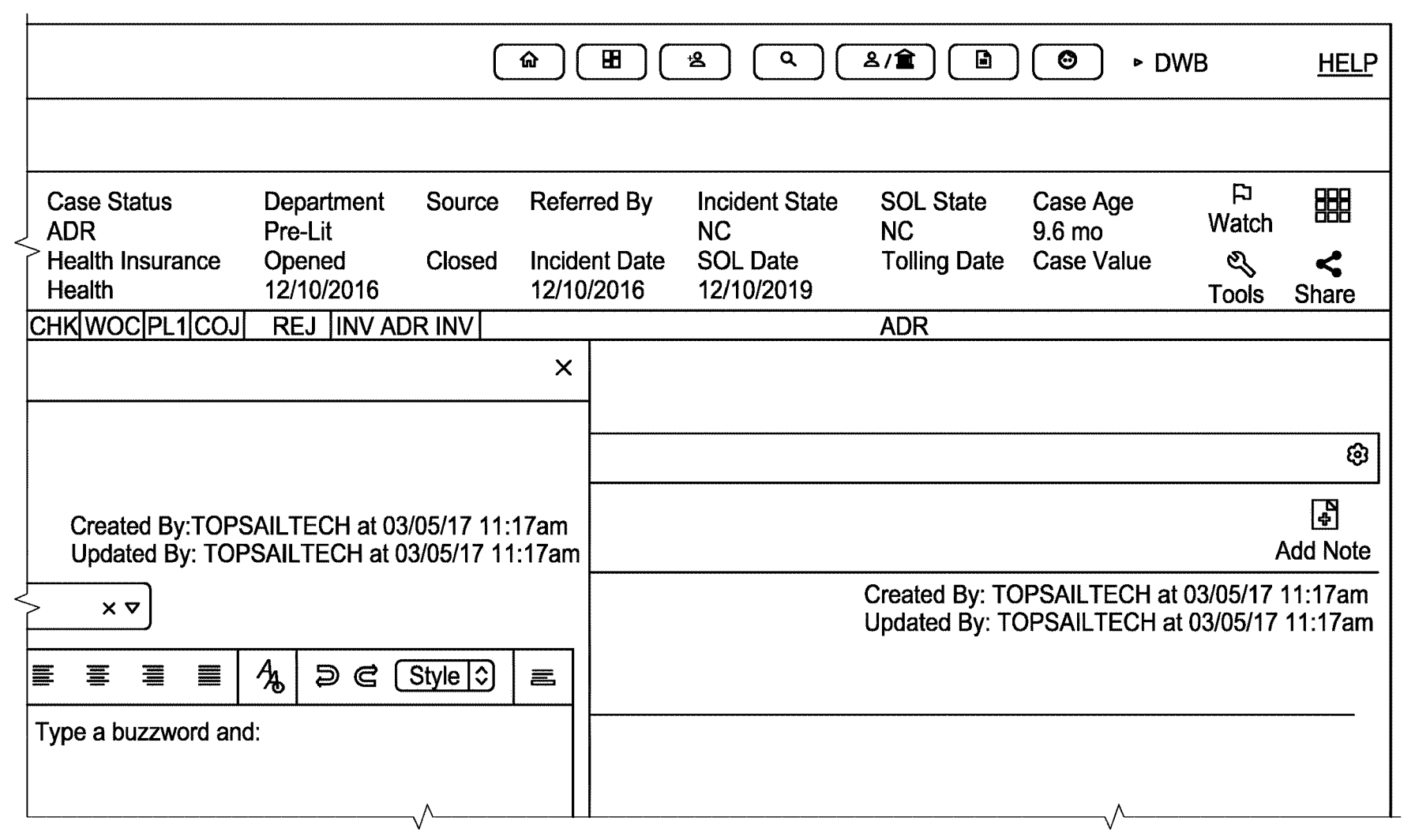

FIG. 41 is a map illustrating how FIGS. 41A, 41B, 41C, and 41D are to be assembled.

FIG. 41A is a portion of a screen shot illustrating a graphical user interface including a recognized buzzword-indicating screen portion.

FIG. 41B is a second portion of the screen shot of FIG. 41A.

FIG. 41C is a third portion of the screen shot of FIG. 41A.

FIG. 41D is a fourth portion of the screen shot of FIG. 41A.

FIG. 42 is a screen shot illustrating a web page associated with a buzzword of FIGS. 37A-D and FIGS. 41A-D.

FIG. 45 is a map illustrating how FIGS. 45A, 45B, 45C, and 45D are to be assembled.

FIG. 45A is a portion of a screen shot illustrating a graphical user interface illustrating the email of FIG. 44 being received from the third party email client by the case management system and being added as a note.

FIG. 45B is a second portion of the screen shot of FIG. 45A.

FIG. 45C is a third portion of the screen shot of FIG. 45A.

FIG. 45D is a fourth portion of the screen shot of FIG. 45A.

FIG. 46 is a screen shot illustrating sending an email including an attachment from a third party email client to the case management system.

FIG. 47 is a map illustrating how FIGS. 47A, 47B, 47C, and 47D are to be assembled.

FIG. 47A is a portion of a screen shot illustrating a graphical user interface illustrating the email of FIG. 46 being received from the third party email client by the case management system and being added as a note, and showing the attachment being added in a files section of the user interface.

FIG. 47B is a second portion of the screen shot of FIG. 47A.

FIG. 47C is a third portion of the screen shot of FIG. 47A.

FIG. 47D is a fourth portion of the screen shot of FIG. 47A.

FIG. 48 is a map illustrating how FIGS. 48A and 48B are to be assembled.

FIG. 48A is a portion of a screen shot illustrating a graphical user interface illustrating a share menu that is displayed when a share icon is actuated.

Figures 48B, 49:
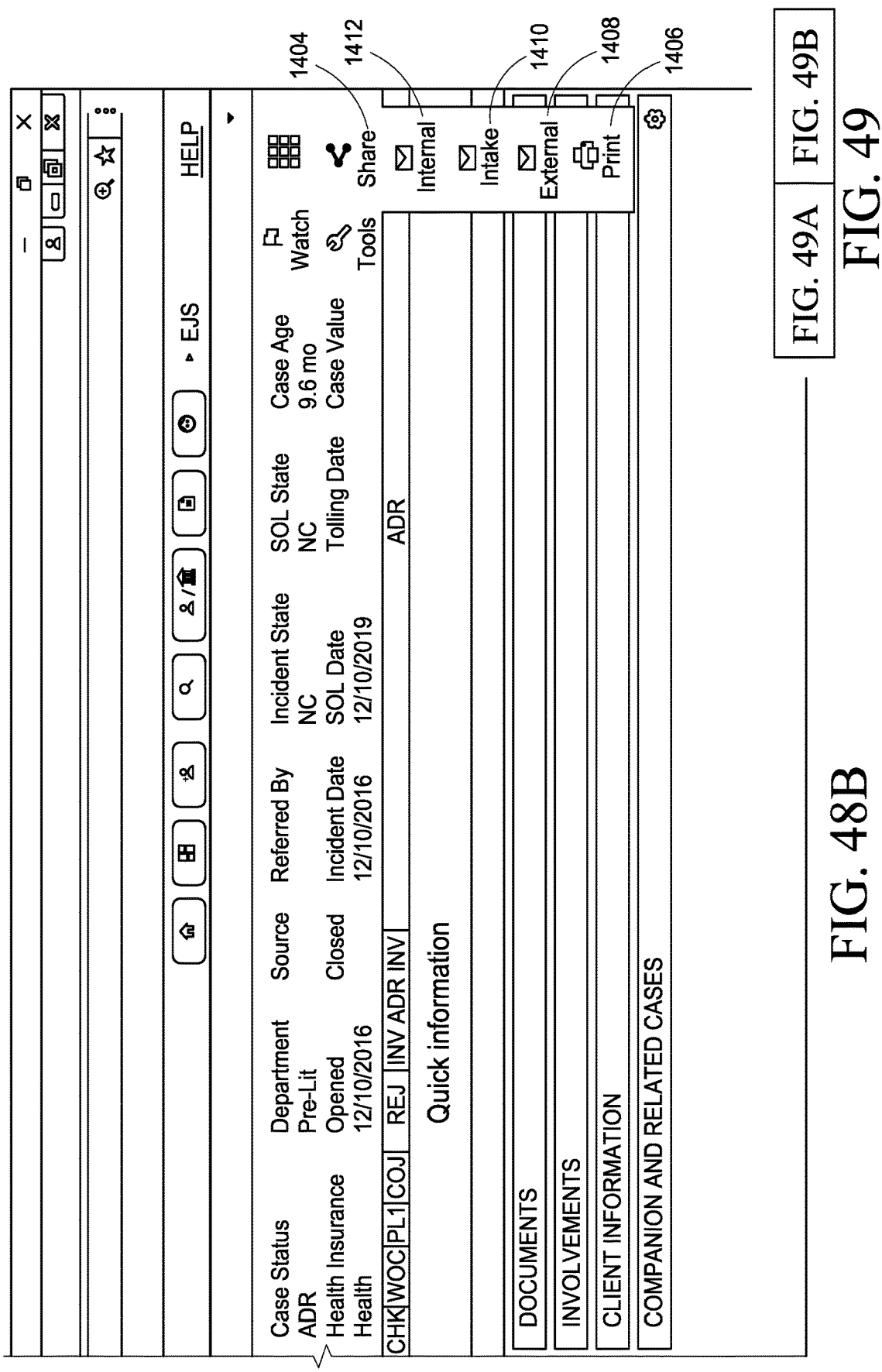

FIG. 48B is a second portion of the screen shot of FIG. 48A.

Figure 49B:
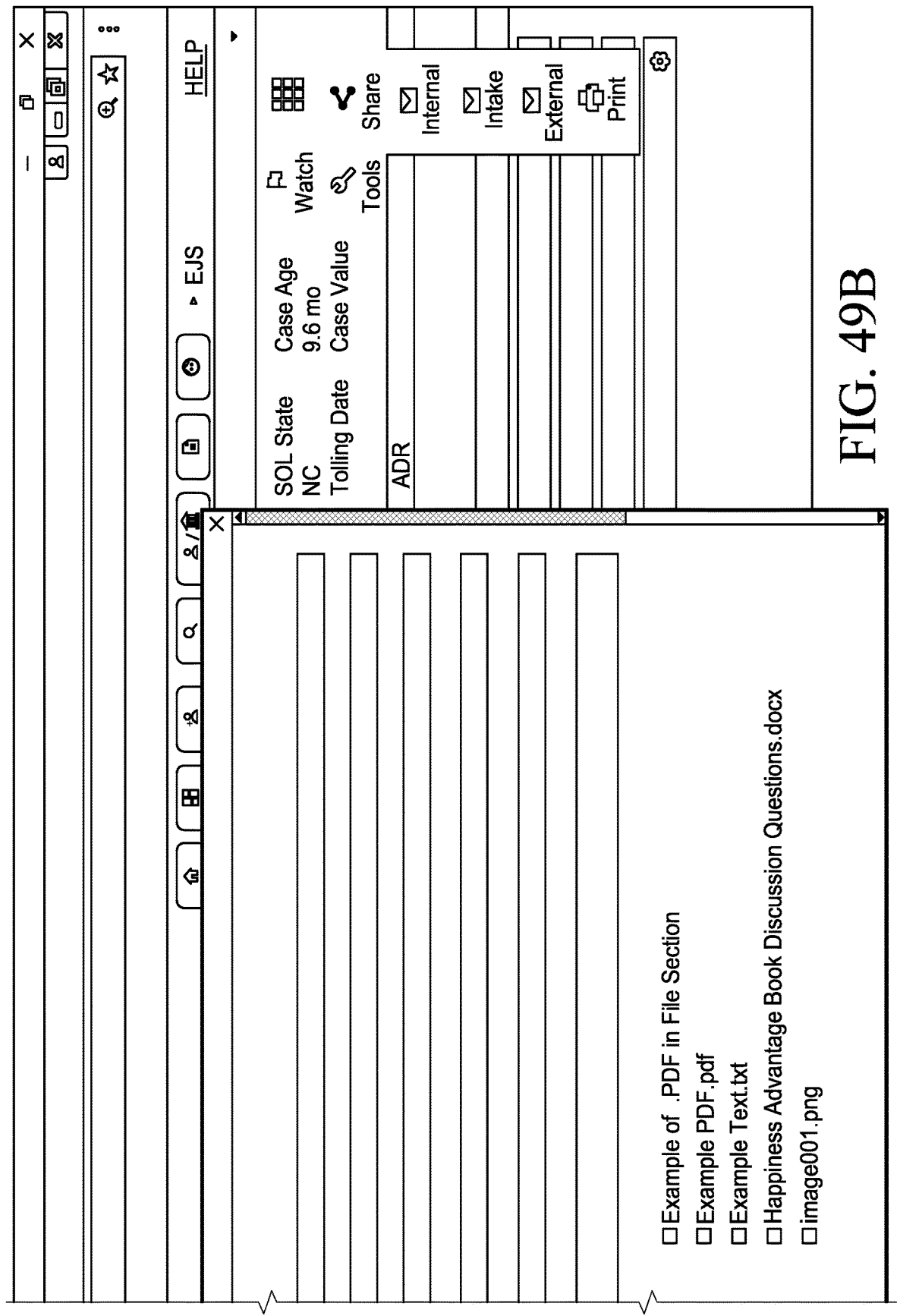

FIG. 49 is a map illustrating how FIGS. 49A and 49B are to be assembled.

FIG. 49A is a portion of a screen shot illustrating a user interface for creating an email originating from the case management system.

FIG. 49B is a second portion of the screen shot of FIG. 49A.

Figure 50B:
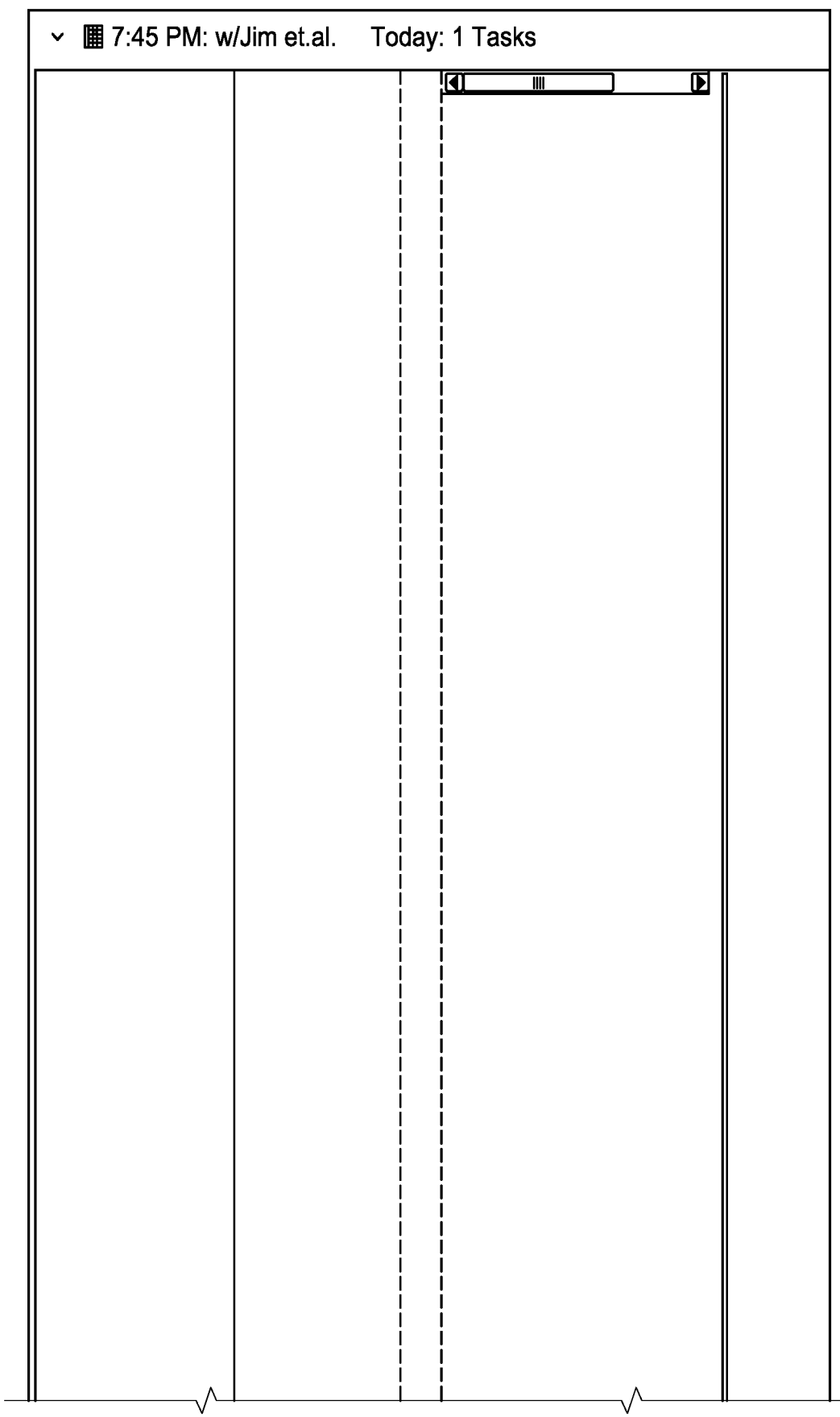

FIG. 50 is a map illustrating how FIGS. 50A and 50B are to be assembled.

FIG. 50A is a portion of a screen shot illustrating an email received from the case management system.

FIG. 50B is a second portion of the screen shot of FIG. 50A.

Figure 51D:
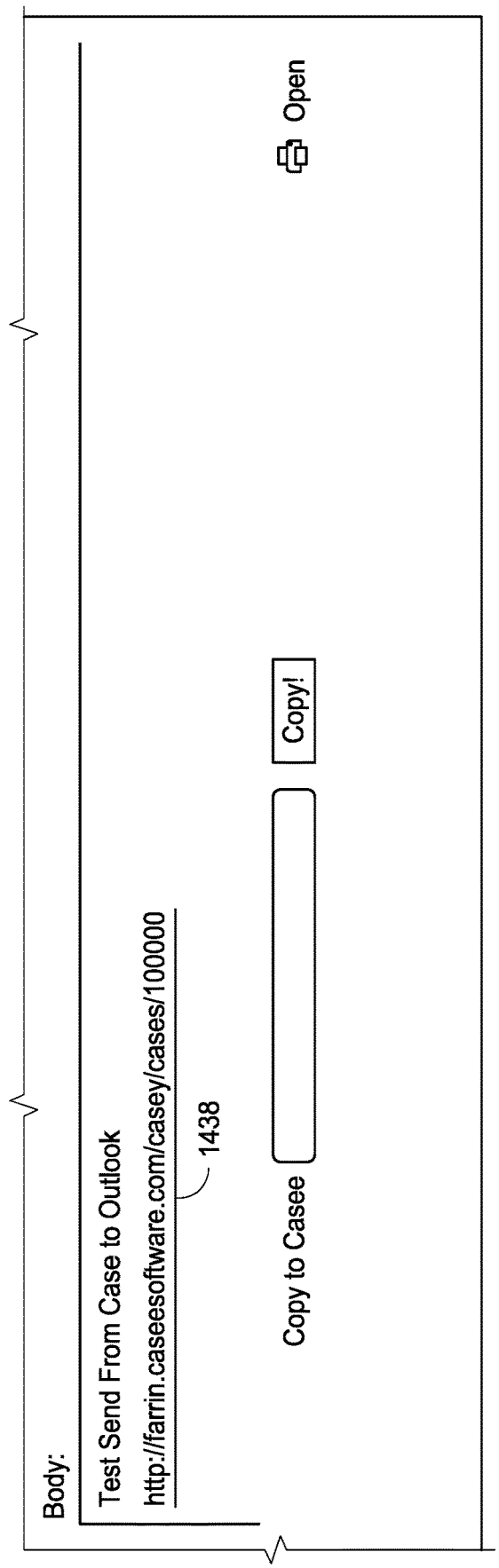

FIG. 51 is a map illustrating how FIGS. 51A, 51B, 51C, and 51D are to be assembled.

FIG. 51A is a portion of a screen shot illustrating a graphical user interface illustrating the sent email of FIGS. 50A and 50B being included in a notes section of the case management system.

FIG. 51B is a second portion of the screen shot of FIG. 51A.

FIG. 51C is a third portion of the screen shot of FIG. 51A.

FIG. 51D is a fourth portion of the screen shot of FIG. 51A.

Figure 52:
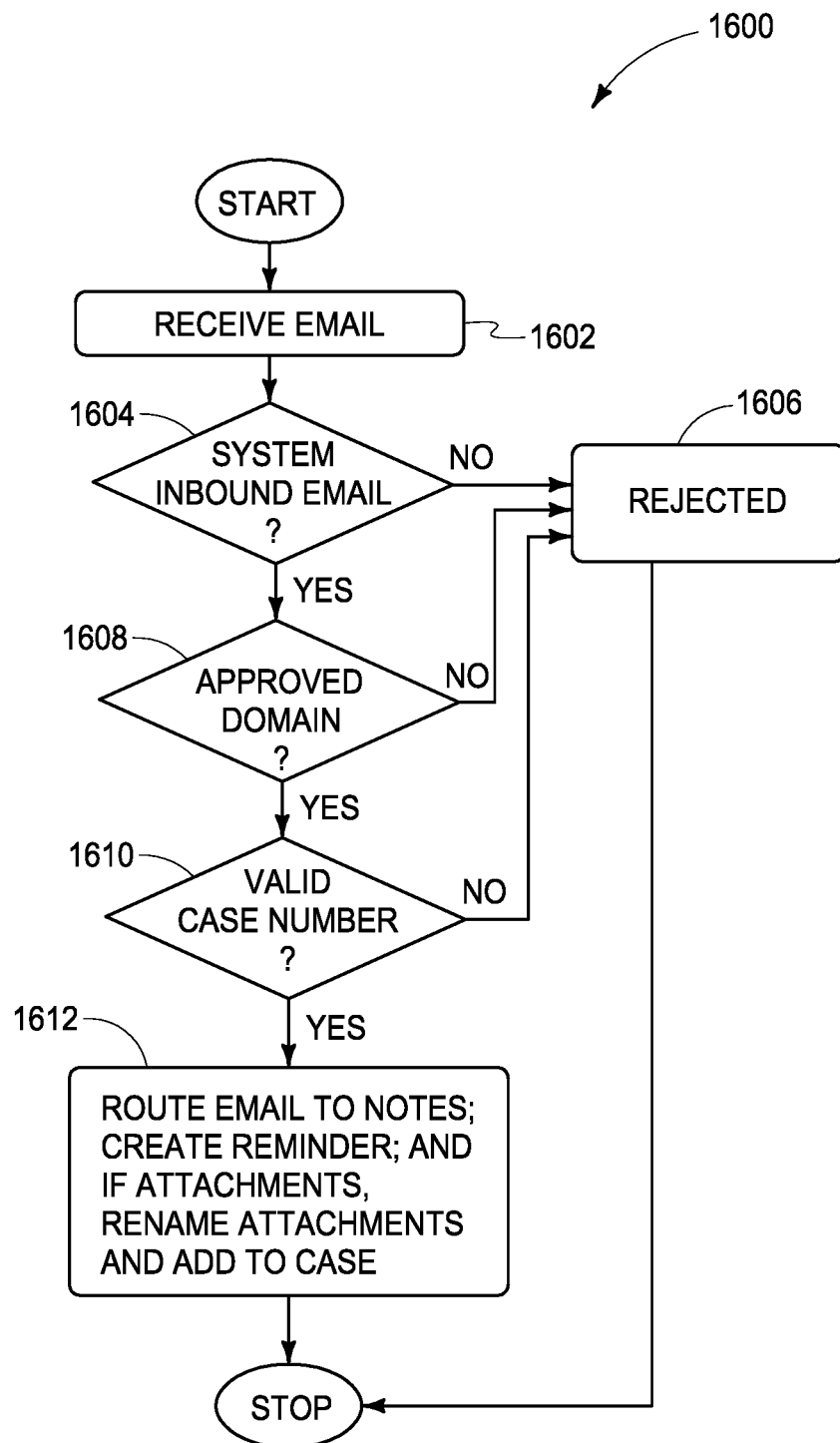

FIG. 52 is a flowchart illustrating operation of the case management system in receiving and validating an email from a third party email system, in accordance with some embodiments.

Figure 53:
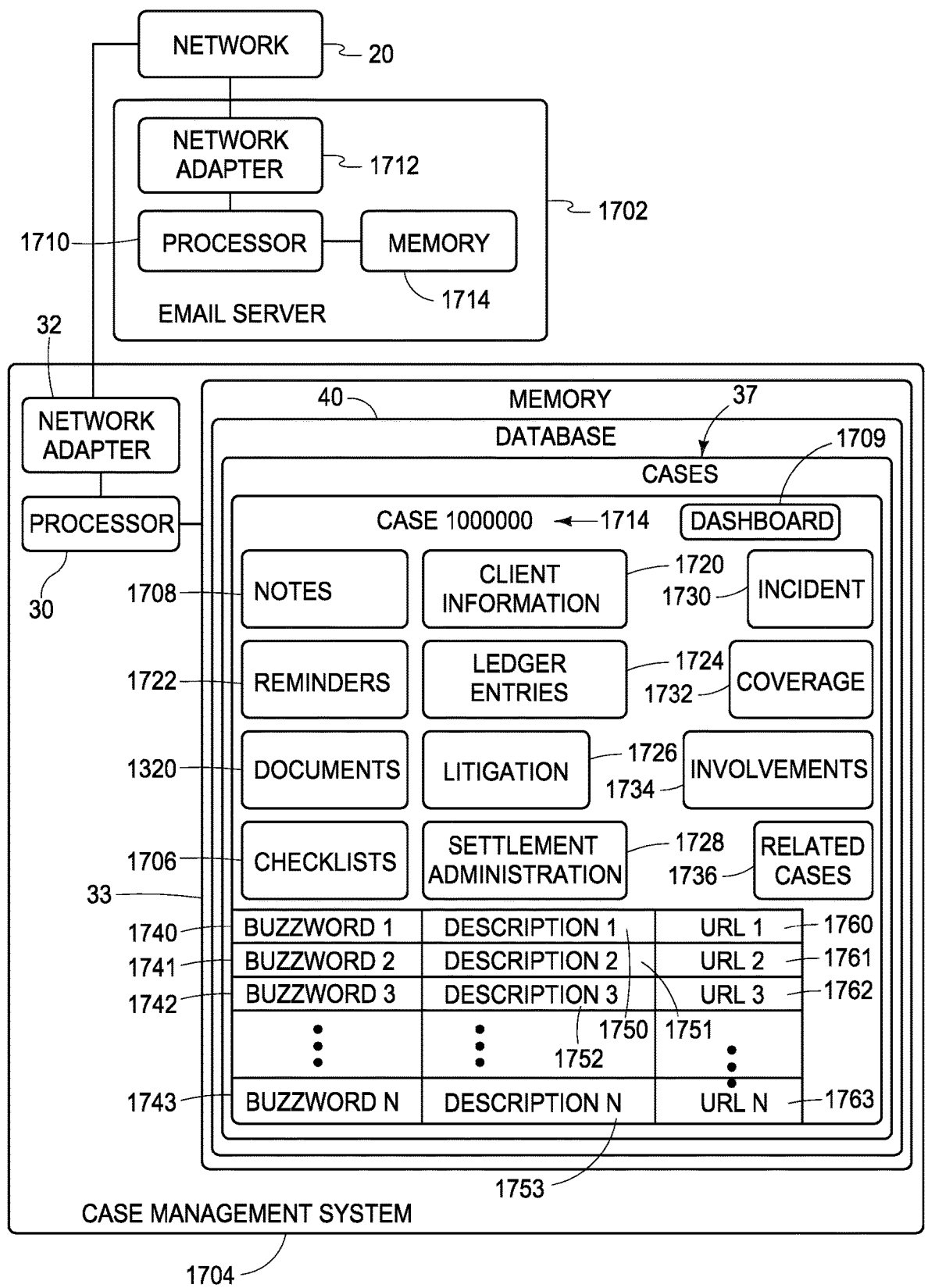

FIG. 53 is a hardware block diagram of the case management system and email server in accordance with some embodiments.

DETAILED DESCRIPTION OF THE ILLUSTRATED EMBODIMENTS

Attention is direct to U.S. patent application Ser. No. 15/697,809, filed Sep. 7, 2017, which is a continuation of U.S. patent application Ser. No. 15/434,564, filed Feb. 16, 2017, now U.S. Pat. No. 9,785,312, which in turn claims priority to U.S. Provisional Patent Application Ser. No. 62/296,595 filed Feb. 17, 2016, all of which name Sanchez et al as inventors, and all of which are incorporated herein by reference. Attention is also directed to U.S. Pat. No. 9,703,985 to Sanchez, and to U.S. patent application Ser. No. 15/675,703 to Sanchez, both of which are incorporated herein by reference. In various embodiments, the system described below further includes some or all of the features described in these incorporated applications and patents.

Figure 1:
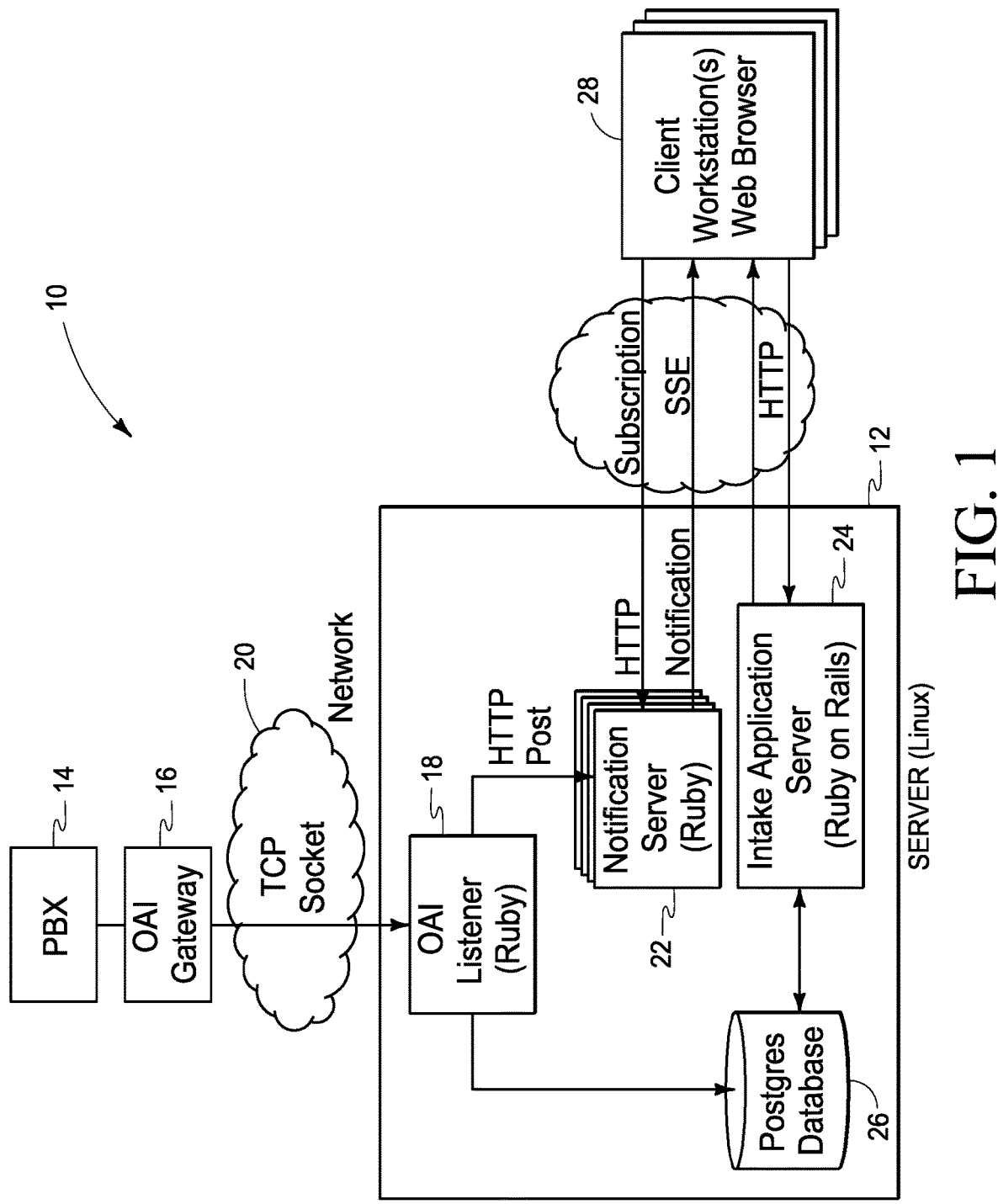
FIG. 1 is a functional block diagram of a system in accordance with various embodiments.

FIG. 1 shows a system 10 in accordance with various embodiments. The system 10 includes one or more servers 12. In the illustrated embodiment, a server 12 is depicted which runs Linux. Other operating systems can be used. The system 10 further includes a private branch exchange (PBX) 14 in communication with the server 12. More particularly, the system 10 further includes an open architecture interface (OAI) gateway 16 between the PBX 14 and the server 12, in the illustrated embodiment. The gateway 16 provides the interface between the PBX 14 and a network, such as a local area network that uses Ethernet cable.

The PBX 14 receives several incoming phone lines from the public switched telephone network (PSTN). In some embodiments, the PBX 14 is a traditional PBX. In other embodiments, the PBX 14 is a hybrid PBX that incorporates both analog and VoIP endpoints for use with conventional or IP phones. In still other embodiments, the PBX 14 is a VoIP PBX. In still other embodiments, VoIP is used and the PBX 14 is omitted.

The server 12 includes an open architecture interface (OAI) listener 18 coupled to the gateway 16 via a network 20, such as a local area network, using a transmission control protocol (TCP) socket, in the illustrated embodiment. In the illustrated embodiment, the OAI listener 18 runs the Ruby programming language. Other languages could be used.

The server 12 further includes a notification server 22. In the illustrated embodiment, the listener 18 transfers inbound connections from the PBX 14 to the notification server 22 via HTTP post.

The server 12 further includes an intake application server 24. The intake application server 24 is used to generate client intake forms described below, to change fields in intake screens, and to capture data filled in the fields. In the illustrated embodiment, the intake application server 24 runs the Ruby on Rails programming language. Other languages could be used.

The server 12 further includes a database 26 in communication with the intake application server 24 and the OAI listener 18. The database 26 stores data from the intake application server such as forms, formulas, data entered into the forms, form fields, as will be described in more detail below. The database 26 also stores data about incoming calls from the OAI listener 18, such as which direct inward dial phone numbers received phone calls, when calls were made, how long they lasted, etc. In the illustrated embodiment, the database 26 is a Postgres database. Other types of databases could be used. The database can be a multi-tenant database, which maintains data and provides access to the data for a number of different companies.

The system 10 further includes one or more workstations 28 in communication with the server 12 via a network, such as via the network 20 or via the Internet. The workstations 28 comprise, in some embodiments, personal computers having typical components including input/output devices such as screens and keyboards or touch screens, memory such as RAM, ROM, and hard drives or solid state memory, processors, and modems or network adapters for connecting to the network. The workstations comprise, in some embodiments, smart phones, tablets, computers or devices with web-based operating systems, or other devices capable of running a web browser. In some embodiments, a workstation is defined, in some embodiments, by input and output devices coupled directly to the server 12 instead of via the network. In the illustrated embodiment, the workstations 28 send subscriptions to the notification server 22 via HTTP and receive notifications from the notification server 22 via SSE (server side event). A subscription defines the criteria for a notification, such as when a phone call is received. A subscription also defines the subscribers or users who are to receive the notification. An HTML5 server side event allows real-time data updates to be pushed from the server 12 to the browser of the workstation or workstations 28.

Figure 2:
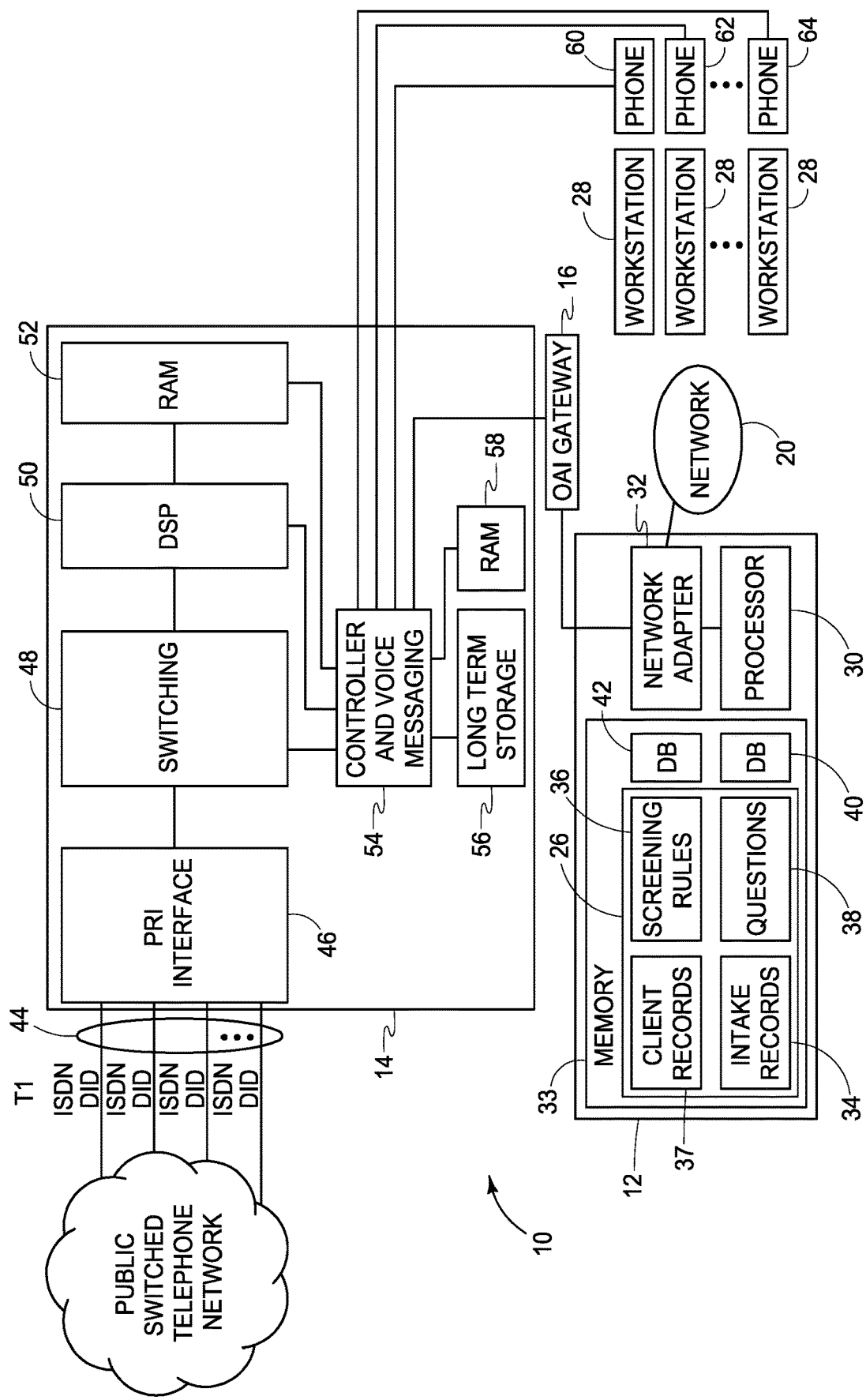
FIG. 2 is a hardware block diagram of the system of FIG. 1 showing greater details of the PBX included in the system of FIG. 1, in accordance with various embodiments.

FIG. 2 shows hardware construction details of the system 10, in accordance with various embodiments. As shown in FIG. 2, the server 12 includes typical components of Internet hosting servers including, for example, one or more processors (single or multi-core) 30, one or more network adapters 32 for communications with the workstations 28 over the network 20, and memory 33, which includes RAM, ROM, and hard drives or solid state memory, in communication with the processor 30. The memory 33 defines databases including the database 26 of FIG. 1. In the illustrated embodiment, the database 26 includes client records 37 (e.g., information about various communications with a law firm client), intake records 34 (see FIGS. 14 and 15), screening rules 36 (see FIG. 17), and questions 38 (see FIGS. 16A and B). Alternatively, these items can be stored in separate databases. Additional databases, e.g., 40 and 42, can be included for storing other data, such as legal case management or docketing data, accounts payable, time and billing data, etc. Other hardware arrangements are possible.

As shown in FIG. 2, the PBX 14 receives phone calls from a public switched telephone network. In the illustrated embodiment, the PBX 14 receives at least one primary rate interface (PRI) line 44 that defines a plurality of direct inward dial (DID) numbers. A DID is an actual phone number that a potential client or customer dials. PRI is a level of service assigned by the integrated services digital network (ISDN), providing digital access to the public switched telephone network for the PBX 14. ISDN is an international communications standard for transmission of digital voice, video, and data over the public switched telephone network. While PRI is usually associated with voice transmission, it can also transmit faxes, data, or video. The PRI of the illustrated embodiment is a single cable that consists of 24 channels. The PBX 14 includes a PRI interface 46 that uses 23 of the channels for voice calls and one line for signaling. In the illustrated embodiment, the PBX 14 further includes switching circuitry 48 for connecting different phones to different DID lines, digital signal processing (DSP) circuitry 50 for converting to analog lines or for supporting VOIP protocols for VOIP phones, RAM 52 associated with the digital signal processing circuitry 50, a controller and voice messaging circuitry 54, and long term storage 56 (e.g., one or more hard drives or solid state drives) and RAM 58 associated with the controller 54. In some embodiments, voice messages are stored in the long term storage 56. In some embodiments, a separate server is used for voice message. The controller 54 provides outputs to phones 60, 62, 64, etc. that may be provided proximate different computer workstations 28 so intake clerks can enter data into the workstations while being on the phone with potential clients or customers. In some embodiments, intake clerks log in to specific phones of the PBX 14. This allows the server 12 to route specific incoming calls to specific intake clerks even if they switch locations. Other PBX designs can be employed in other embodiments.

Figure 3:
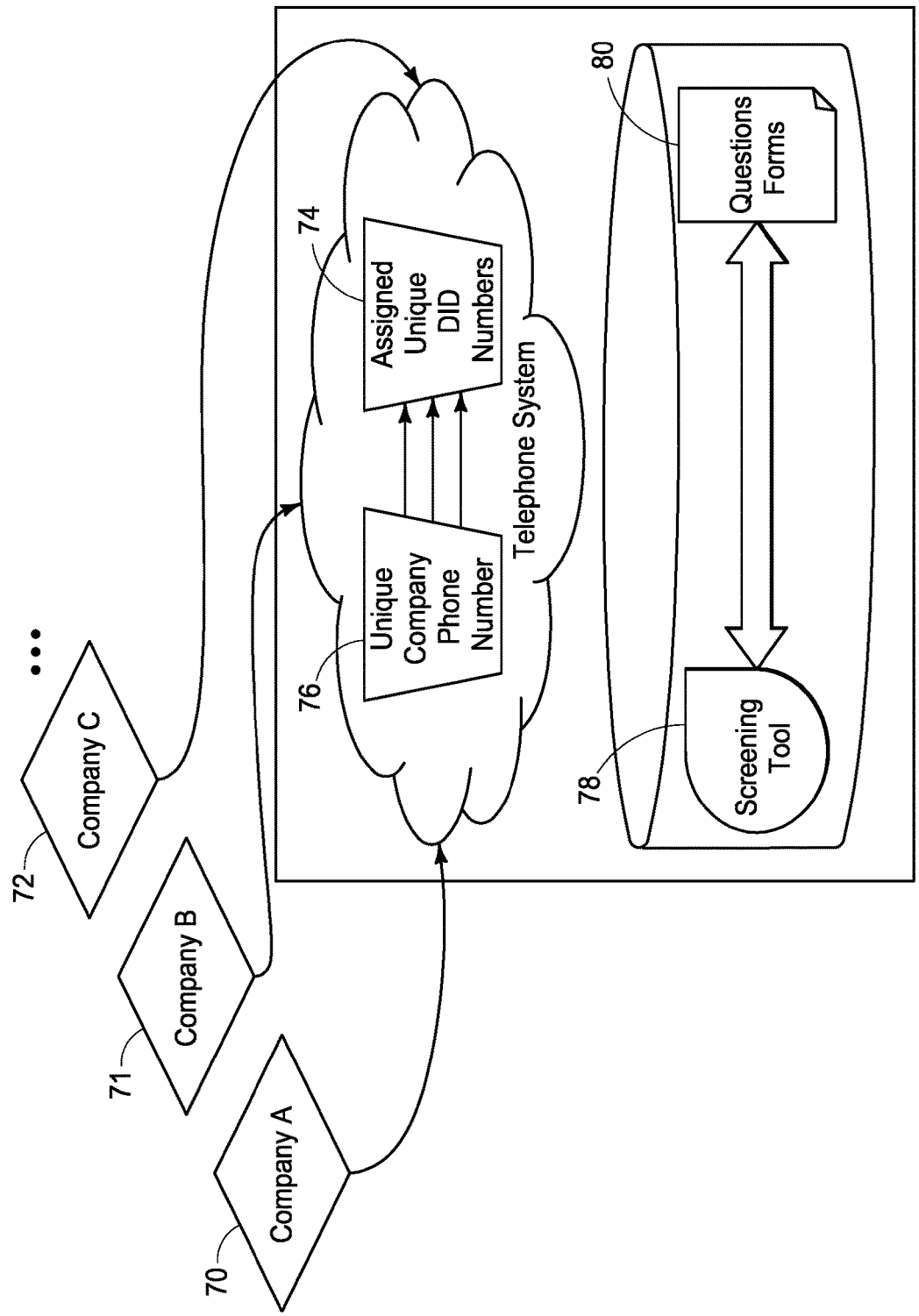
FIG. 3 is a block diagram illustrating attaching of company numbers to unique direct inward dial numbers, in accordance with various embodiments.

FIG. 3 illustrates attaching companies to unique direct inward dial phone numbers. In some embodiments, potential clients for multiple different law firms can be screened by the system 10 (FIG. 1). Multiple law firms or attorneys 70, 71, and 72 direct potential claimants into the system 10. To facilitate this, different companies (e.g., different law firms) 70, 71, 72, etc. are each assigned one or more different unique inward dial numbers 74 by the PBX 14. A law firm 70 may advertise, for example, a certain phone number to accident victims and a different phone number to medical malpractice victims. Based on the phone number 76 called by the potential client, the PBX 14 knows which law firm was called and screening tool 78 of the system 10 knows which questionnaire 80 to present to an intake clerk. Different law firms may develop their own question forms, using workstations 28 (see FIG. 1) based on whatever claim it is they wish to have evaluated. In some embodiments, metadata defined by an administrator triggers actions unique to defined phone numbers as selected by the administrator. For example, law firm "A" has the DID phone number (919)123-4567 assigned to them and law firm "B" has the phone number (919)890-1112 assigned to them. When a call comes into the system 10 to (919)123-4567, customized questionnaires assigned to law firm "A" display on an intake clerk's screen. If a call comes in to (919)890-1112, customized questionnaires assigned to law firm "B" display on an intake clerk's screen.

Various embodiments provide a screening tool 78 (see FIG. 3), defined by the system 10 of FIG. 1 that expresses rules and conditions in a set of database tables in the database 26. In various embodiments, each rule optionally has a name (for visual reference), and one or more associated conditions. The screening tool 78 queries the database table for all rules that are associated with the type of intake (or case), and through a loop control structure, the screening tool 78 tests each condition for a match. With each match, a value (positive or negative) is added to a resulting intake score, in some embodiments.

Figure 4:
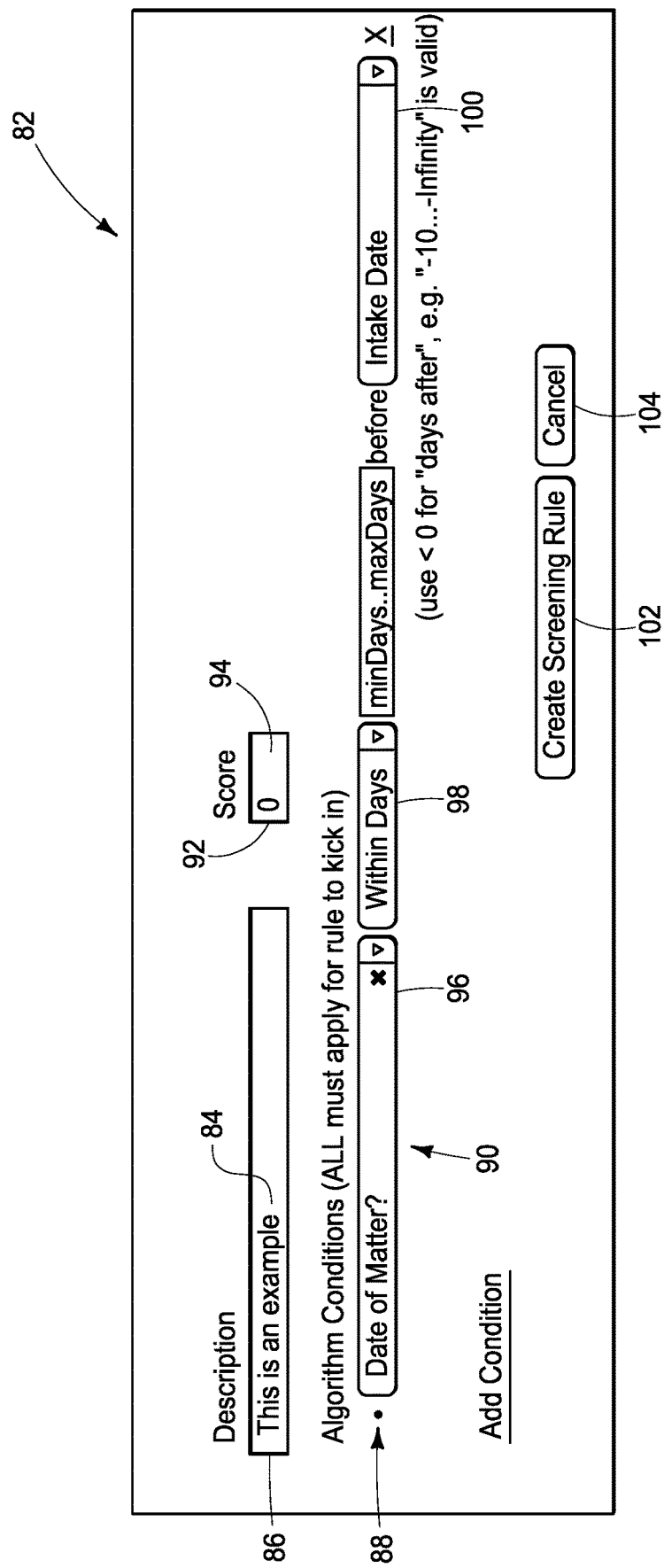
FIG. 4 is a screen shot illustrating a graphical user interface for setting a value for a condition, to perform a screening using the system of FIG. 1, in accordance with various embodiments.

FIG. 4 illustrates an example user interface 82, created by the system 10 of FIG. 1, which an administrator can use to assign a name 84 to a screening rule or intake scoring model in a description field 86. Using the screening tool 78 (see FIG. 3), an administrator at a law firm (or other organization) creates rules and adds one or more conditions. A condition 88 references a question on an intake questionnaire. The screening tool 78, in various embodiments, provides for matching tests including but not limited to equality, inequality, inclusion in a set, exclusion from a set, and a date within a range of days relative to other dates provided in answers to the intake questionnaire. In the example shown in FIG. 4, the matching test employed is a date range test 90. The administrator, in various embodiments, assigns in field 92 a score or value 94 to be added if the condition 88 on the intake questionnaire is met and all other conditions for the screening rule or intake scoring model are met. This assignment of a score is typically done while the administrator creates a screening rule. In various embodiments, a score can be changed after a screening rule has been created. In the example shown in FIG. 4, if the date of the matter is within a certain number of days before the intake date, the score in field 92 is added to a cumulative total score for the intake questionnaire. The condition "date of matter" is chosen using pull down menu 96, the condition "within days" is chosen using pull down menu 98, and the condition "intake date" is chose using pull down menu 100. After conditions and scores are set, the rule is created by actuating a button 102 or is cancelled by actuating a button 104.

The forms generated by the system (FIG. 4 and FIGS. 7-15) by the system 10 are web HTML forms that consist of standard web HTML form input elements and layout elements, as well as hand-written javascript, in various embodiments. The system 10 uses libraries that are, in some embodiments, Ruby libraries (referred to as Ruby Gems), and some open-source web form styling packages. For example, one such styling component is called select2 (https://select2.github.io/) that extends the functionality and visual appearance of the HTML <select>input element.

Figure 5:
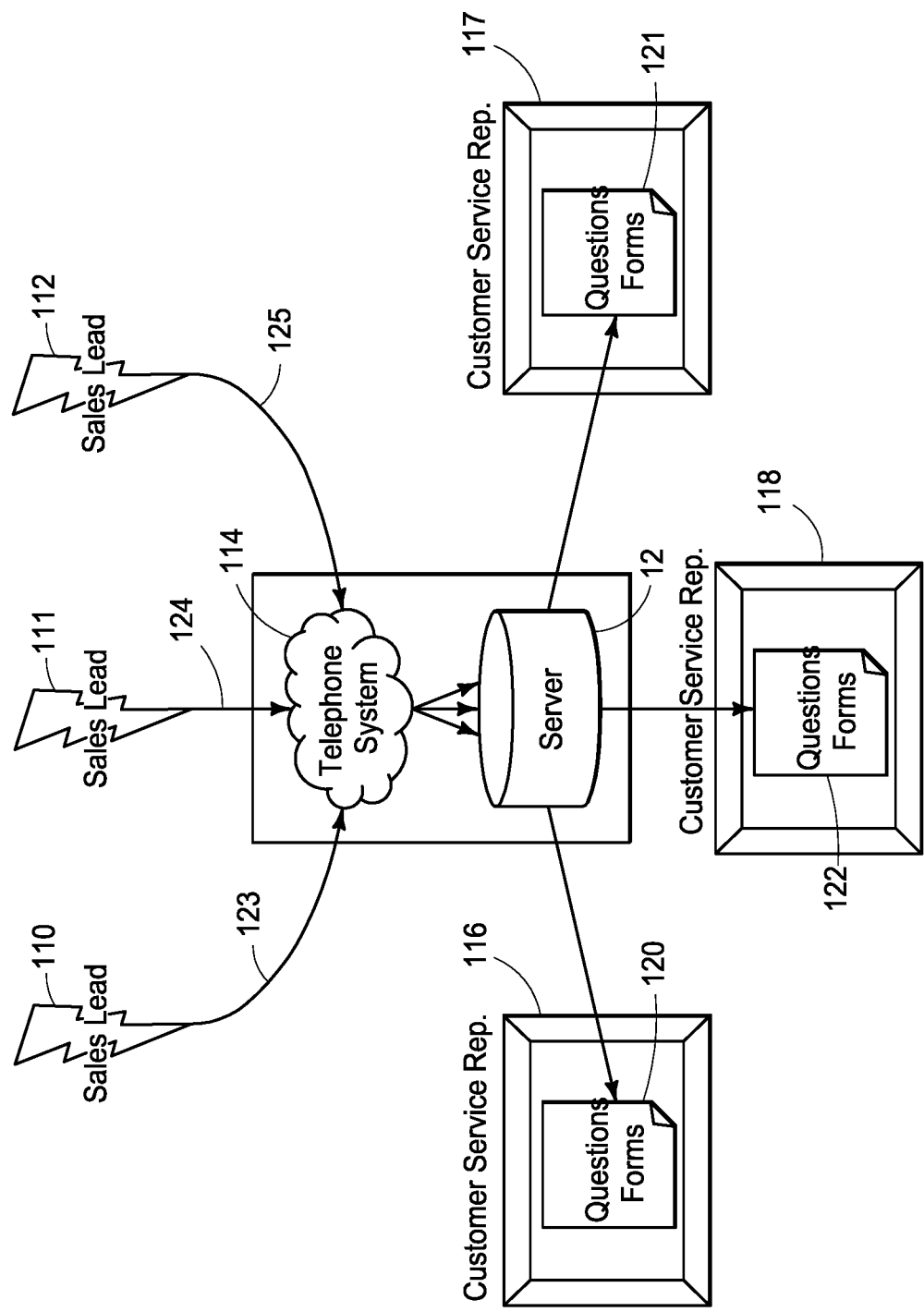
FIG. 5 is a functional block diagram illustrating automatic routing based on the system of FIG. 1 reading a direct inward dial number, in accordance with various embodiments.

FIG. 5 shows automatic routing in response to the PBX 14 (FIG. 1) reading a direct inward dial number, in accordance with various embodiments. Different potential clients, customers, or sales leads 110, 111, and 112 call different phone numbers that were advertised in connection with different products, services, or solutions using the telephone system 114. The system 10 routes the calls to different customer service representatives, screeners, or intake clerks 116, 117, or 118 that have different question forms or intake questionnaires 120, 121, and 122, respectively. In some embodiments, this is arranged using phone extension routing and by specifically limiting certain intake clerk's access to specific intake questionnaires. Alternatively, a single intake clerk will have different question forms or intake questionnaires 120, 121, and 122 (similar to the questionnaire 80 of FIG. 3 but different from each other) come up on a monitor screen of a workstation 28 depending on the phone number dialed by the potential client or customer 110, 111, and 112. In some embodiments, if no intake clerk is available, the call is logged so that an intake clerk may perform an intake at a later time.

In the law firm example, different law firms develop different intake questionnaires used to determine whether or not a potential client should be accepted. Alternatively, the same questions may be used by different firms but scoring may be different depending on the types of clients the different firms want. For example, while some law firms may only want large clients, other firms may only want small clients, due to staffing and capacity. Or a potential client may have a strong case in one state, serviced by one firm, but a weak case in a different state, serviced by a different firm, due to differences in laws in the different states. A single law firm may have multiple intake questionnaires, such as for different types of potential causes of action. Respective direct inward dial phone numbers 123, 124, and 125, dialed by potential clients or customers 110, 111, and 112, are associated with the different intake questionnaires 120, 121, and 122, in the illustrated embodiment.

Figure 6:
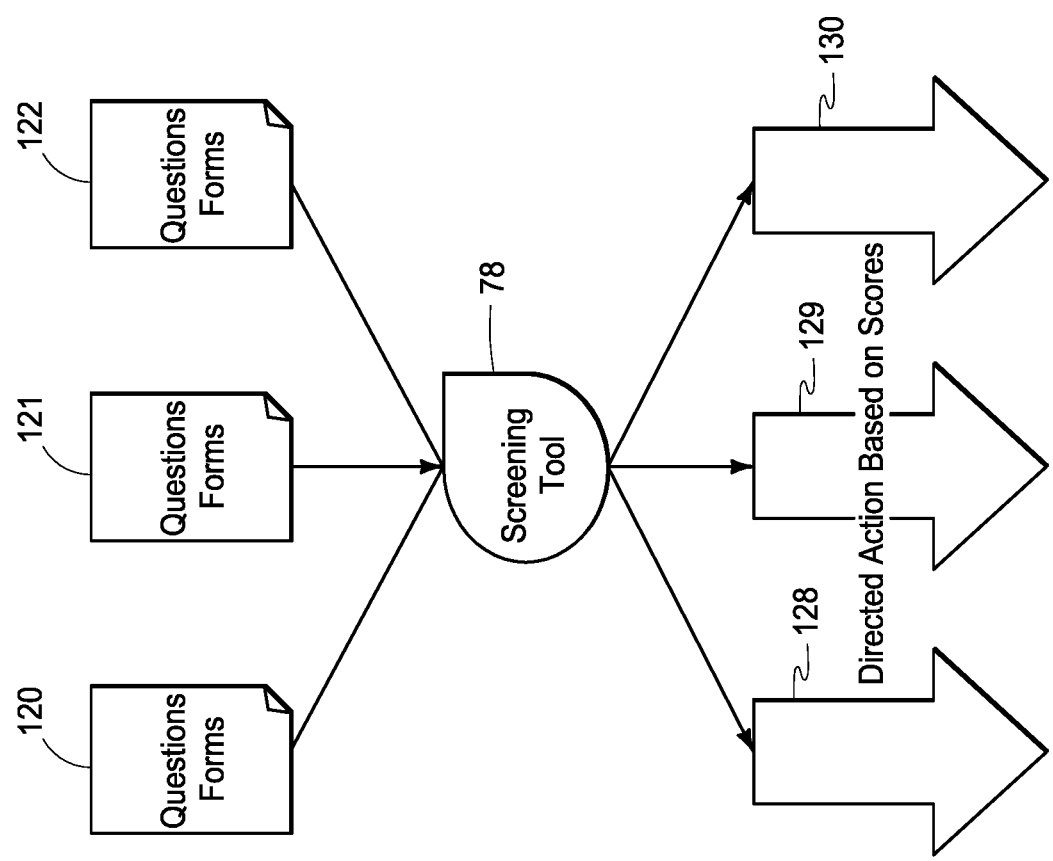
FIG. 6 is a functional block diagram illustrating that responses to question forms trigger directed action, using the system of FIG. 1, in accordance with various embodiments.

FIG. 6 illustrates that the responses from the attorney's questions 120, 121, or 122 (similar to questions of questionnaire 80 of FIG. 3), after being entered by an intake clerk, using the screening tool 78, generate scores for the potential cause of action, in some embodiments.

In various embodiments, conditions and values can be used in concert with each other. Aggregate scores (after adding scores to all responses on an intake questionnaire 120, 121, and 122) result in directed actions 128, 129, and 130 if a score is achieved, or if a score is not achieved, in various embodiments. These actions are human actions in some embodiments (e.g., phone call by a secretary to the potential client, phone call by an attorney to the potential client, arrange an appointment, send a letter accepting or declining a potential client, etc.), and automated actions in other embodiments. The automated actions can be, for example, sending an email or fax to the potential client accepting or declining the potential client. Sending an email or fax every 30 days or some other amount to time (e.g. for marketing or to remain in contact), creating a document or video, causing a message to appear or a window to pop up on an intake clerk's monitor, changing data in a field in the database, calling a potential client and sending an automated message, sending an engagement agreement or non-engagement letter by email or fax, or printing a document for mailing. Alternatively, the automated action could be emailing a calendar invitation for a personal meeting or phone conference. Other automated actions are possible using the system 10.

In some embodiments, the phone number of a potential customer is detected using caller ID information, and for phone numbers that are not mobile phone numbers, a screening score is assigned based on the general geographic area associated with the phone number. For example, in a certain city, land lines have different prefixes in different parts of a city. It may be more desirable to accept a client from a more affluent area of the city because they would have a greater ability to pay bills or because damages due to loss of wages may be higher. Thus, a positive score may be added for callers from affluent areas of the city and they may vary depending on how affluent the different areas are perceived to be.

Mobile phone callers can be from any geographic location so mobile phone numbers are not assigned a score. Mobile phone numbers are identified by the prefixes of the mobile phone numbers in conjunction with the area codes of the mobile phone numbers.

FIG. 7 illustrates a screen 200 including a questionnaire 202 in accordance with various embodiments. The term "screen," as used in the context of FIGS. 7-18B, is meant to encompass portions of screens, windows, pop-up windows, or other forms of graphical user interfaces, and is not intended to necessarily mean the entire display area of a monitor. The questionnaire 202 includes one or more questions 204, 205, 206, and 207. The questionnaire 202 further includes fields 208, 209, 210, and 211 in which an intake clerk can enter responses while talking to a potential client on the phone. Based on the responses entered by the intake clerk, a score or index 214 is calculated by the server 12 (FIG. 1) that corresponds to the desirability of the potential client. The score 214 is displayed on the screen 200.

In the illustrated embodiment, the screen 200 also displays, in an area 216, summaries of questions and answers. In the illustrated embodiment, the screen 200 also displays the time and date 218 when the intake record was created, and includes fields or elements through which the intake clerk can enter or select a case number, a disposition or recommended action 222, whether an attorney live call has taken place 224, whether an admin follow up has taken place 226, whether the firm wants this client 228, whether there is no charge for a consultation 230, etc. Other information or fields can be provided for other types of businesses. In the illustrated embodiment, the intake clerk may also add attachments (e.g., scanned copies of notes) by actuating an area 232 of the screen 200, or may add notes after actuating an area 234 of the screen 200. In some embodiments, the screen 200 can be revisited after an intake has taken place and elements 220, 222, 224, 226, 228, 230, 232, and 234 can be changed. The screen 200 also includes menu or navigation elements 236, 237, 238, 239, and 240, through which the screener may bring up different screens. In the illustrated embodiment, the elements 236, 237, 238, 239, and 240 include pull-down menus. The screen 200 also includes an element 242 for deleting the intake questionnaire and an element 244 for printing the intake questionnaire. Printing could be useful after the questionnaire has been filled or partially filled. In some embodiments, the screen 200 also displays an "Intake Locked" popup warning 246. This is a message sent to the workstation 28 in FIG. 1 as a server side event (SSE) notification. Other screen elements are possible.

Figure 8:
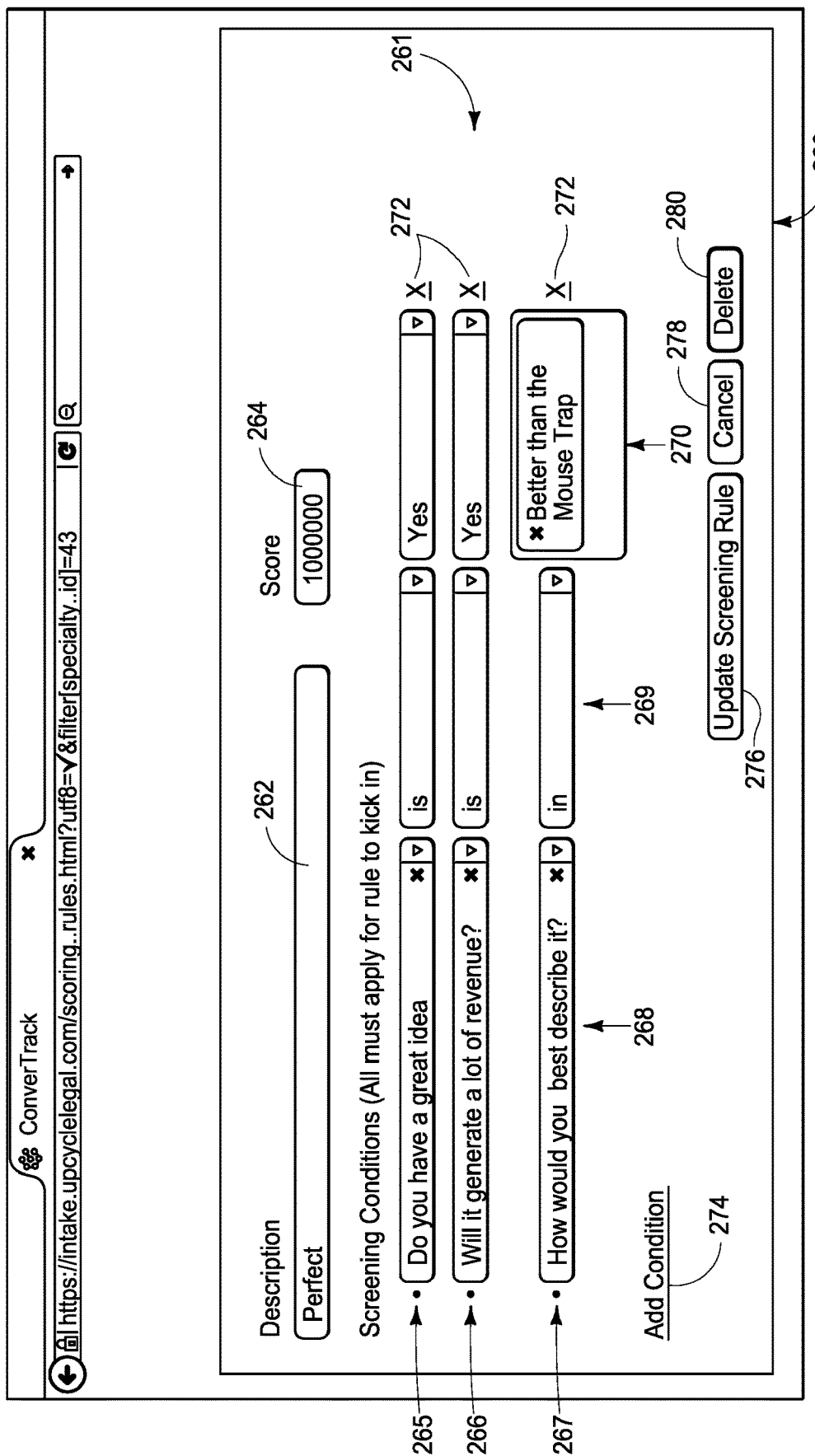
FIG. 8 is a screen shot illustrating a graphical user interface for viewing or editing a screening rule or intake scoring model for the intake questionnaire of FIG. 7, in accordance with various embodiments.

FIG. 8 illustrates a screen 260 for viewing or editing a screening rule 261 of the intake questionnaire of FIG. 7. In the illustrated embodiment, the screen 260 includes a field or element 262 in which an administrator can enter or change the name of the rule, a field or element 264 in which the administrator can enter or change a score if all the conditions of the rule are met, and screening conditions 265, 266, and 267 which must all be met for the score of 264 to be applied. The conditions 265, 266, and 267 are each made up of questions 268, matching operators 269, and matching answer value(s) 270. In the illustrated embodiment, the conditions can be changed using pull down menus. The screen 260 further includes elements 272 for deleting conditions, an element 274 for adding a condition, an element 276 for updating the screening rule 261 (after edits have been made), an element 278 for cancelling edits, and an element 280 for deleting the rule 261. In various embodiments, a rule 261 may have only one condition or may have multiple conditions.

Figure 9:
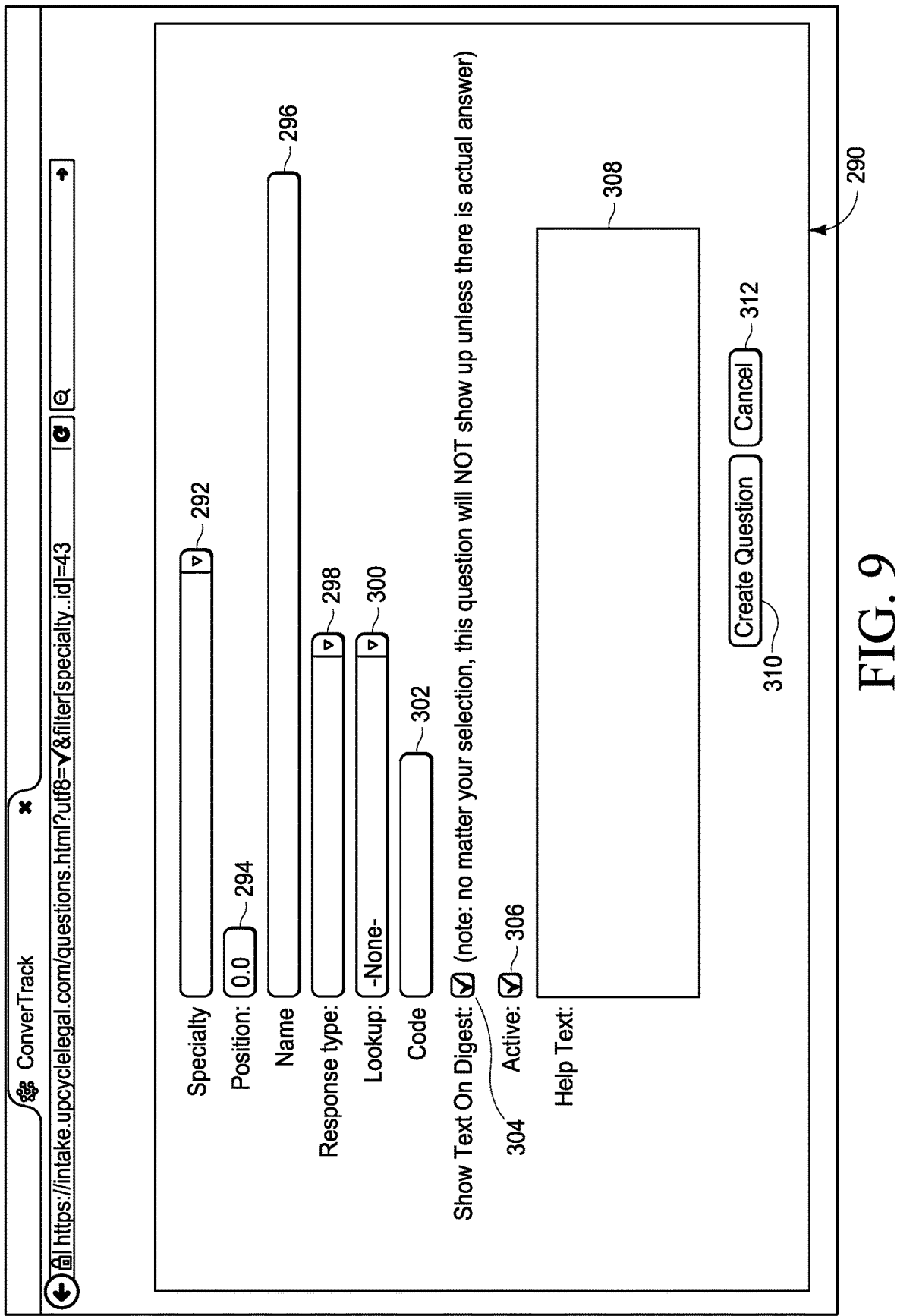
FIG. 9 is a screen shot illustrating a graphical user interface for adding a question to the rule of FIG. 8, in accordance with various embodiments.
Figure 10:
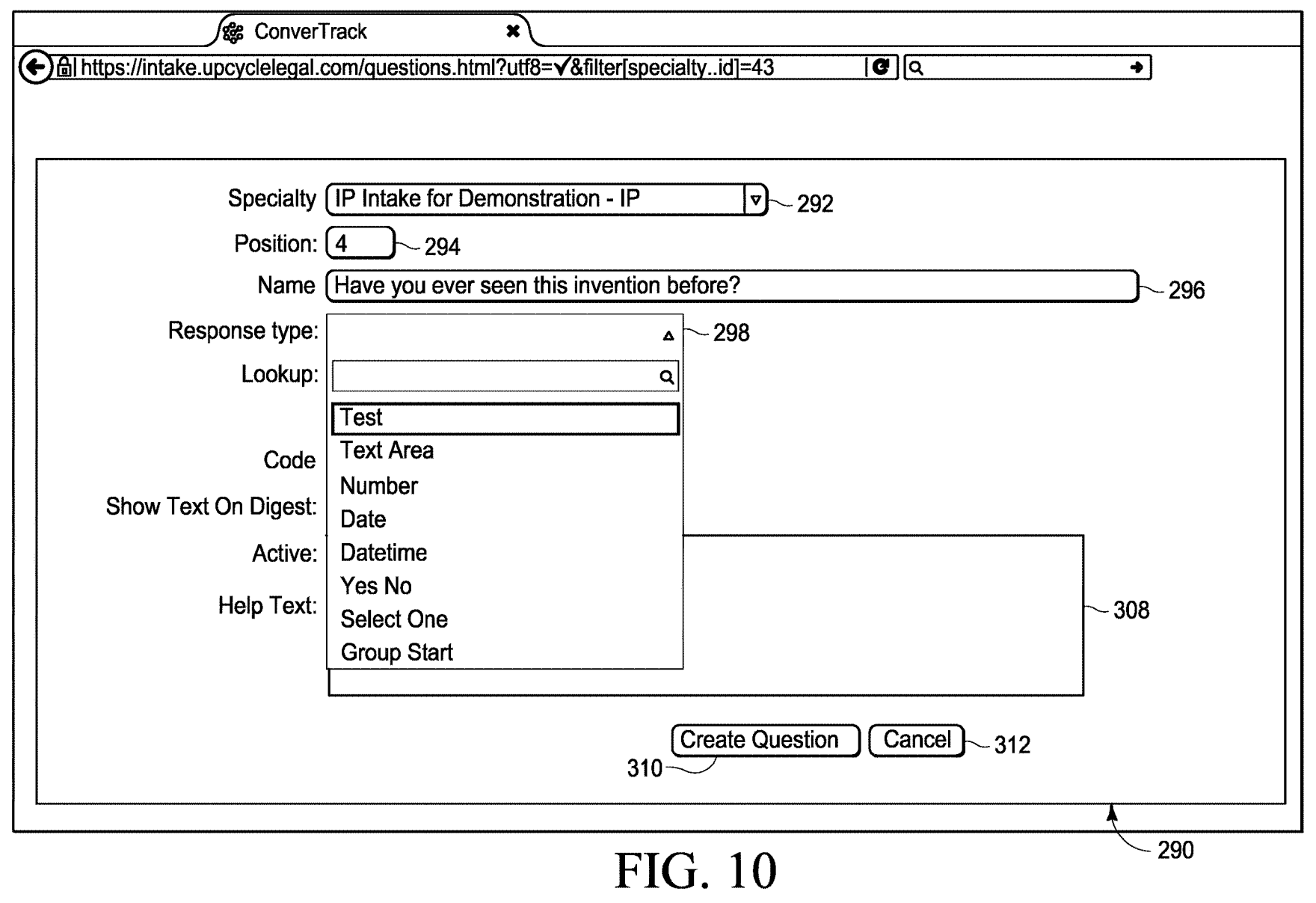
Figures 16, 16A:
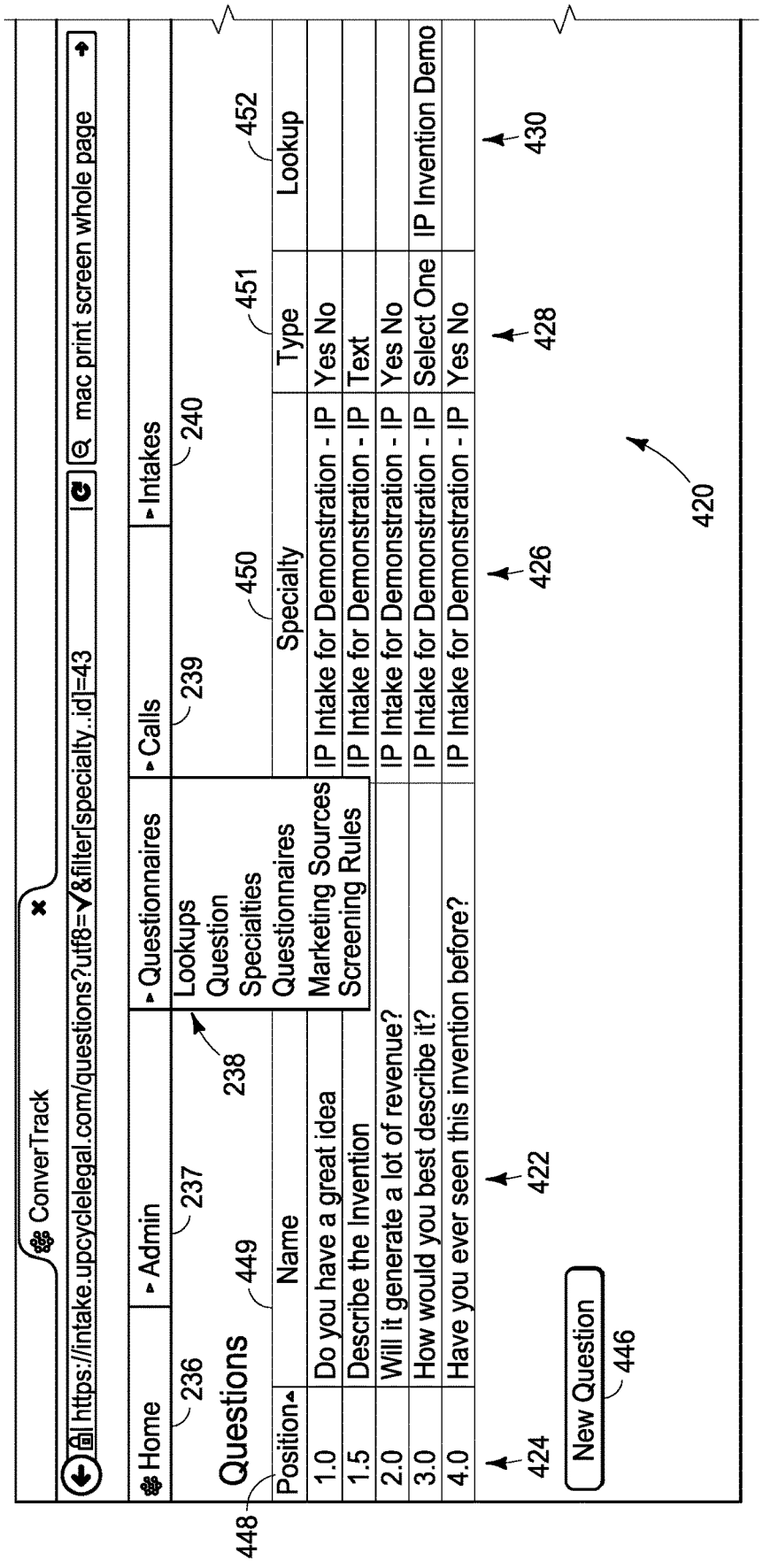
FIG. 16 is a map illustrating how
FIGS. 16A and 16B are to be assembled.
Figure 16B:
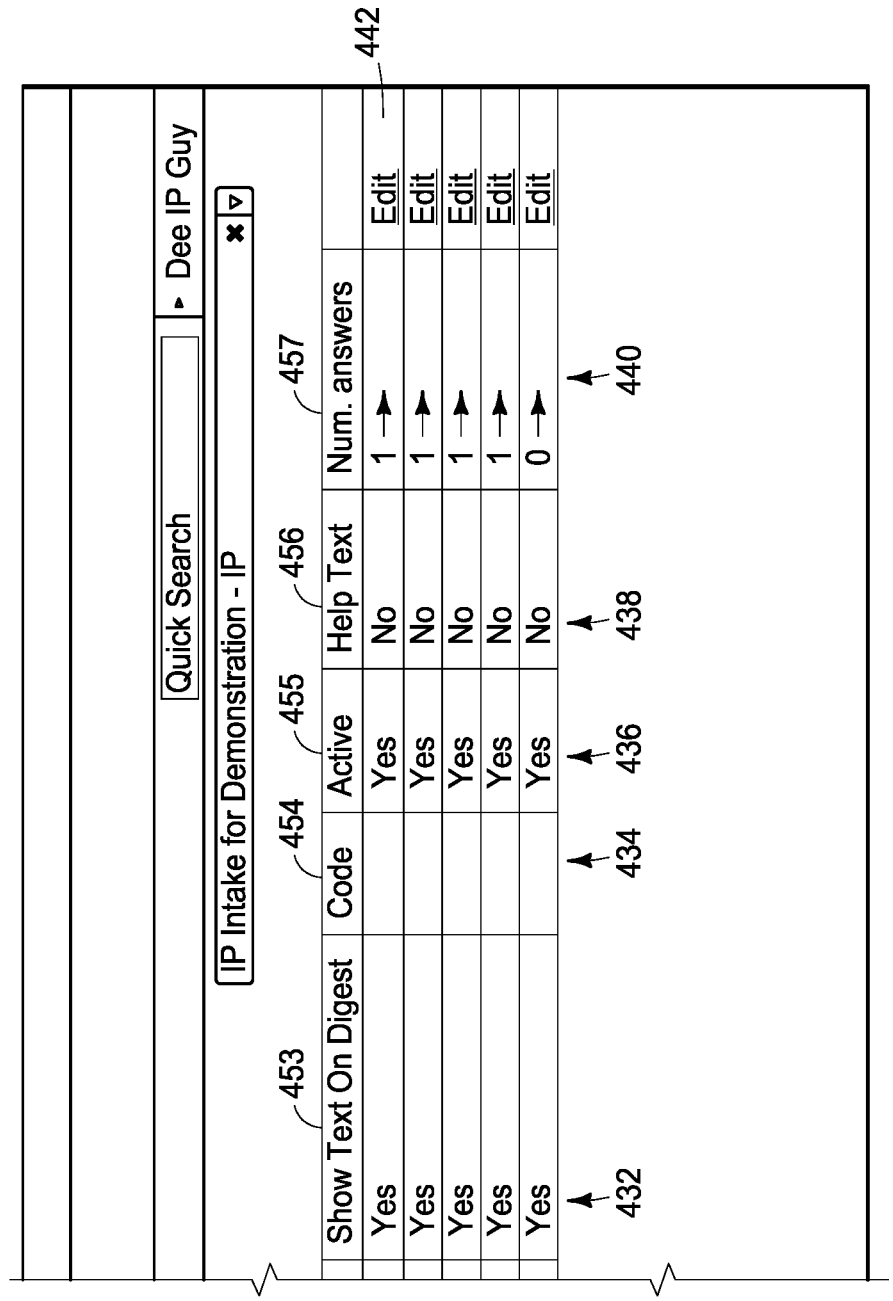

FIGS. 9 and 10 illustrate a screen 290 for adding a question to the list 420 of FIG. 16A, such as after actuating screen element 446 of FIG. 16A. The screen 290 includes an element 292 for indicating a specialty area. The element 292 is a pull down menu in various embodiments. Different legal specialties are likely to require different questions for screening potential clients or customers. Different legal specialties may have different bar dates, for example. A client that may be time barred for one specialty may not be for another. In some embodiments, multiple different law firms can access questions for a particular legal specialty. In other embodiments, law firms can only access their own questions but may have their own different specialty areas, each with different questions. The screen 290 further includes a field or element 294 in which the administrator can indicate the position for the question within a list of questions. It may be more logical to place the new question in between existing questions than at the end of the list. For example, if it is desired to place a new question between the first question and the second question of FIG. 16A, the administrator may enter 1.5 or 1.1 in the field 294.

The screen 290 further includes a field or element 296 in which an administrator enters a name for the question. The text entered in this field will correspond to a question 268 of FIG. 8. The screen 290 further includes an element 298 with which an administrator indicates a response type. The element 298 is a pull down menu in the illustrated embodiment.

The response type could be, for example, text, number, date, date and time, yes/no, select one, or other types (see FIG. 10). The screen 290 may further include other items such as a lookup element 300, an element 302 for entering a code name or number for the condition, an element 304 for indicating whether the text should be shown in a digest, an element 306 for indicating whether or not the question is active, and a field or element 308 in which an administrator can provide help text to explain the question when displayed on the intake questionnaire. The screen 290 further includes an element 310 which, when actuated, creates the new question. The screen 290 further includes an element 312 which, when actuated, cancels the creation of the new question.

Figure 11:
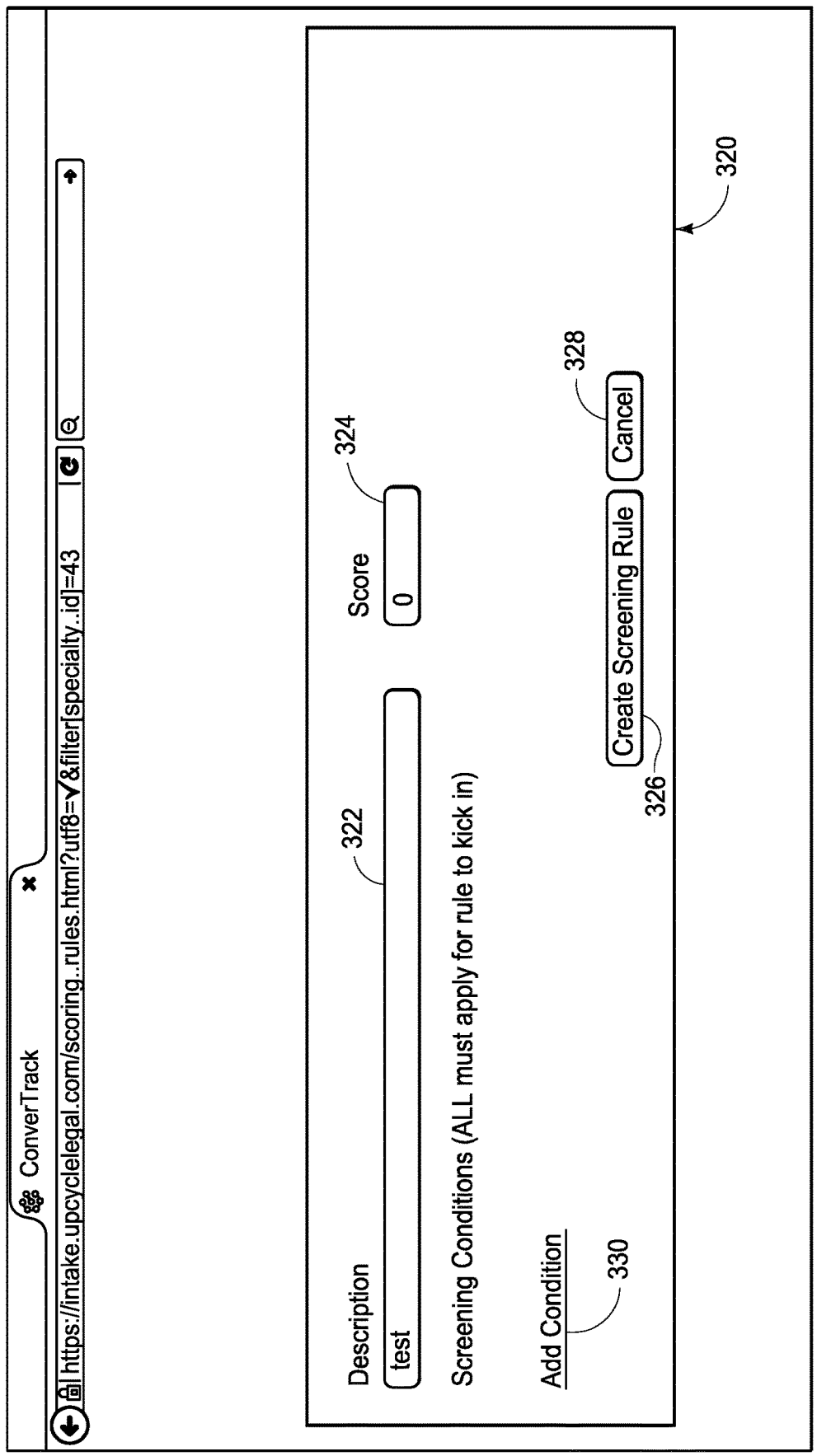
FIG. 11 is a screen shot illustrating a graphical user interface for creating a new screening rule, using the system of FIG. 1, in accordance with various embodiments.
Figure 12:
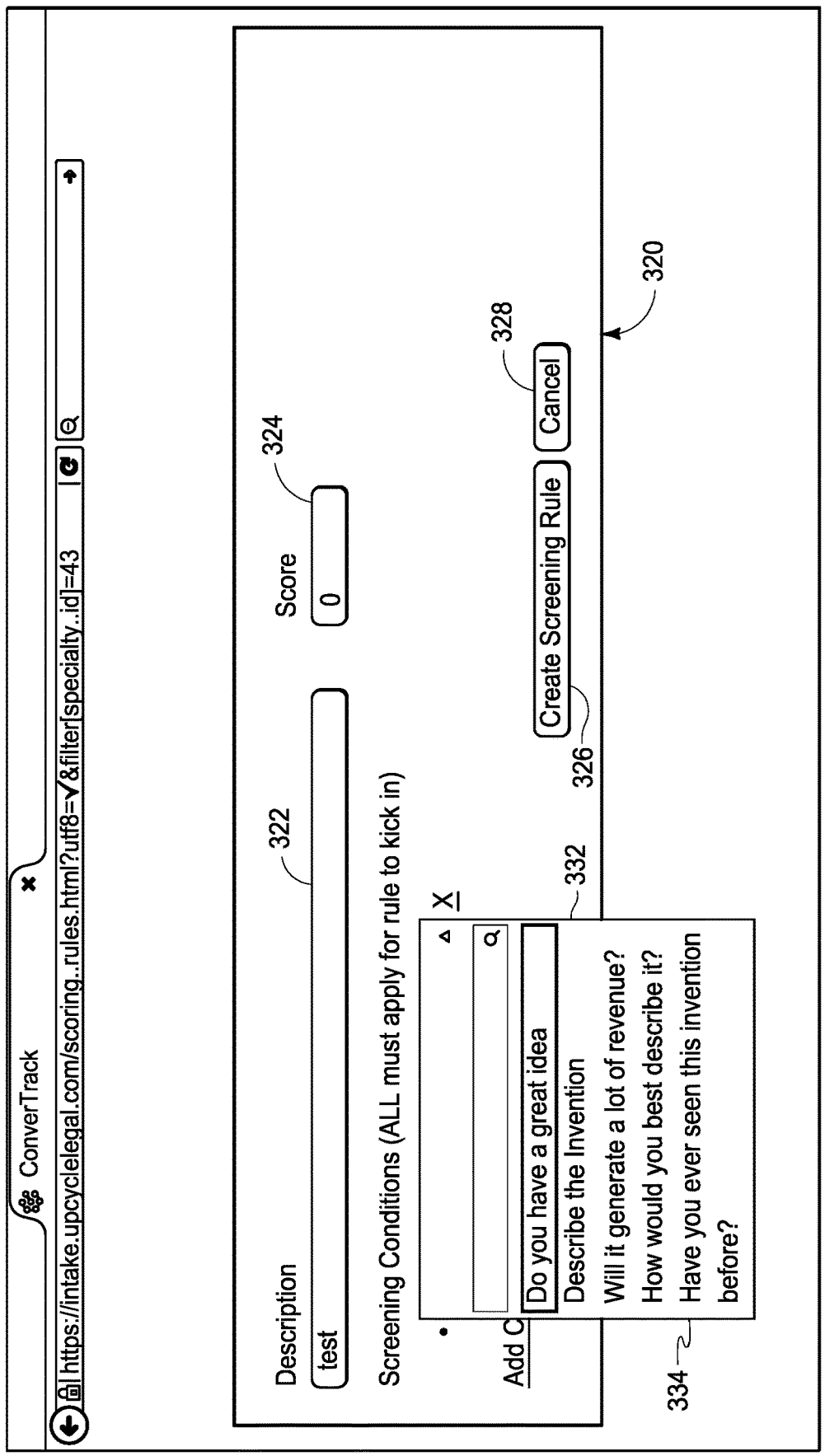
FIG. 12 is a screen shot illustrating the graphical user interface of FIG. 11 after an "add condition" element of FIG. 11 has been actuated, in accordance with various embodiments.
Figure 13:
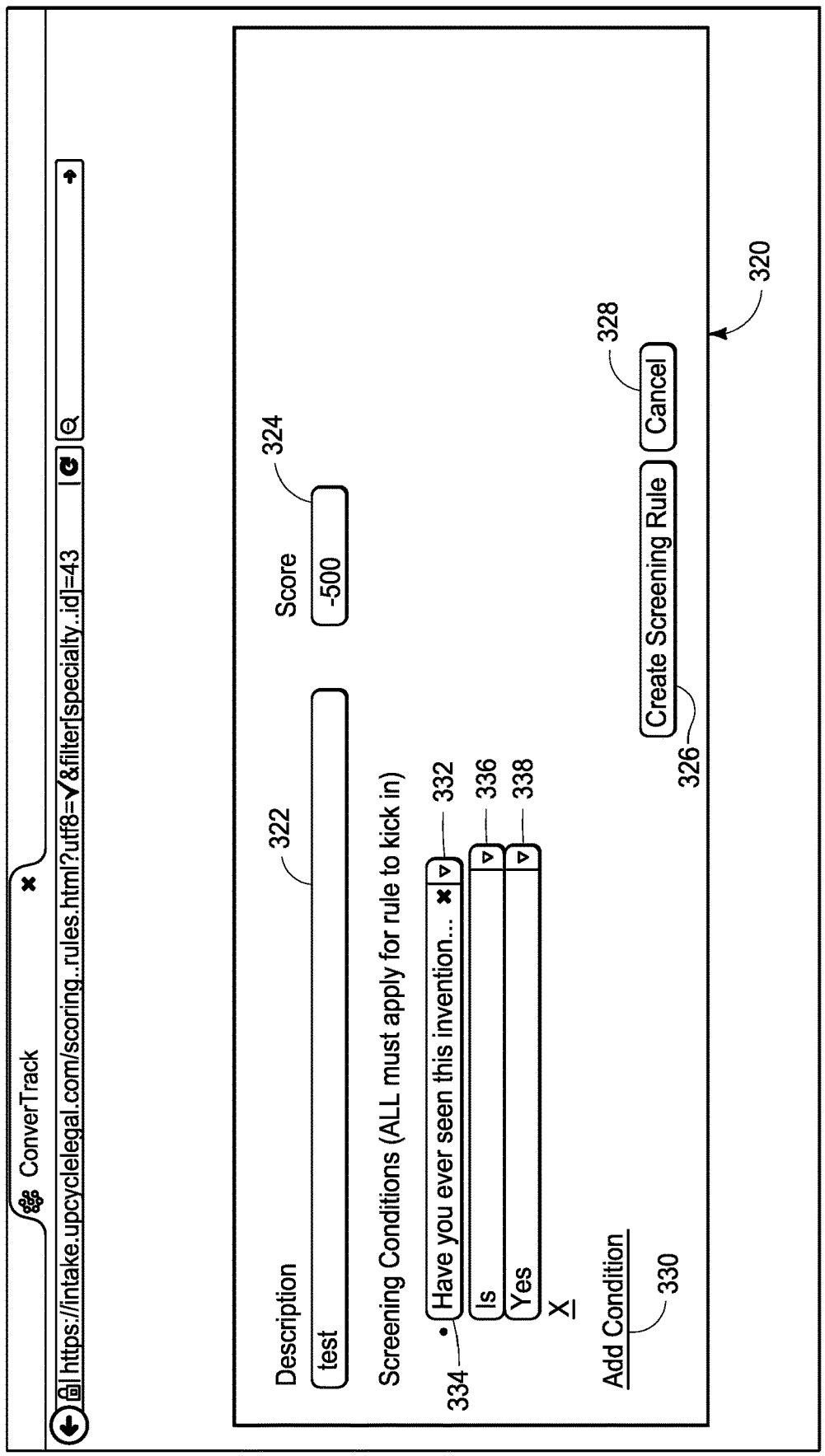
FIG. 13 is a screen shot illustrating the graphical user interface of FIG. 12 after a question of FIG. 12 has been selected, in accordance with various embodiments.

FIGS. 11-13 show a screen 320 for creating a new rule similar to the rule 261 of FIG. 8. The rules each contain conditions such as those shown in FIG. 8. In the illustrated embodiment, the screen 320 includes a field or element 322, which is the same as the field 262 of FIG. 8, in which an administrator can enter the name of the new rule. The screen 320 further includes a field or element 324, similar to field 264 of FIG. 8 in which the administrator can enter or change a score if all the conditions of the rule are met. The screen 320 further includes an element 326 for creating the screening rule, an element 328 for cancelling edits, and an element 330 for adding a condition to the screening rule.

When the element 330 is actuated by an administrator, an element 332 (see FIG. 12) appears from which the administrator can select a question from a list of questions. In the illustrated embodiment, the element 332 is a pull down list.

After a question (e.g., question 334) is selected from the element 330, elements 336 and 338 appear (see FIG. 13), in the illustrated embodiment. Using the element 336, the administrator can set an operator and using the element 338, the administrator can set an answer. Elements 332, 336, and 338 define a condition. The administrator may add an additional condition to the rule by actuating element 330, then may add further conditions. Note that the score entered into the field 324 may be negative. For example, if a potential legal client or customer answers certain questions in a certain way, their legal matter may not be a good matter to accept. After all conditions have been defined, the administrator may create the rule by actuating element 326.

Figure 14:
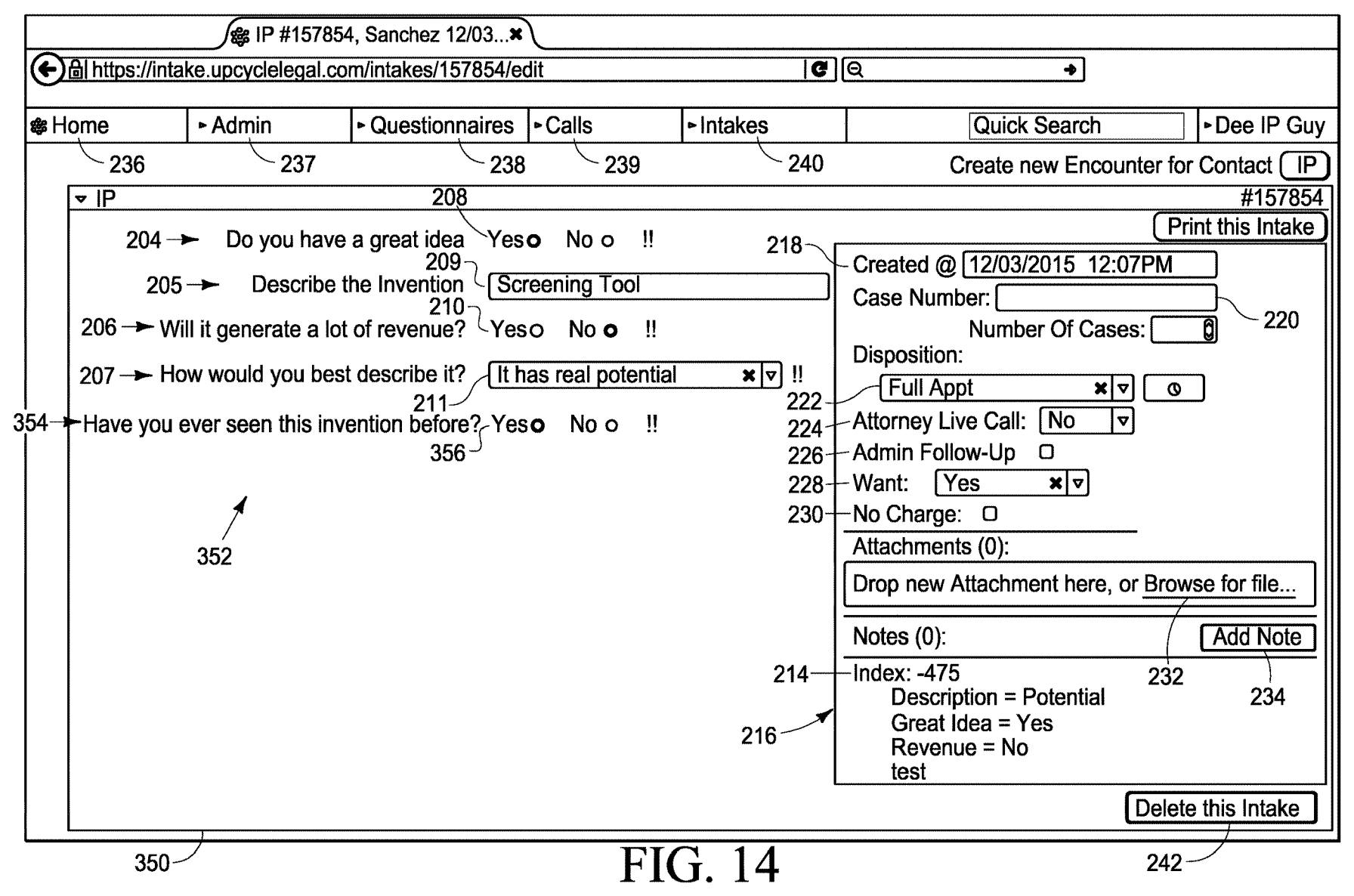

FIG. 14 illustrates a screen 350, similar to the screen of FIG. 7. The screen 350 includes a questionnaire 352 in accordance with various embodiments. The questionnaire 352 includes questions 204, 205, 206, and 207, as well as a new question 354 resulting from addition of a question as shown in FIGS. 9-10, and element 356 through which a screener can enter an answer to the question 354.

Figure 15:
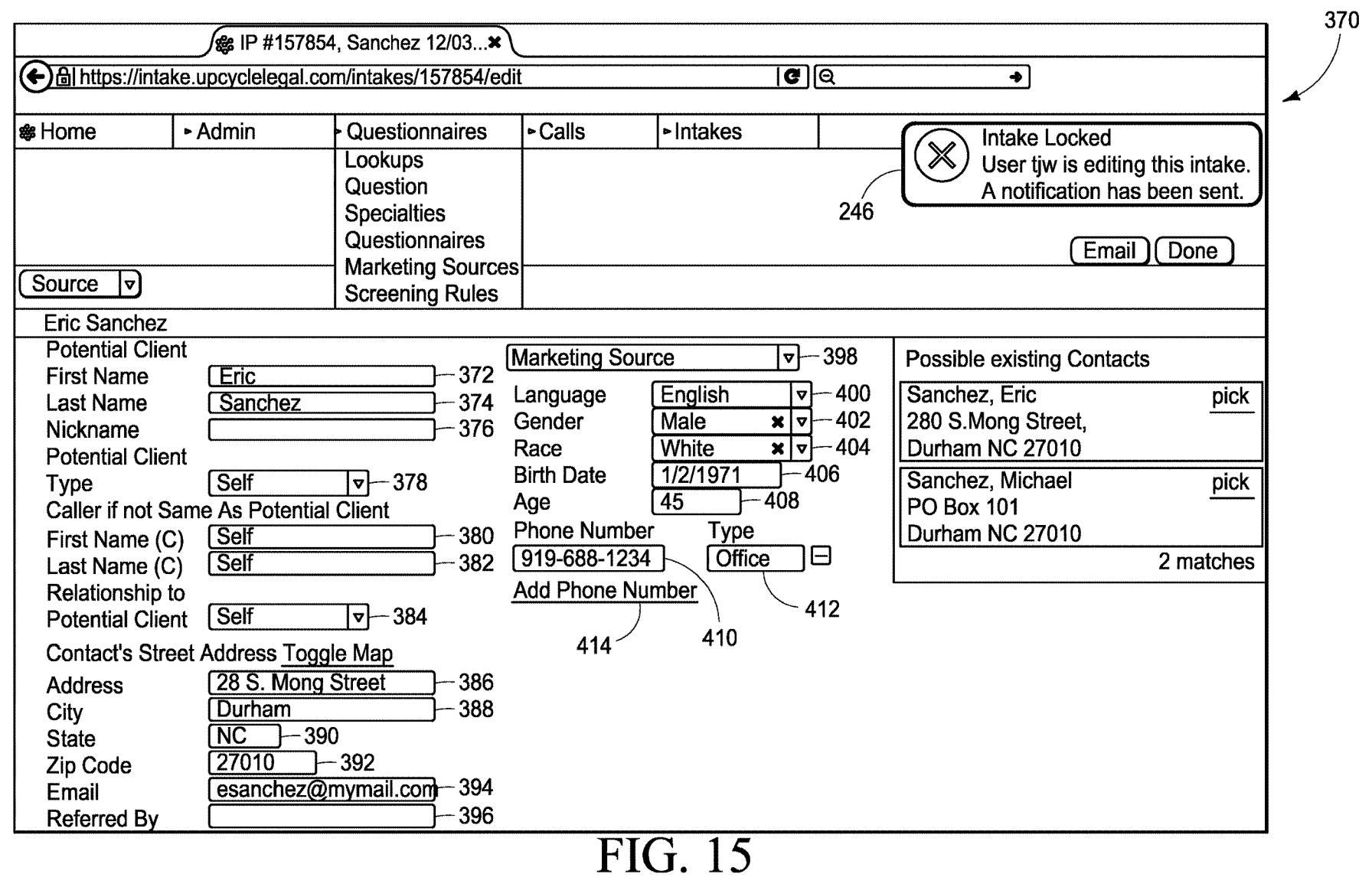

FIG. 15 illustrates a screen 370 which a screening clerk uses to capture personal details about a potential client. The questionnaire 352 of FIG. 14 is associated with a particular potential client. In some embodiments, screen 350 of FIG. 14 is reached by scrolling below the screen 370 (e.g., they are portions of a common page). In the illustrated embodiment, the screen 370 has a field or element 372 which a screening clerk uses to enter a potential client's first name, 374 to enter the potential client's last name, and 376 (optional) to enter the potential client's nickname. The screen 370 further includes an element 378 for recording the client type (e.g., individual or referral source or relative), elements 380, 382, and 384 for recording the first name, last name, and relationship of the person calling to the potential client (if not the client himself or herself). The screen 370 further includes fields or elements 386, 388, 390, 392, and 394 for recording contact information for the potential client, such as street address, city, state, and zip code, and email address. The screen 370 further includes a field or element 396 for recording a referral source, if there is one, and 398 for recording a marketing source (e.g., the caller called a phone number advertised on TV, radio, Internet, direct mail, etc.). The screen 370 further includes an element 400 for recording the potential client's language, 402 for the potential client's gender, 404 for the potential client's race, and 406 for the potential client's birth date. The screen 370 can include a field 408 for recording the potential client's age, or age can be calculated based on the potential client's birth date. The screen 370 further includes a field 410 for recording the potential client's phone number. The phone number is entered by a screening clerk in some embodiments. In some embodiments, the phone number from caller ID information is displayed at the top of the form for informational purposes and is captured and stored for the call associated with the intake. The screen 402 further includes an element 414 which, when actuated, brings up a field for adding another phone number. The screen 402 further includes an element 412 for indicating a phone type (e.g., office phone, home phone, mobile phone). Different or additional contact information could be included in the screen 402.

FIGS. 16A and B, when placed side by side, illustrate a screen 420 for viewing, adding, or editing questions or conditions such as the one created in FIGS. 9 and 10, and used in connection with the screening rules of FIGS. 11-13. In the illustrated embodiment, before being able to select a question with element 332 (see FIG. 12), the question must already have been created, such as by using the screen 420. The screen 420 includes a list 422 of questions. In the screen 420, for each question there is associated information such as position 424, specialty 426, type 428, lookup information 430, code 434, a flag 436 indicating whether the question is active, a flag 438 indicating whether or not there is help text associated with the question, and number 440 of answers, in various embodiments. Other than the questions, some or all of the associated information is optional, in some embodiments. In the illustrated embodiment, it is possible to sort or reverse sort the questions 422 (e.g., alphabetically) or on any of the associated information items 424, 426, 428, 430, 432, 434, 436, 438, and 440, such as by actuating a column header 448-457 or by actuating the column header a second time to reverse the sort order. In the illustrated embodiment, the screen 420 further includes an element 442 for each question through which the administrator can edit the question, as well as an element 446 through which a new question can be added. FIGS. 16 and B also illustrates one of the navigation elements 238 expanded as a pull down menu.

FIG. 17 illustrates a screen 470 for viewing, adding, or editing the screening rules of FIGS. 11-13. The screen 470 includes a list 476 of descriptions or names of screening rules. In the screen 470, for each question there is associated information such as specialty 474, screening condition 472, and score 478, in various embodiments. Other than the descriptions or conditions, some or all of the associated information is optional, in some embodiments. In the illustrated embodiment, it is possible to sort or reverse sort on the descriptions 476 (e.g., alphabetically) or on any of the associated information items 474, 472, 478, and 480 such as by actuating a column header 488, 490, 491, and 492 or by actuating a column header a second time to reverse the sort order. In the illustrated embodiment, the screen 470 further includes an element 482 for each screening rule for which the administrator can edit the rule, as well as an element 486 through which a new screening rule can be added. For example, in the illustrated embodiment, if the element 486 is actuated, the screen of FIG. 11 is brought up. In the illustrated embodiments, the screen 470 further includes an element 496 which, if actuated, causes a download of screening rules to begin, such as in comma separated value format. In the illustrated embodiments, the screen 470 further includes an element 498 which, if actuated, causes a download of condition details to begin, such as in comma separated value format FIGS. 18A and B, when placed side by side, show a screen 502 for displaying or searching through calls received by the system of FIG. 1, and for starting intake questionnaires for specific calls. In some embodiments, the PBX 14 assembles information about calls and passes the information to the OAI Listener 18 in server 12. In some embodiments, OAI or call metadata is collected which allows the intake form 370 (FIG. 15) to read the metadata.

In the illustrated embodiment, the screen 502 includes information about a list of calls including the time and date when the call started 504, the phone number 506 that the caller dialed, the time and date 508 when the call was picked up, the station 510 that answered the call, the duration 512 of the call, the phone number 514 of the caller, the caller ID information 516 of the caller, and the OAI call ID 518. More or less information could be provided. In the illustrated embodiment, the screen 502 further includes, for each call, an element 519 which, when actuated, brings up an intake form (e.g., FIG. 15 plus FIG. 14). The intake form may already be filled or partially filled. In various embodiments, information about outgoing calls is also collected and can be displayed on a screen. Various elements are included for sorting through incoming phone calls, in the illustrated embodiment. For example, using an element 520, calls can be selected for a particular incoming phone line (which may be associated with a particular client); using an element 522, calls can be selected having a particular status; and using element 524, calls can be selected that were not answered or that were answered or both. Using elements 526 and 528, time ranges for when calls started can be specified. Using element 526, calls can be selected that started on or after a certain time, and using element 528, calls can be selected that started on or before a certain time. A range can be specified by using both elements 526 and 528. In various embodiments, the server 12 (FIG. 1) is linked to the PBX 14 such that if a user actuates on an internal or external person's name from one of the screens described above, their phone or workstation will call that person.

In some embodiments, the server 12 (FIG. 1) is able to differentiate between administrators and intake clerks (customer service representatives), such as based on login credentials. A user, designated as the administrator ("Admin") has elevated permission levels to manage the screening tool 78 (FIG. 3). For example, in some embodiments, the intake clerk is able to fill intake questionnaires, add notes to intakes, change intakes, but is not able to create or edit a screening rule. In these embodiments, only an administrator is able to create or edit a screening rule. Thus, the administrator has elevated permission to manage the system 10 (FIG. 1). In some embodiments, the administrator has the ability to create and define roles for various users such as intake clerks or other users, in a manner defined by the administrator. In some embodiments, data patterns identified by the administrator are presented to users of defined roles upon login, in a manner defined by the administrator. The presentation of data can be in list form or other means of visualization such as charts or graphs.

In some embodiments, data as well as direct user input is collected in real time by the server 12, with an active audit trail. The server 12 stores data entered or changed by intake clerks, administrators, and maintains old versions. If data is changed incorrectly, it is possible to determine which user made the change and when it happened. In some embodiments, an automated snapshot of collected data is taken every so often (e.g., every 24 hours), so that there is a historic record.

Thus, systems and methods have been provided that allow a quicker decision on whether or not to accept a client. When a quicker decision is made, there is a higher conversion rate. If a decision is not made quickly, the potential client (or customer) may go to another law firm (or service provider), lose interest, or take some other action.

While presented above in the context of being a tool for selecting a client or customer, the screening tool 78 has other applications. For example, in some embodiments, the screening tool is used to evaluate the value of a product. In some embodiments, a certain demographic may be more likely to buy a certain product. If a customer has a certain score, they are shown a certain product in advertising. For example, customers with average incomes living in snowy locations may receive a score indicating that they should be shown advertising for snow blowers while customers with scores indicating that they live in warm clients would be shown advertisements for lawnmowers.

The screening tool 78, by allowing programming by users, reduces the total number of lines of code required. A much larger amount of code would be required to program for every possible scoring alternative or even for a large number of scoring schemes. In addition, by increasing paralegal efficiency, the screening tool 78 reduces the number of paralegals required along with a corresponding number of workstations.

To better enable one of ordinary skill in the art to make and use a screening tool without undue experimentation, pseudo code will now be provided that could be employed in some embodiments. This is provided as an example, only. The screening tool could be built in other ways and still achieve the desired functionality.

Intake Question Scoring Rules and Conditions Administration

Background

Each Intake belongs to a "Specialty", e.g. Auto or WC

Each intake Specialty has a set of questions (collectively known as the intake questionnaire)

Scoring Rule Administration

Select a Specialty

Click button to Create Scoring Rule

Give the rule a name or description and a numeric score

Add one or more Conditions

Note: ALL conditions must apply for rule to kick in

Offer a list of questions (for the specialty) to select to which this rule will apply Depending on the type of question, present match options:

In or Not in

If question type is text, get a text answer

If question type is a select, with options, show the options that can be selected Is or Is not Within or Not Within days (date range)

before (select list of other Date questions for the specialty)

(use <0 for "days after"; e.g. "−10 . . . . Infinity" is valid)

```
        <other question types>
            <details>
Intake Answer Automatic Scoring Process
    Intake create (or edit)
        Initialize auto saving
            Javascript JQuery.on ("change") event handler
            POST input params to the server on each input value
                change via AJAX
    Enter answer input field
        Edit answer value
        Auto save on input change
        Auto save post action triggers the Intake model update
    Intake model
        Update action/method
            answers_attributes received in update and set on the
                model
            update attributes triggers a save (to the database)
            save triggers registered callbacks
        before_save callback
            calls: set_score method
        set_score method
            sets the intake (self) score by calling the ScoringRule
                model score_for method
    ScoringRule model
        score_for method
            input parameter is the intake
            calls applicable_to method
        applicable_to method
            input parameter is the intake
            Calls candidates_for_intake scope
                candidates_for_intake scope
                    Returns all the ScoringRule records in the data-
                        base that apply to any of the questions for the
                        intake:
                        Collect the answers that exist for the intake
                        Collect the associated questions for those
                            answers
                        Collect the scoring_rule_conditions that exist
                            for all of those questions
                        Collect and return all scoring_rules for the set
                            of scoring_rule_conditions
                    For each scoring_rule that candidates_for_intake
                        returns:
                        Collect the rules that "match" the intake (see
                            match below)
                    Sum the scoring_rule scores for those that "match"
        match? method
            Input parameter is the intake
            The scoring_rule is a match, or applies to the intake,
                if *ALL* of the scoring_rule_conditions for the
                rule match
            (See ScoringRuleCondition match method)
    Scoring RuleCondition model
        match? method
            input parameter is an answer
                answer belongs_to the intake
                answer also belongs_to a question
                The condition belongs to a question
                The answer must belong to the same question as
                    the condition
                The answer value must equal the condition value
                    or match one of a set of condition values
                    or falls into the condition range (for dates and
                        numbers)
    The resulting score is saved in the intake
        Note: The Scoring Rule score_for method essentially
            re-calculates the intake score for ALL rules after
``` every individual answer is updated. Thus, any other rule that could be co-dependent on the answer being updated is also considered.

```
#Scoring Rule class code
class Scoring Rule <ActiveRecord: Base
    has_many: scoring_rule_conditions, inverse_of:: scor-
        ing_rule, dependent:: destroy
    scope: candidates_for_intake,-> (intake) {
        joins (: scoring_rule_conditions).where ('scorin-
            g_rule_condition.question_id'=>
    intake.answers.pluck (: question_id)).uniq
    }
    def match? (intake)
        #for each scoring_rule_condition there is a matching
            answer
        scoring_rule_conditions.all? {|c|
            intake.answers.detect {|a| c.match? (a)}
        }
    end
    def self.applicable_to (intake)
        candidates_for_intake (intake).includes (: scorin-
            g_rule_conditions=>: question).select {|rule|
            rule.match? (intake)
        }
    end
    def self.score_for (intake)
        self.applicable_to (intake).map (&: score).inject (&:
            +)
    end
end
```

Thus, systems and methods have been provided for a user to develop and define their own scoring values to define complex systems for decision-making. In some embodiments, the systems and methods can be used to evaluate legal causes of action and to decide whether or not to accept a client. Alternatively, the systems and methods can be used for other applications that require decision-making based on a number of input parameters.

Without the screening tool, a human would have to review each Intake and assign a value based on rules. Alternatively, a programmer would have to manually write code to express each rule and condition, and to perform the test. Additionally, the programmer would be faced with "hard coding" references to the intake questionnaire questions, thereby making the resulting code brittle and subject to breakage when and if questions were added, updated, or deleted. This quickly would become unruly code and un-maintainable.

Consider for example a very straightforward screening rule named "Passenger?" that applies a weighting value to an intake depending on whether or not the potential client was a Passenger in an Auto accident.

Without the screening tool, a programmer would have to write code to test this single rule and condition. This pseudo code would look something like this:

IF the intake questionnaire has the question named "Were you the Passenger, Driver, or Pedestrian?" THEN;
IF the answer equals "Passenger" THEN add 25 to the intake score value;
END IF Another Auto intake rule named "Date of first treatment less than 2 weeks", that has two conditions (A and B) where the pseudo code would look something like this:
Condition A would be:
True IF AND ONLY IF the intake questionnaire has the question named "Were you the Passenger, Driver, or Pedestrian?"

AND the answer equals "Driver" or "Passenger" or "Pedestrian" THEN

Condition B would be:

True IF AND ONLY IF the intake questionnaire has the question named "Date of first treatment"

AND the answer date is greater than 6 days of the date supplied in response to the "Intake Date" question AND the answer date is less than 13 days of the date supplied in response to the "Intake Date" question IF A and B are true THEN add score value 10 to Intake score.

Multiply the code fragments above by, for example, over 120 rules and it becomes apparent that this would be a burdensome task with hard to maintain code.

Various embodiments provide a server 12 as shown in FIG. 2 that defines a case management or customer relationship management system 1704 (see FIG. 53) (and may or may not include screening rules and functionality).

In various embodiments, the screening tool 78 is one component of a larger case management system 1704 that runs on the server 12. In some embodiments the larger case management system is one that tracks contacts with clients and prompts professionals to keep in contact with the clients and others to more quickly reach a disposition of a matter. The case management system is illustrated in a legal environment, but could be employed in any enterprise that tracks data for customers or clients, such as professional services, etc. In some embodiments, the case management system 1704 receives and stores intake details about a legal matter, and perform case management functions such as storing contacts, managing workflow, tracking timelines, generating documents, automatically calculating dates when tasks should be performed, and allowing and storing communication between attorneys in a firm. In some embodiments, the case management system provides functions such as those possible using Abacus Law, Amicus Attorney, Needles, Time Matters, Clio, MyCase, or similar case management systems, client management systems, or customer relationship management (CRM) systems such as Microsoft Dynamics or Salesforce. Alternatively, the case management system may be separate from the screening tool 78. In various embodiments, the case management system provides functions as will now be described.

The logic tool of the invention evidenced in screening tool 78 is the foundation for other case management tools in the case management system such as a multitude of checklists 1706 (FIG. 53) and a multitude of dashboards 1709 (FIG. 53).

The case management system 1704 provides checklists 1706 in some embodiments. In the context of a checklist 1706, the logic statements are reflected in a checklist. The checklist 1706 comprises a set of reminders designed to drive work flow for a particular type matter. One reminder comprises a single task. Each reminder is its own logic statement, in various embodiments. A matter may comprise any number of checklists and each checklist may contain any number of reminders. Certain types of matters may have default checklists in some embodiments, that can be edited if desired. Logic statements in the checklist contain a multitude of parameters. For example, a logic statement can be associated with a particular case type, or a particular entity involved in the case, (e.g., Case, Record Request, Insurance Policy, Involvement, Note contents, etc.). In addition to associations, top-level logic statements are configured to further refine when a reminder shows within an individual case. The logic statements which create the reminder are configured with multiple levels of logic. The logic statements are created by a user or administrator by utilizing the logic tool to select filters and triggers without the need of programming knowledge or need for hard coding. For example, the logic statement can dictate that a reminder appears to the user when the prescribed logic is fulfilled. Further logic factors on the reminder are configured to repeat the reminder over X number of days, when additional logic conditions are met, and be associated with a merge document which can be presented to the user automatically after the logic conditions are met.

FIGS. 19A and B, when placed side by side, illustrate a screen 550 listing a plurality of specific checklists 552-566. There could be more or fewer checklists defined by a user. For each checklist 552-566, the screen 550 shows a client name 570, a user-definable checklist name 572, a check type 574 selectable from a plurality of predetermined alternatives, filter conditions 576 summarizing what logic is used to find items to be included in the checklist, a counter 578 (see FIG. 20B) showing the number of checklist items, and an element 580 (see FIG. 20B), a hyperlink in the illustrated embodiments, which, when actuated, allows the checklist to be edited. More, fewer, or different items could be included in the screen 550.

The screen 550 further includes an element 582, a pull down menu in the illustrated embodiments, through which the type of checklists shown can be changed. The different types of checklists, in the illustrated embodiments, include Case checklists, Record Request checklists, Insurance Policy checklists, Involvement checklists, and Note checklists. FIGS. 20A and 20B illustrate the graphical user interface of FIGS. 19A and 19B after a checklist type has been selected.

Figure 21A:

FIGS. 21A and 21B illustrate a graphical user interface screen 583 listing a plurality of checklist items 584-595 included in one of the checklists of FIGS. 19A and 19B. In the illustrated embodiments, the screen 583 displays, for each checklist item 584-595, a checklist id number 600, a checklist template name 602, a checklist position number 604, a checklist name 606, checklist filter conditions 608, checklist trigger method 610, an indication 612 of days due, a repeating indication 614, an indication 616 of whether there are limitations, an indication 618 of whether to keep the checklist after the trigger method is triggered, an indication 620 of to whom the checklist is assigned, a mail merge template 622 (if any), a name 624 of a parent (if any), a number 626 of children, a comment 628 (if any), and an element 630 (a hyperlink in the illustrated embodiments) which, if actuated, allows the checklist to be edited. The screen 583 also includes a pull down menu 632 through which a user can select a checklist type. Checklists of the selected type are displayed on the screen 583. The screen 583 also includes a box 634 for a checklist name, and a pull down menu 636 through which a user can select a parent checklist item. The screen 583 also includes a checkbox 638 for selecting roots only. More, fewer, or different items could be included in the screen 583.

Figure 22B:
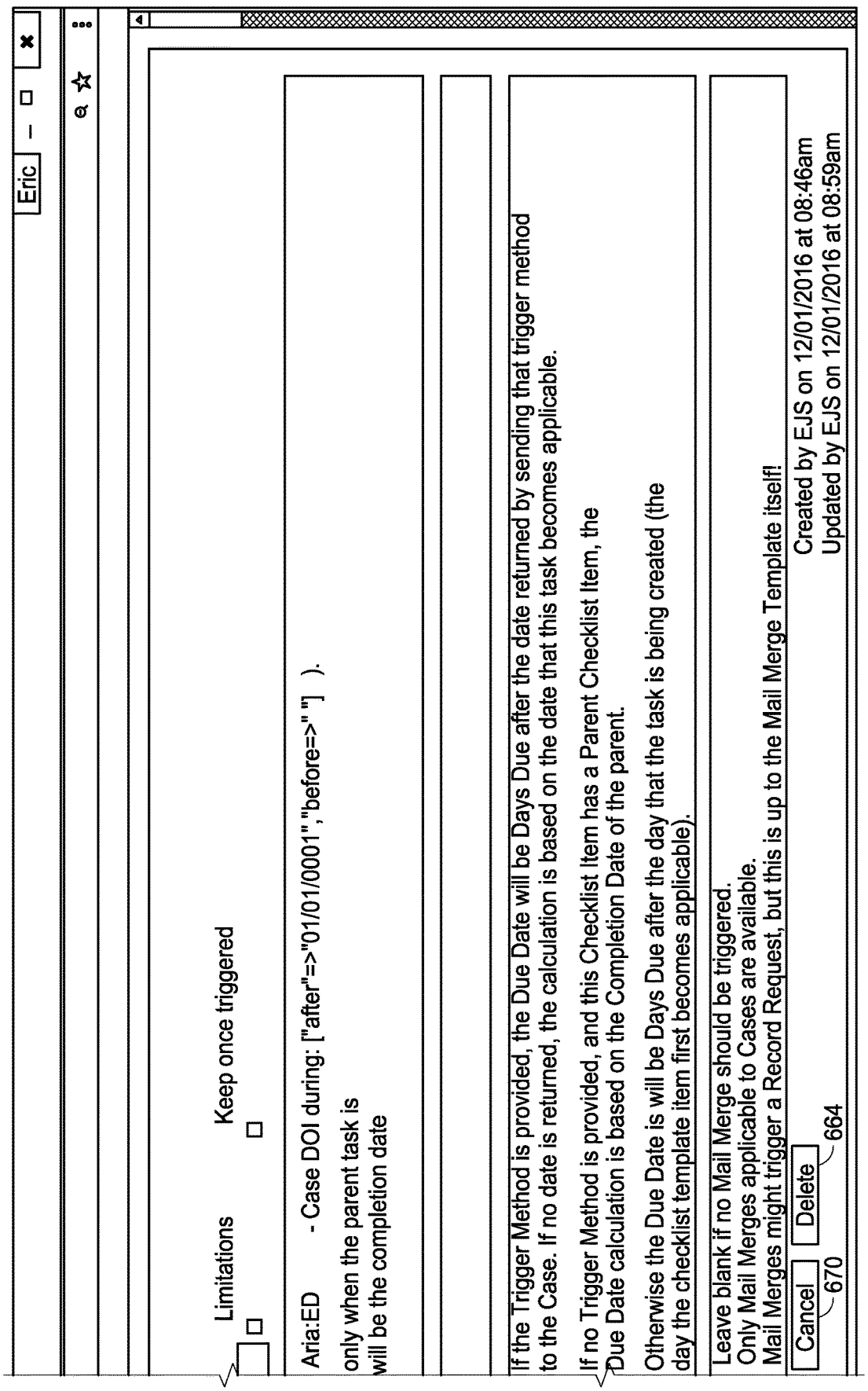

FIGS. 22A and 22B illustrate a graphical user interface screen 640 showing logic details of one of the checklist items 589 of FIGS. 21A and 21B. The screen 640 includes a box 643 into which a user can enter a number to adjust the position of the checklist item, and an element 644 showing the name of the checklist item. The screen 640 further includes an element 646, a hyperlink in the illustrated embodiments, which, if actuated, allows a user to add another rule for the checklist of the screen 640. The screen 640 further includes a pull down menu 648 through which a rule condition type can be selected by a user. The screen 640 further includes pull down menus 650 and 652 through which a person can be assigned to the task. In the illustrated embodiments, the menu 650 displays task assignees by role name. Alternatively, the user can use menu 652 to select a task assignee by an individual's name. The screen 640 further includes a text box 654 in which a user can enter a number of days. The screen 640 further includes a pull down menu 656 through which a trigger method type can be selected by a user, and a checkbox 657 with which a user can indicate whether the date is repeating. The screen 640 further includes a pull down menu 660 through which a mail merge template can be selected by a user. A letter, email, or text is automatically generated, in some embodiments, using the mail merge template, when the task of the checklist item is completed. The screen 640 further includes an element 662 for saving or updating the checklist item, and an element 664 for deleting the checklist item.

Figure 23A:
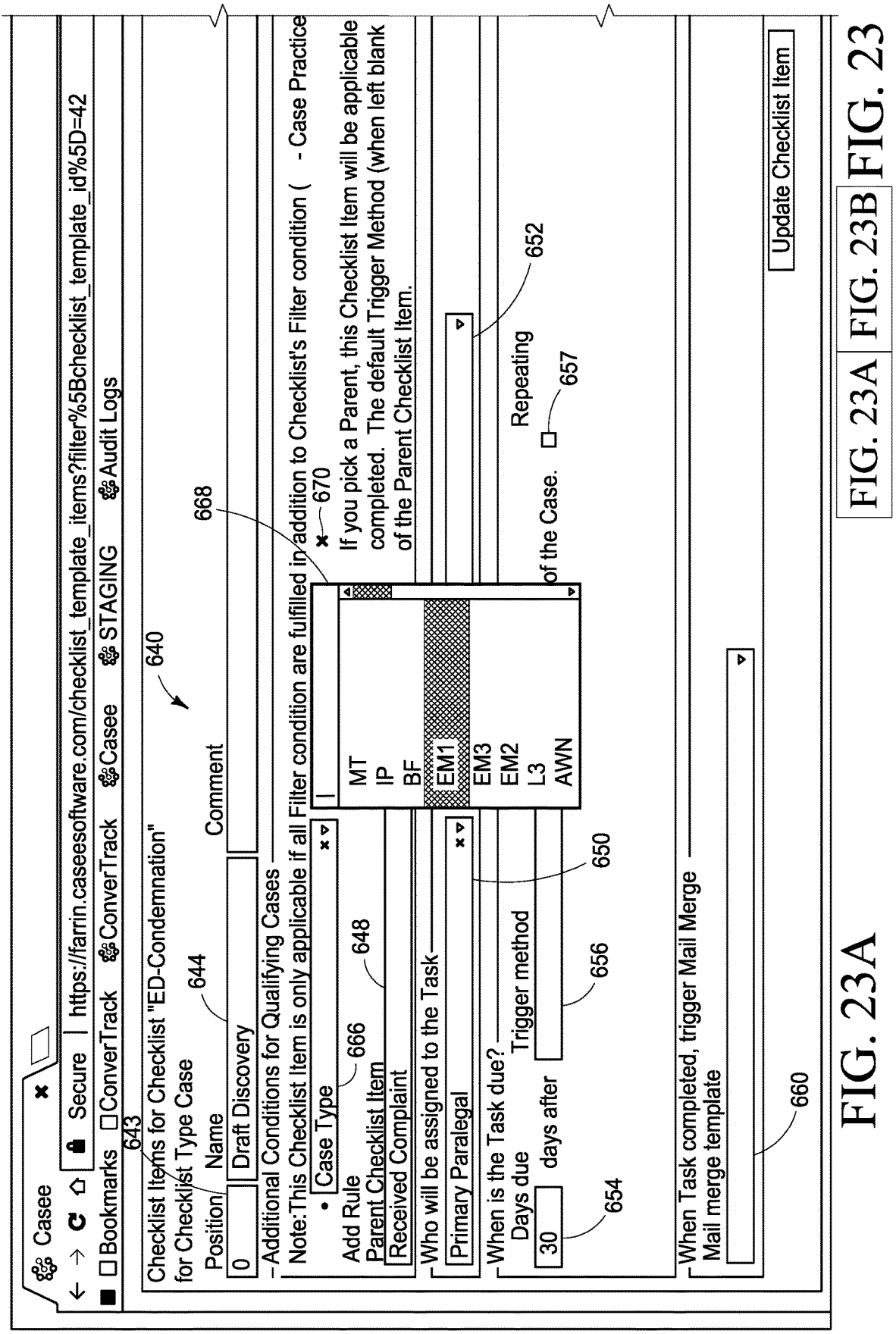

FIGS. 23A and 23B illustrate a graphical user interface showing a rule being added to the logic of the checklist item of FIGS. 22A and 22B. More particularly, in the illustrated embodiments, a rule is being added using pull down menus 666 and 668 requiring that the case type be EM1 to show up in this checklist. The case types may be abbreviated in different ways for different firms. If the user decides, after all, that they do not want to add this rule, they can actuate a cancel element 670 of the screen 640.

Figure 24B:
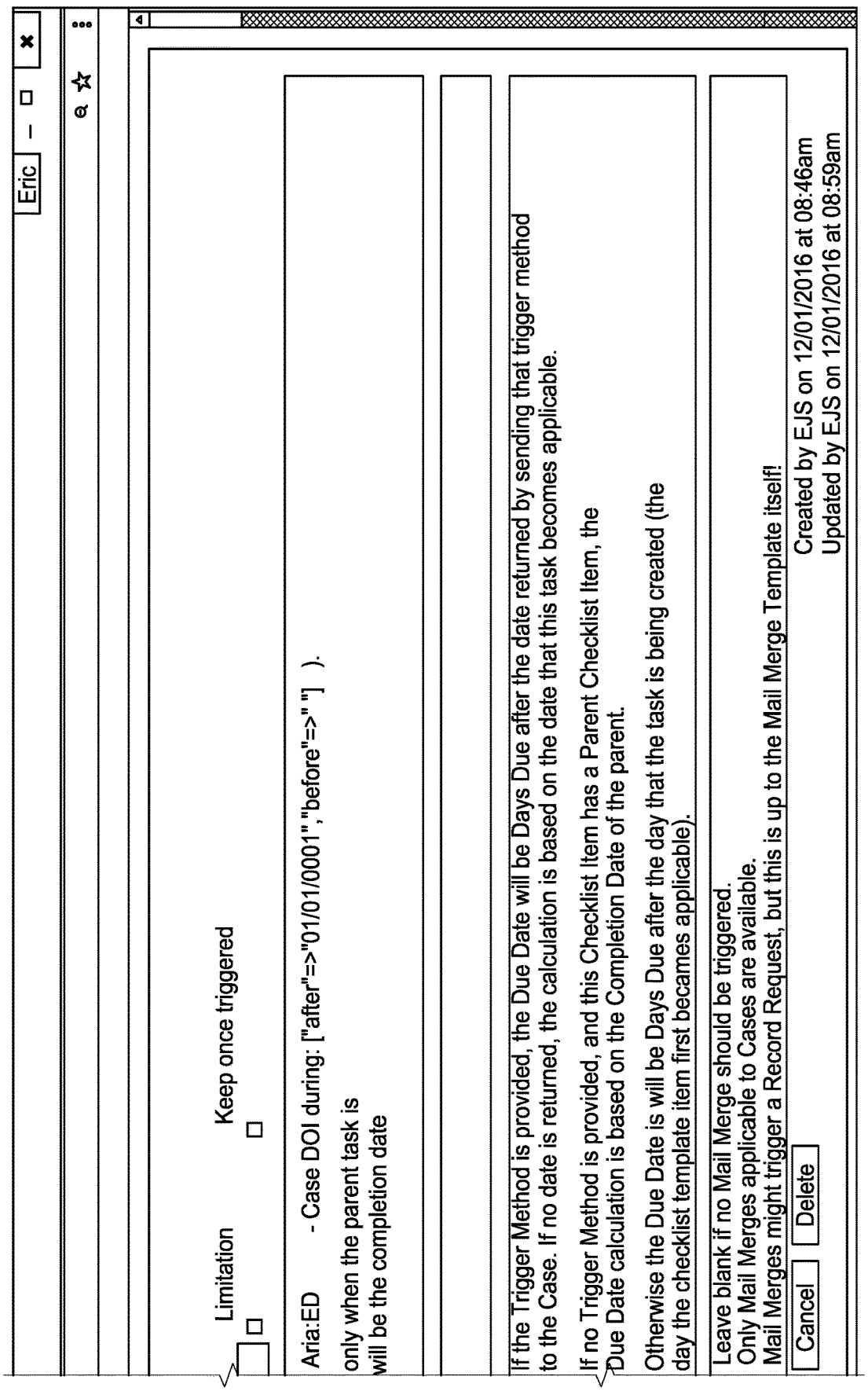
Figure 27C:
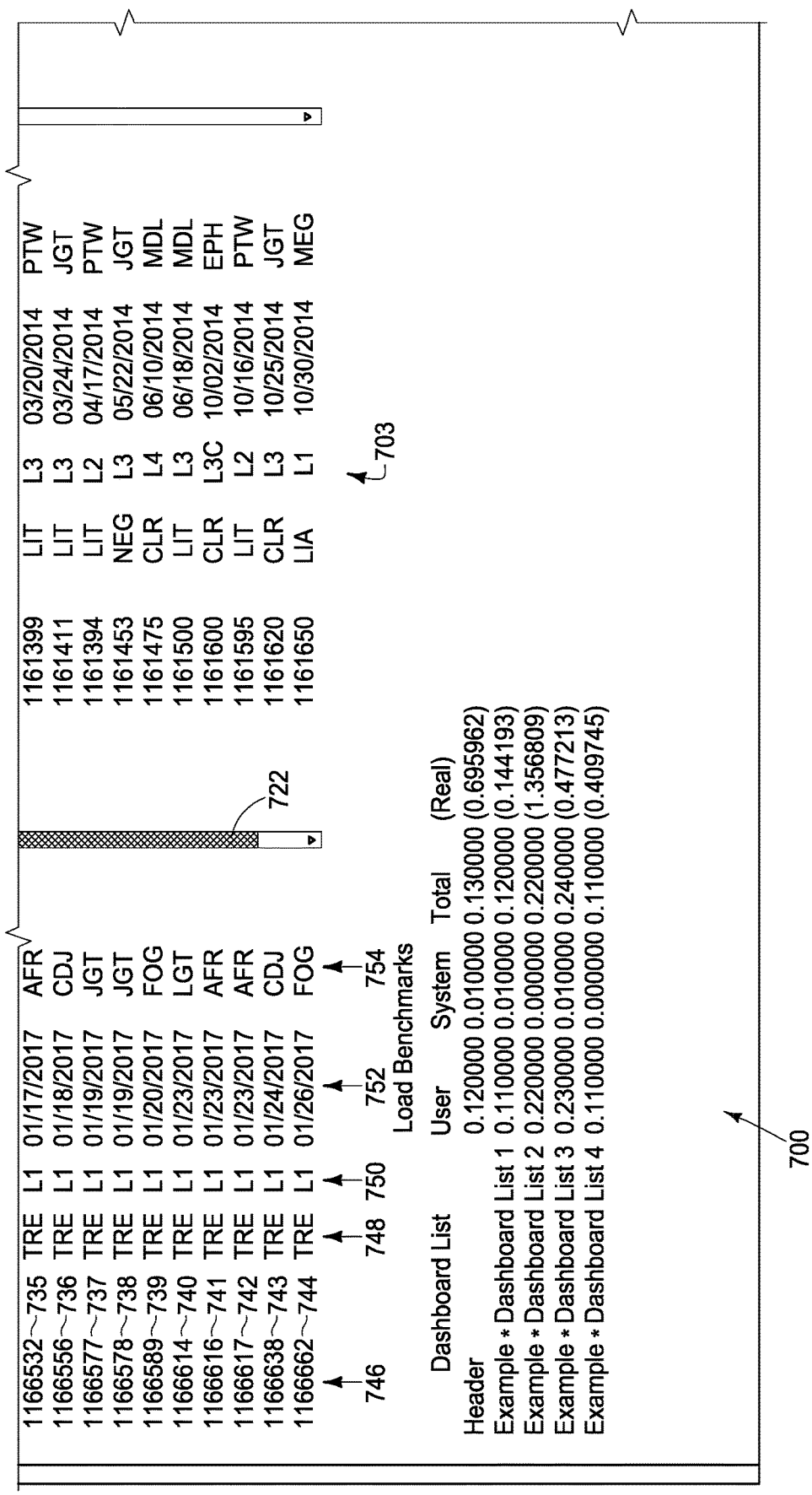

FIGS. 24A and 24B illustrate a graphical user interface showing a condition pull down menu 648 being pulled down from the graphical user interface of FIGS. 23A and 23B. In the illustrated embodiments, the alternatives included in the condition pull down menu 648 relate to events that may occur in a legal case matter, such as receipt of a complaint, discovery, mediation, trial, etc. The events do not need to be sequential.

FIGS. 25A and 25B illustrate a graphical user interface showing a task due timing pull down menu 656 being pulled down from the graphical user interface of FIGS. 24A and 24B. In the illustrated embodiments, the alternatives included in the task due timing pull down menu 656 include dates of events that may occur in a legal case such as the date a case is closed, the date of an incident giving rise to a legal claim, the date of a statute of limitations, etc. The numerical values corresponding to these dates of events are stored in or calculated by the case management system so that the user can create a task based on a type of event date without knowing the actual date when the events occurred.

FIGS. 26A and 26B illustrate a graphical user interface showing a mail merge options pull down menu 658 being pulled down from the graphical user interface of FIGS. 25A and 25B. Using the menu 658, a user can select a mail merge form to be used for automatic generation of a letter (or email, text message, or fax in some embodiments) after the task has been completed.

In addition to checklists, the case management system provides dashboards 1709 (FIG. 53) for users, in some embodiments. See, for example, the screen 700 shown in FIGS. 27A, 27B, 27C and 27D. A dashboard includes a set of panels 702-705, in the illustrated embodiments. Each panel comprises a list of items (e.g., cases or entities) that all have the same characteristics, in the illustrated embodiments. For example, a panel 702-705 may contain all new legal cases obtained by a law firm within the last 7 days. The dashboard creates for a user a broad view of the user's workload in a manner that highlights the most pertinent matters, for example, stages of the workload. In the context of a dashboard, logic statements drive the list in each panel, in which all items within the list comport to the conditions within the logic statement. The logic tool enables the user or administrator to create the logic behind the dashboard panels without programming knowledge and without the need for hard coding. Dashboards can be associated with an individual user, an individual's role, a workgroup (collection of users), a practice area, or firm wide. Dashboards comprise an unlimited number of lists, but, in some embodiments, contain the lists most pertinent to the user based on the user's role (e.g., defines the users workload, presents the user with the entire case load, etc.) Within a dashboard, lists can be configured with multiple levels of logic such that only cases meeting all of the logic arguments appears to the user on the dashboard panel. If a case no longer meets the logic requirement, the system 1704 automatically (or dynamically) updates the list and the updated panel is shown to the user in the dashboard.

In addition to the panels 702-705, the screen 700 further includes, in the illustrated embodiments, a display area 708 that shows the total number of cases being handled by the user or the firm, as well as display areas 710 that show the number of cases the user or firm has for different types of matter. Different firms may use different types of abbreviations for matter types. For example, in the illustrated embodiments, L1 stands for a level one or standard automobile accident case. The screen 700 further includes display areas 712 showing numbers of cases for other categories, such as for each case type. The screen 700 further includes, in the illustrated embodiments, a pull down menu 714 through which a user can select dashboards for a particular attorney or staff member. The screen 700 further includes, in the illustrated embodiments, a pull down menu 716 through which a user can select dashboard lists of a certain type. The screen 700 further includes an element 718 which, if actuated, causes a refresh of the numbers and dashboard lists based on current information.

In the illustrated embodiments, each dashboard panel 702-705 includes a settings element 720 which, when actuated by a user, brings up settings options for the panel. Each panel 702-705 also includes entries such as entries 724-744 and a scroll bar 722 for scrolling through entries if there are more entries than fit in a display area allocated to a panel. Each entry 724-744 includes a unique identification number 746, a case status indicator 748, a case type indicator 750, a date 752, and the initials 754 of the responsible attorney or staff member. In various embodiments, the items included in each entry 724-744 are user-configurable. For example, entity name, settlement amount, or other case information can be shown in the panel 702-705.

In various embodiments, different users have different dashboards having multiple lists generated based on user-selected parameters. For example, one list could be for cases for which there has been no client contact in the last two weeks. Another list could be for cases for which a client is waiting for medical treatment. The lists can act as task lists or to-do lists. When user actions are completed, the system 1704 automatically (or dynamically) causes the item to disappear from the list as the condition (e.g., no contact in the last two weeks) is no longer true. The dashboard concept is very useful for efficiency. The dashboards can be configured by workgroups so that multiple user dashboards may be aggregated. For example, a supervisor can view tasks that he or she needs to complete as well as tasks that the supervisor has assigned to subordinates.

Figure 28A:
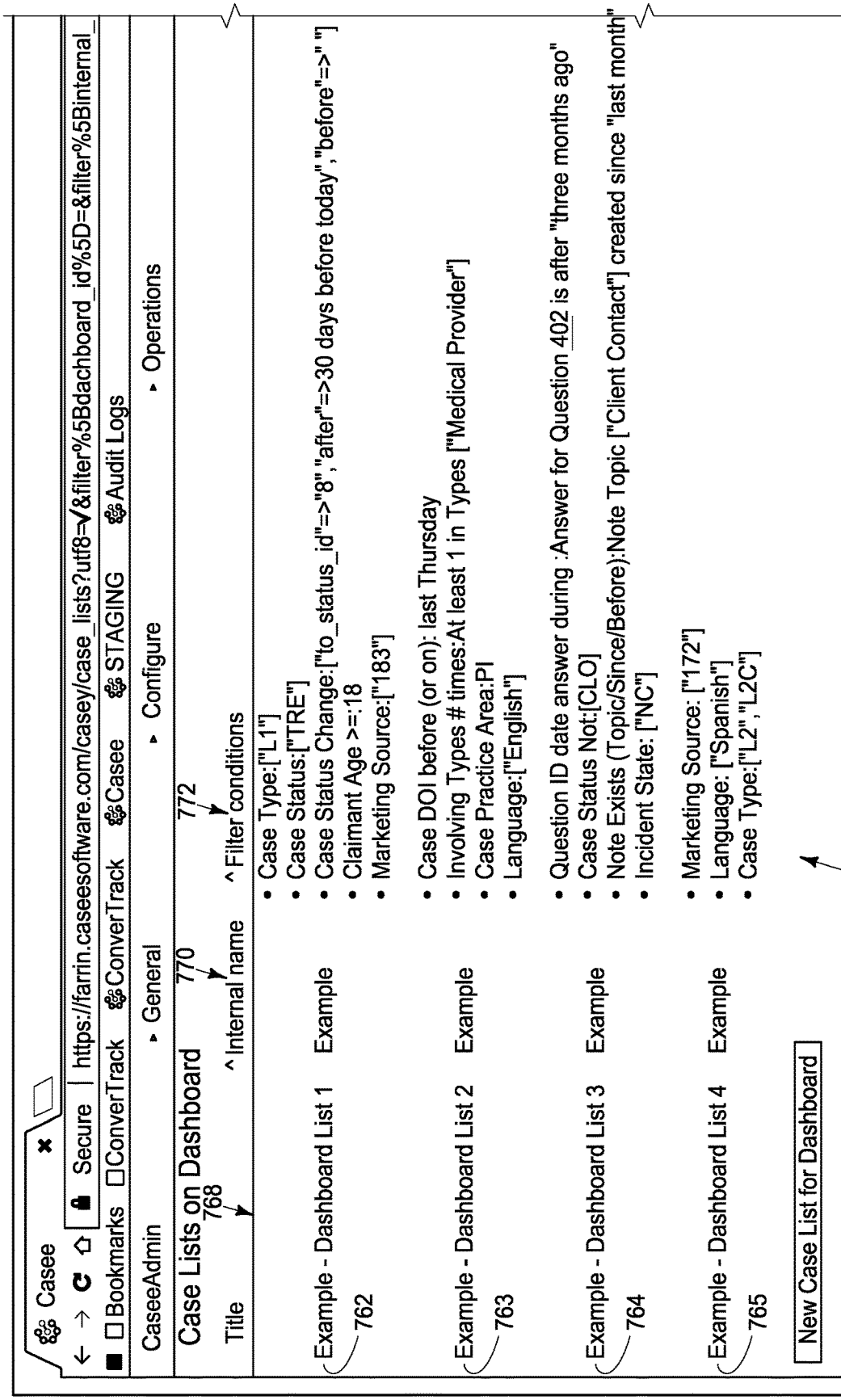
FIGS. 28A and 28B are to be assembled.
Figure 28B:
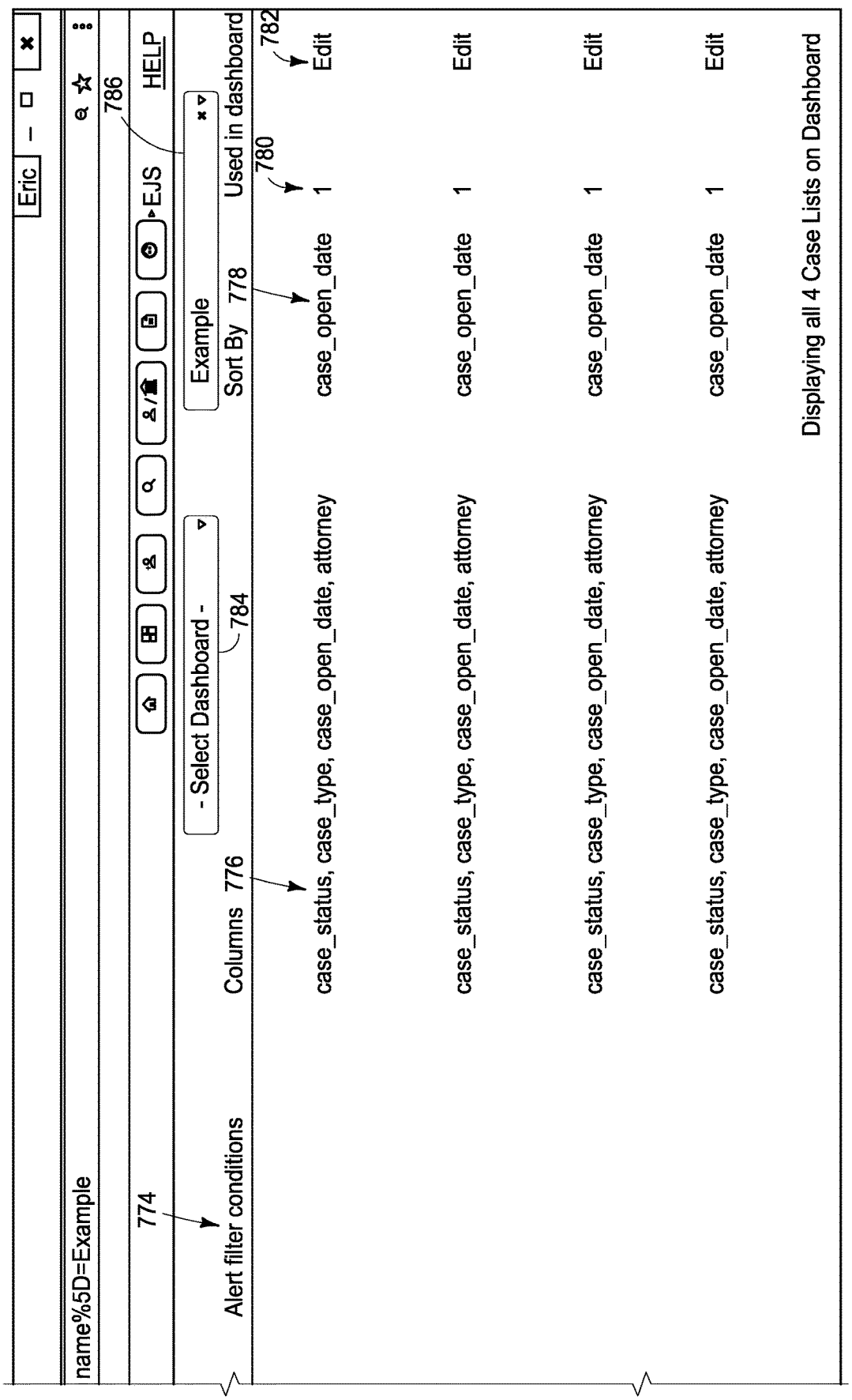

FIGS. 28A and 28B illustrate a graphical user interface screen 760 showing definitions 762-765 for dashboard items 702-705. Each definition 762-765 includes a title 768, an internal name 770, user-definable filter conditions 772, alert filter conditions 774, user-definable columns 776 included in each dashboard list, a sort order 778, a flag 780 indicating whether the definition is used in the dashboard, and an element 782 which, if actuated, allows a user to edit the definition 762-765. The screen 760 further includes a pull down menu 784 through which a user can select a dashboard and a pull down menu 786 through which a user can select a dashboard type.

FIGS. 29A, 29B, 29C and 29D illustrate a graphical user interface screen 790, similar to the screen 760, except showing how definition rules can be edited, added, or deleted to define one of the dashboard lists. More particularly, in the illustrated embodiments, definition 764 has been selected for potential editing. The screen 790 includes a text box 792 in which the title 768 can be edited, a text box 794 in which the internal name 770 can be edited, and a list of parameters 796-799, any of which can be removed by clicking on an "x" element adjacent the parameter name. The screen 790 further includes a pull down menu 802 through which a user can add a parameter. The screen 790 further includes rules 804-807, any of which can be removed by clicking on an "x" element adjacent the rule name, and an element 810 which, when actuated by a user, allows a new rule to be added. The screen 790 further includes a pull down menu 812 through which a user can copy from another case list, an update item 814, a cancel button 816, and a delete button 818.

Figure 29A:
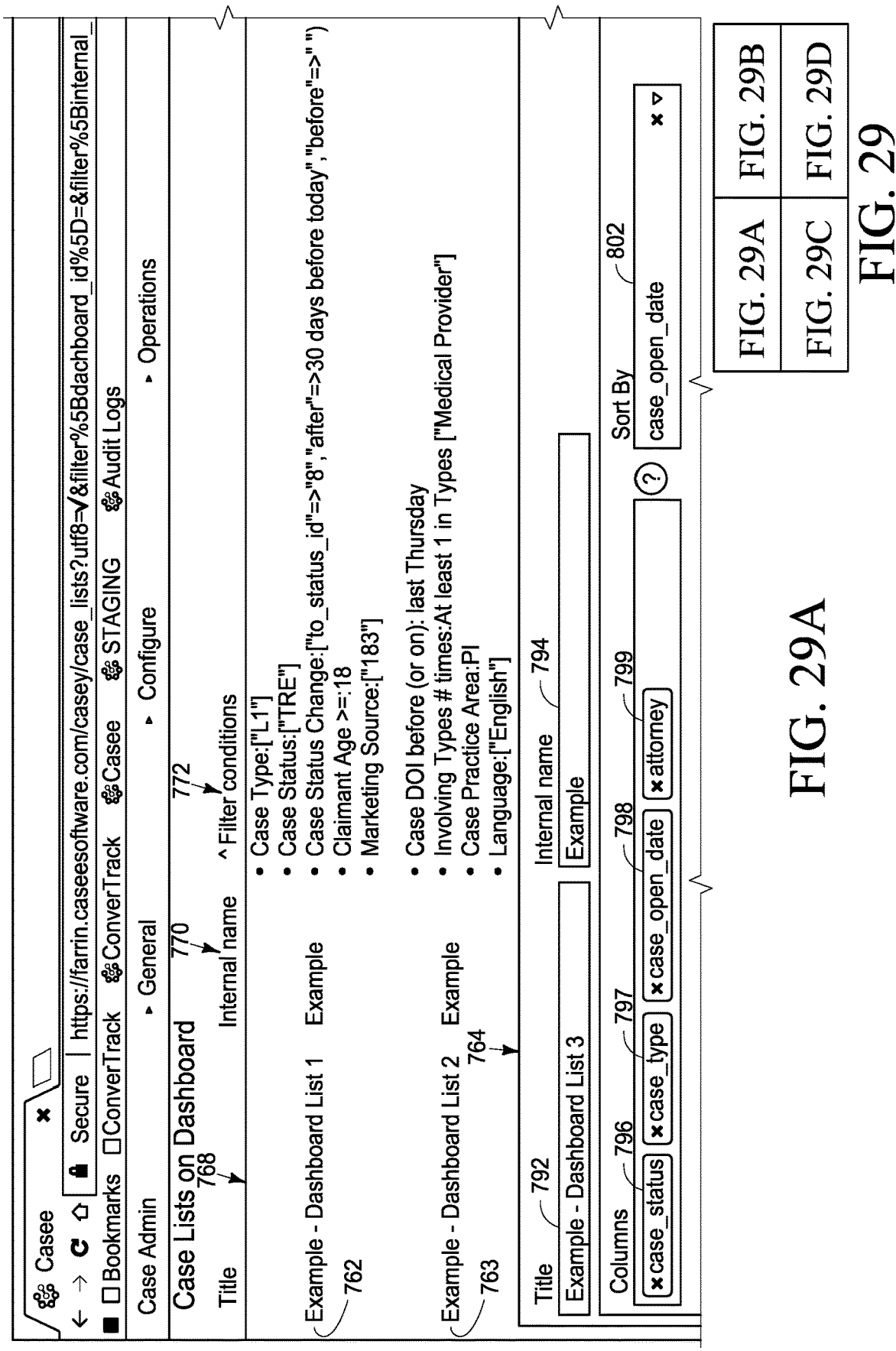
FIGS. 29A, 29B, 29C, and 29D are to be assembled.
Figure 29B:
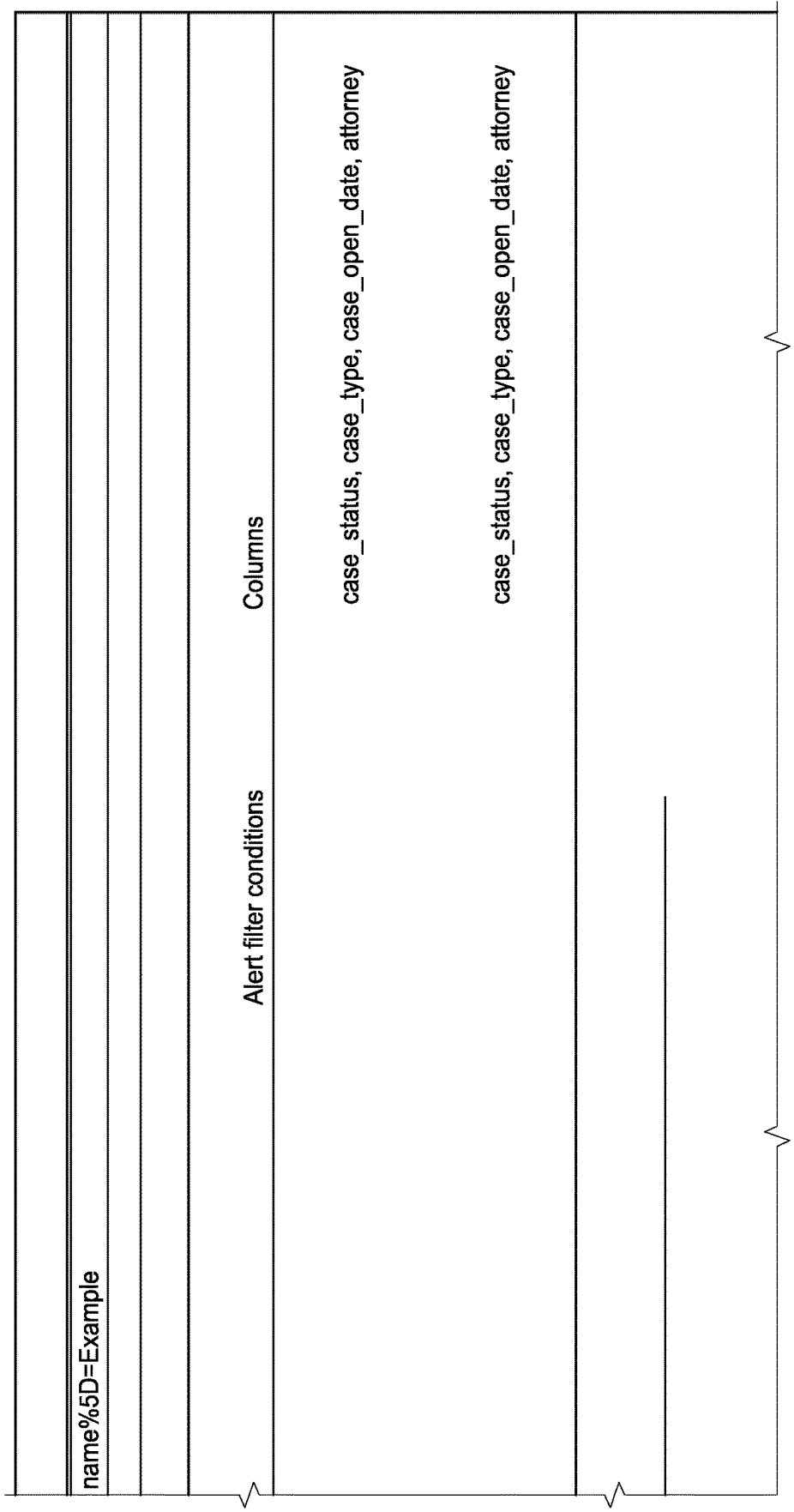
Figure 29C:
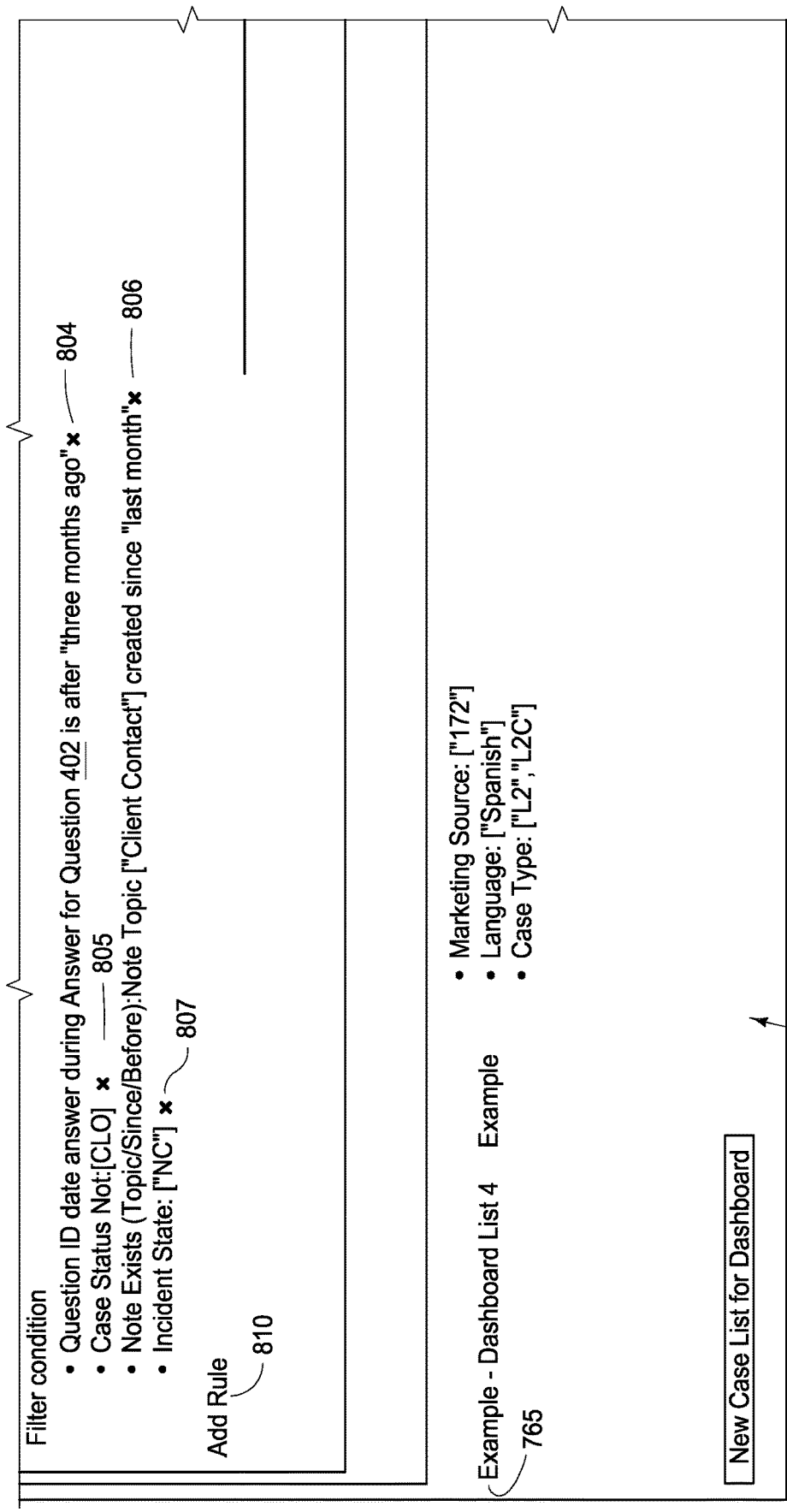
Figure 29D:
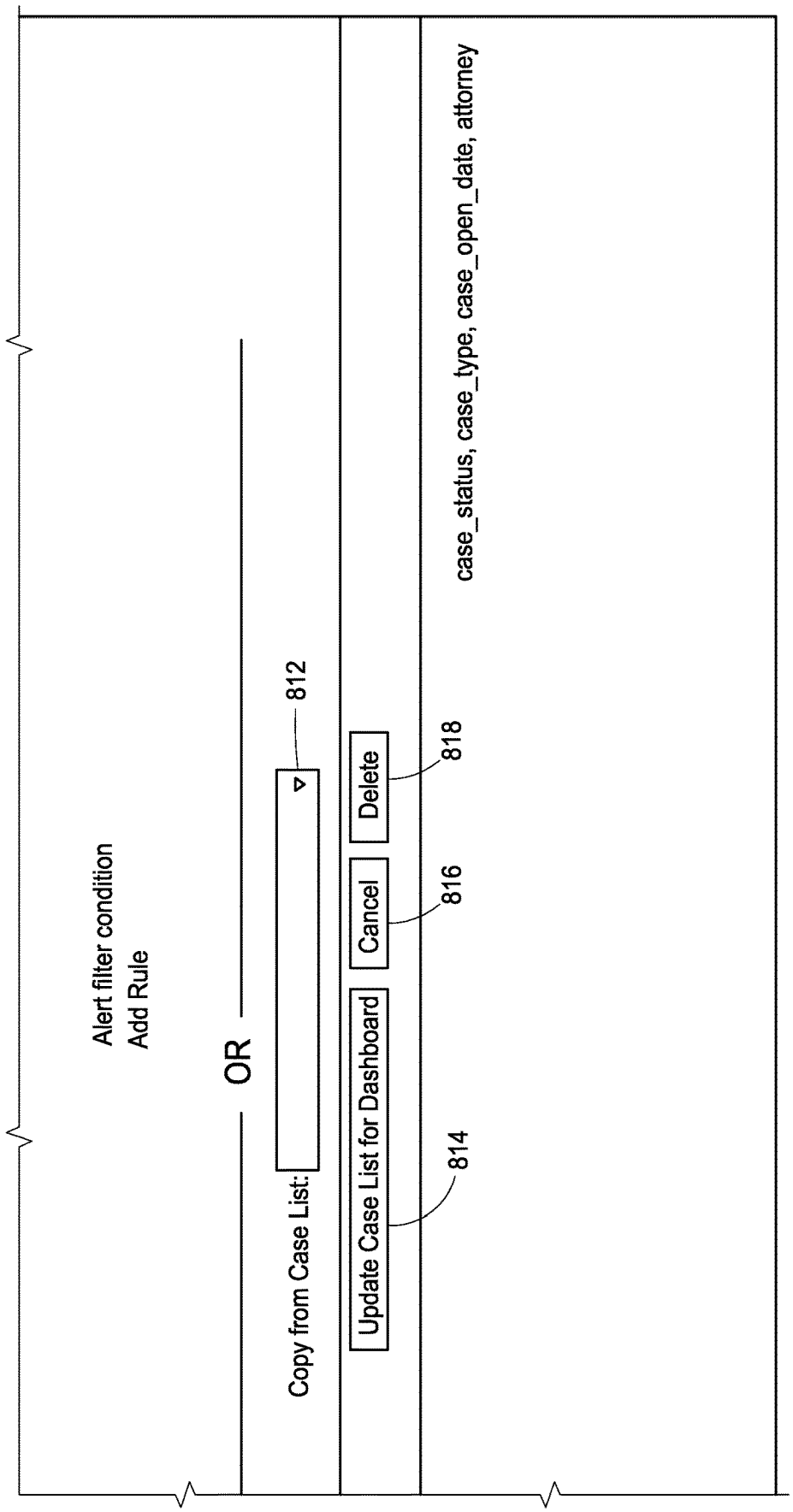
Figures 30, 30A:
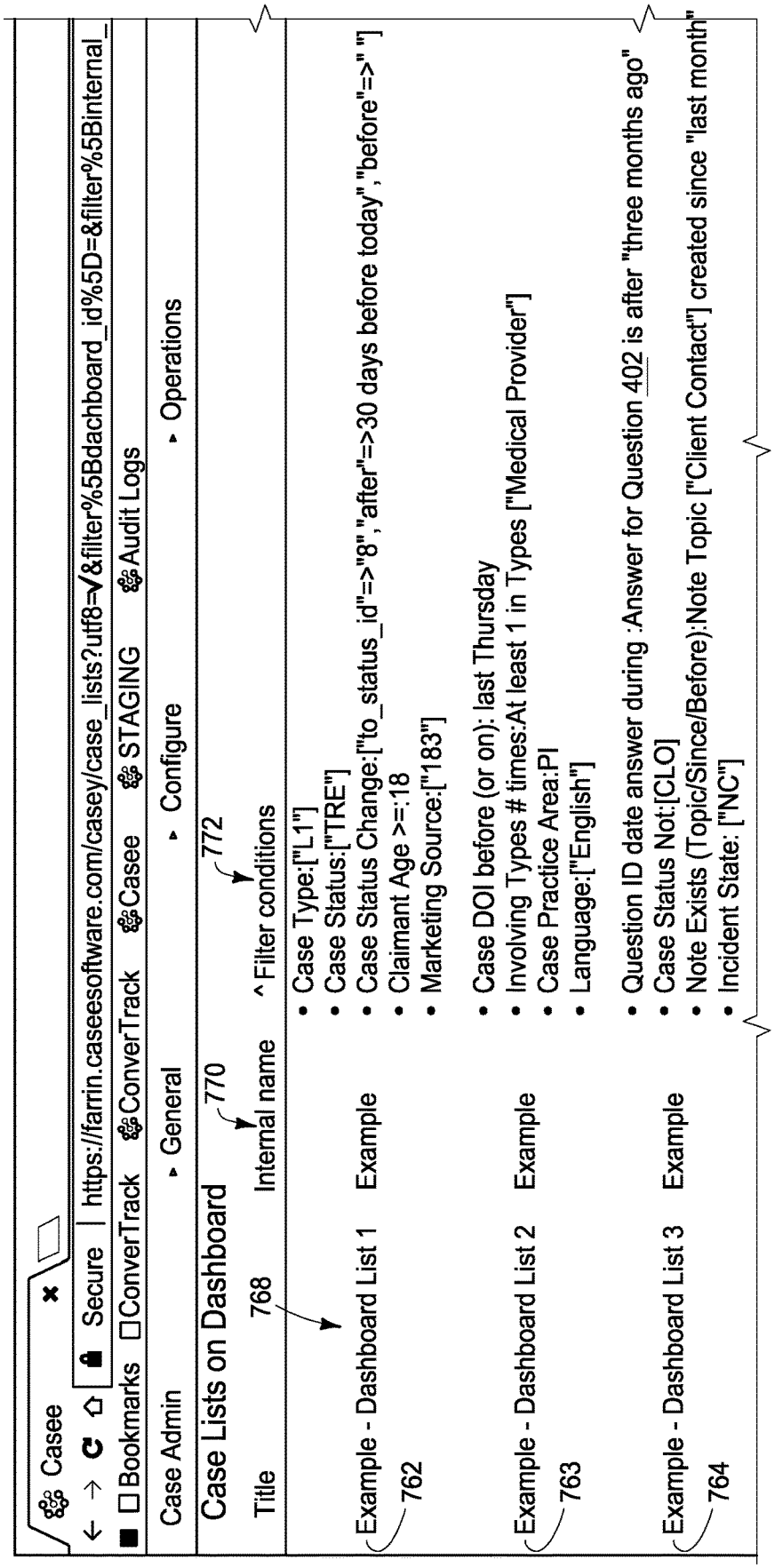
FIG. 30 is a map illustrating how
FIGS. 30A, 30B, 30C, and 30D are to be assembled.
Figure 30B:
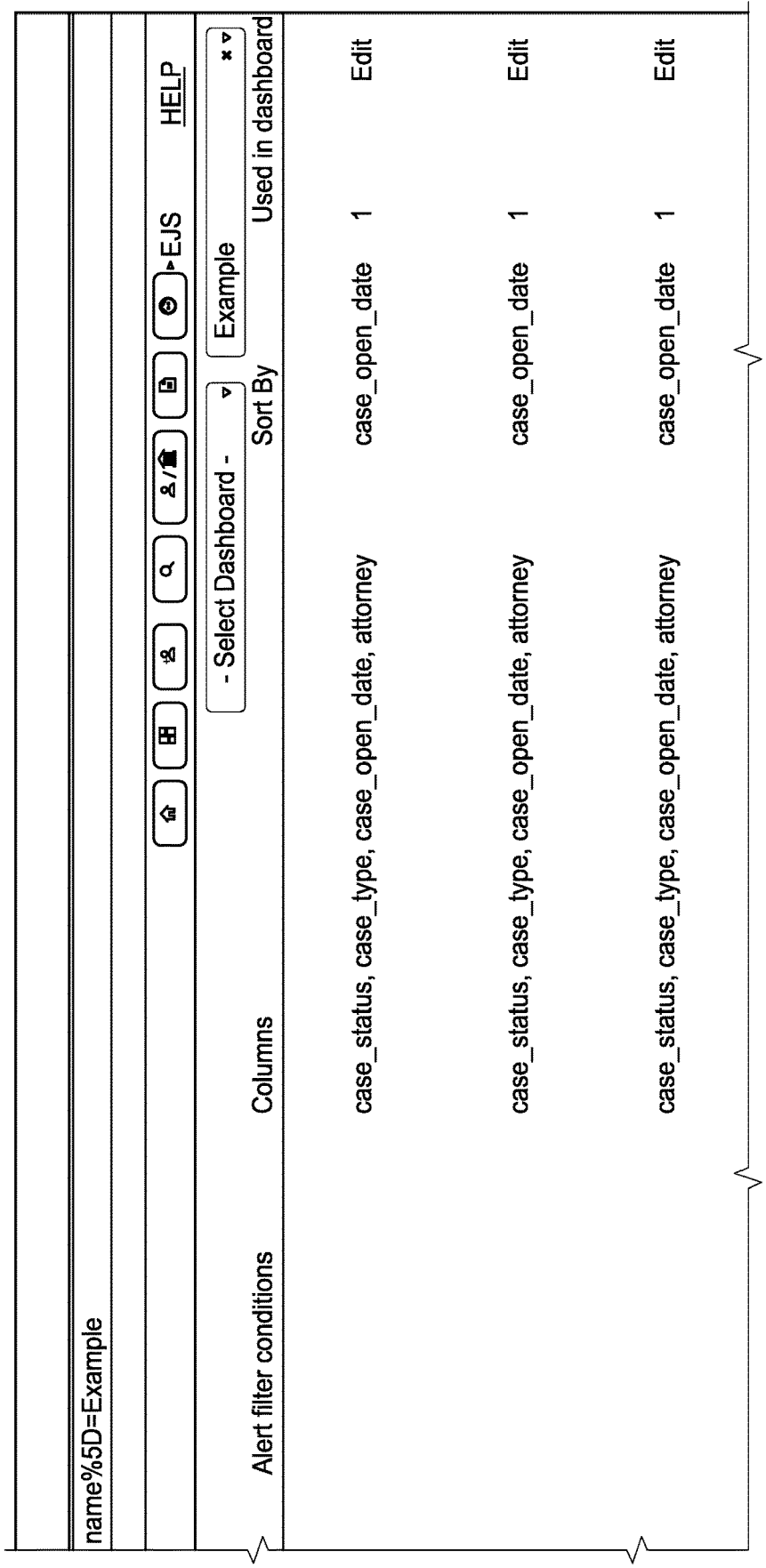
Figure 30C:
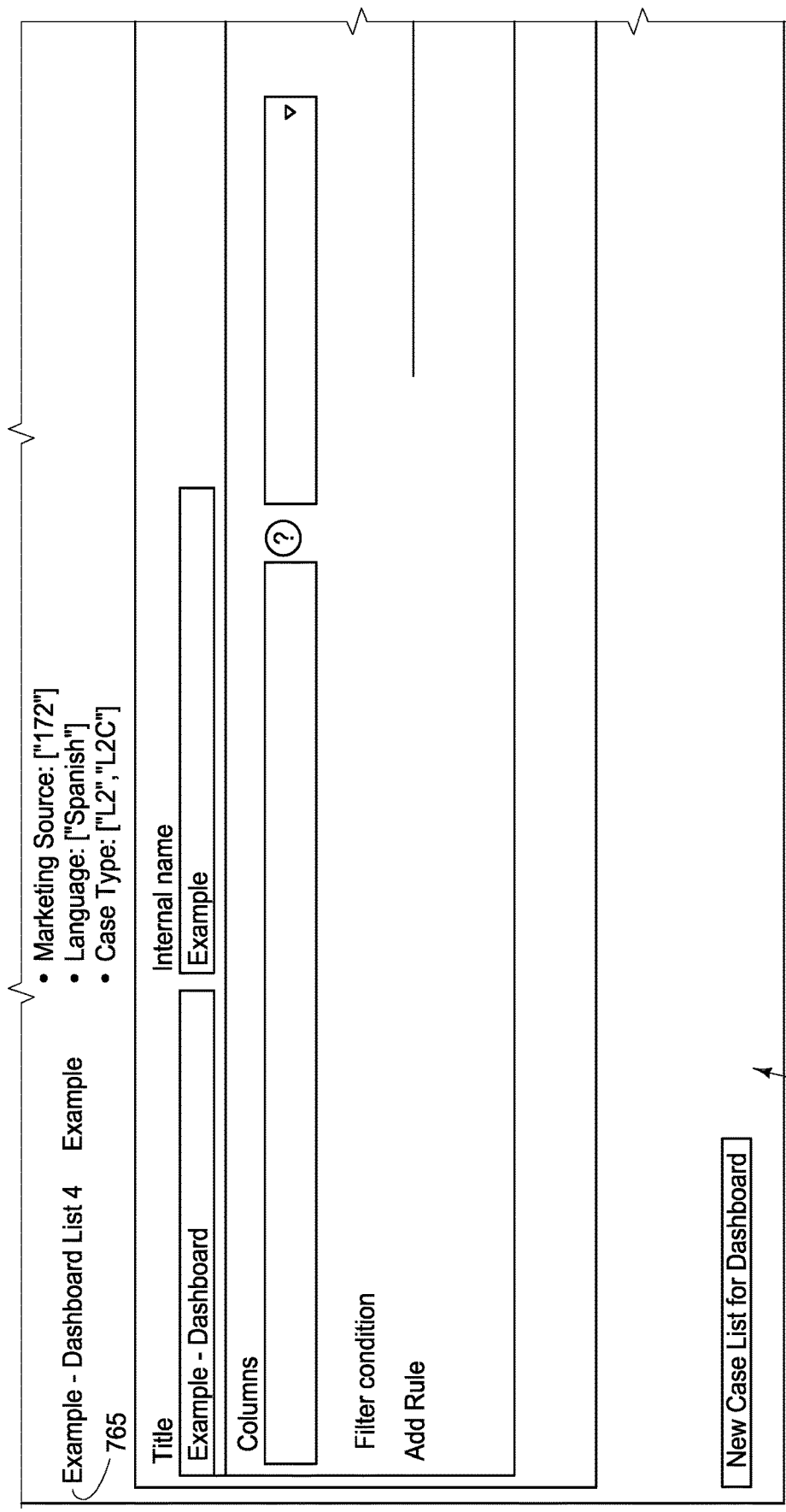
Figure 30D:
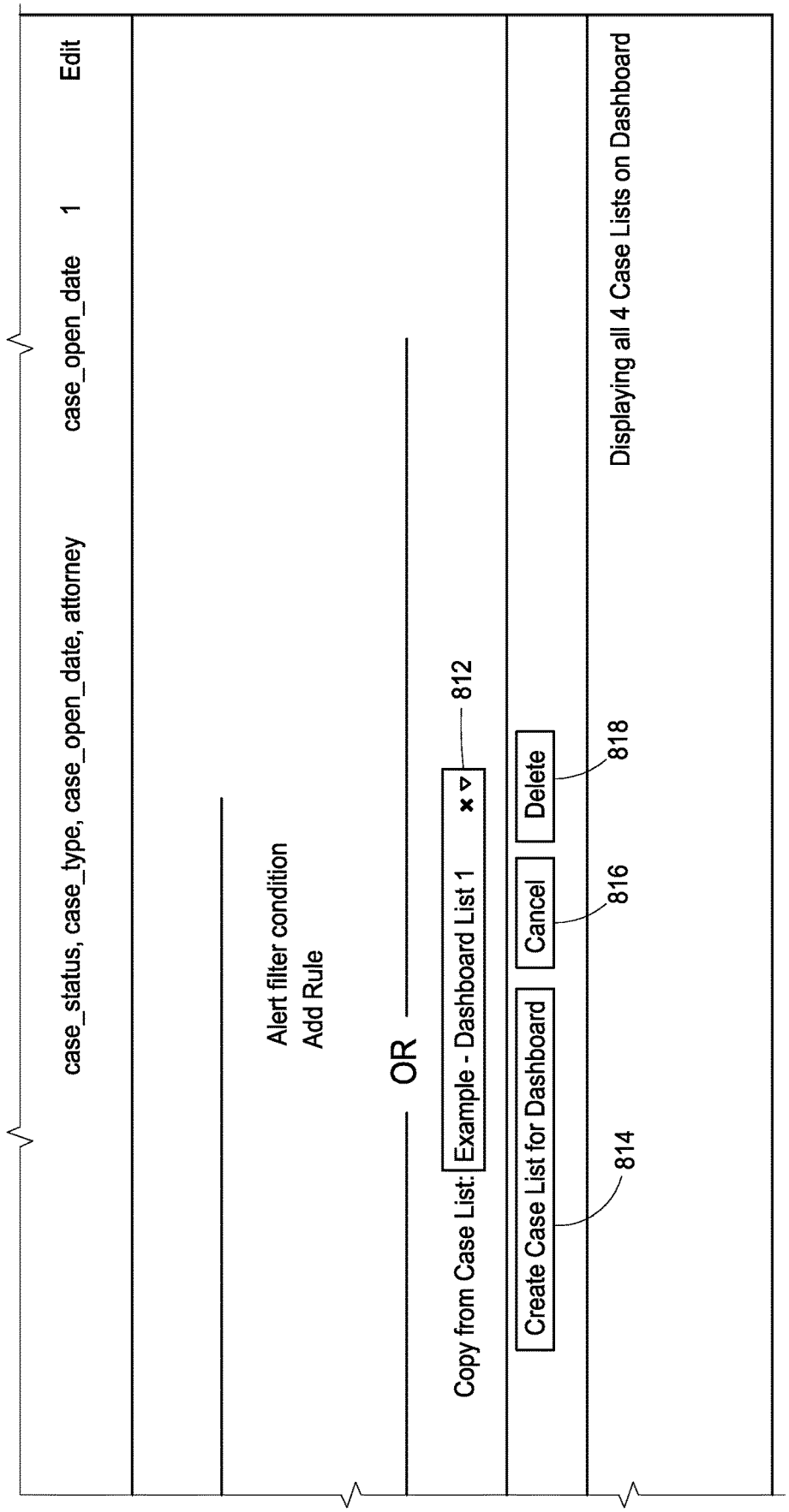
Figure 31A:
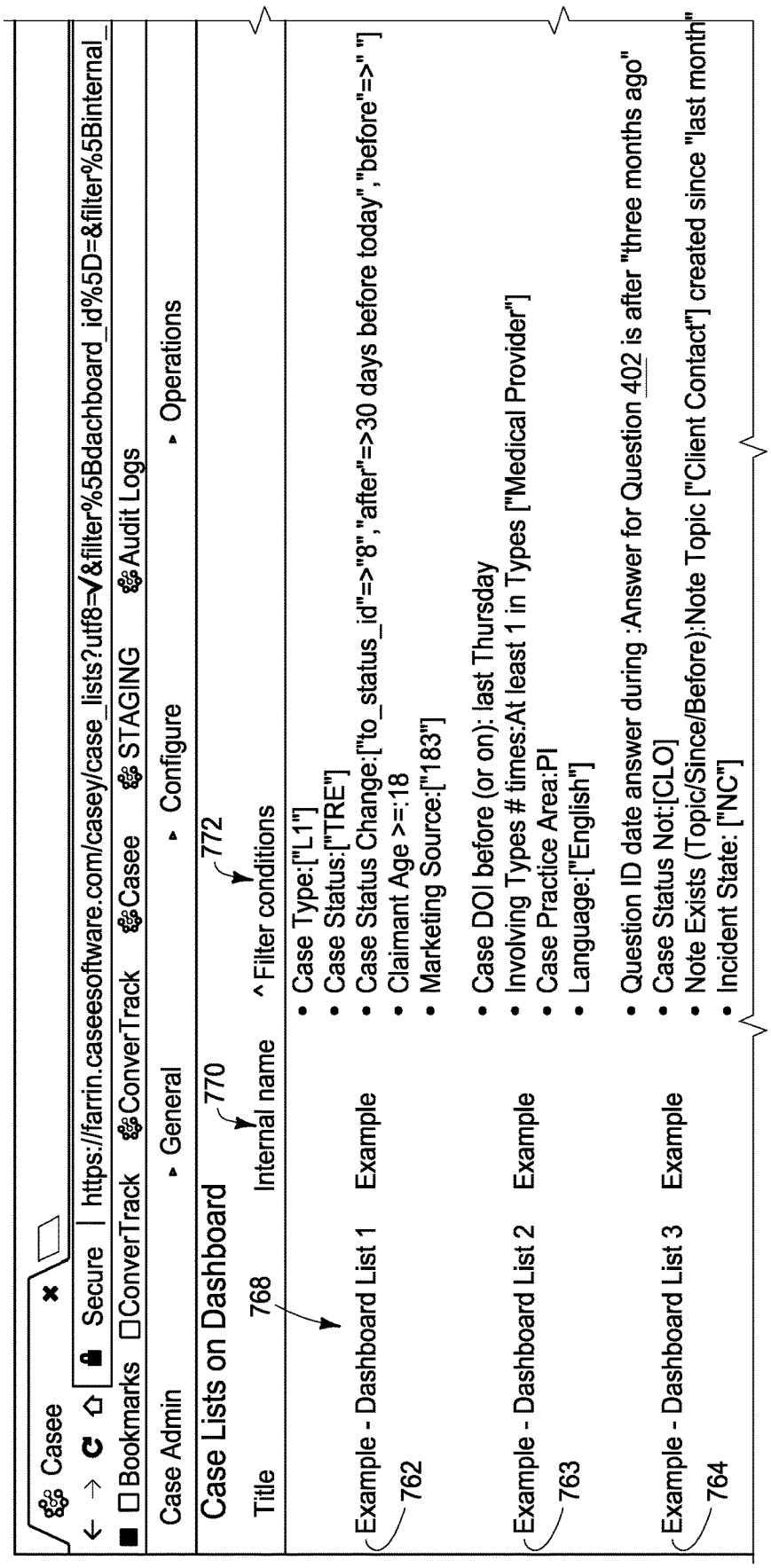
Figure 31:
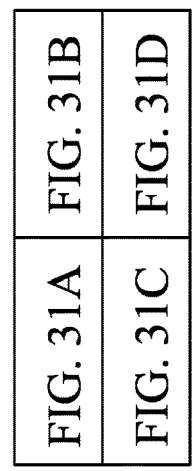
FIG. 31 is a map illustrating how
Figure 31B:
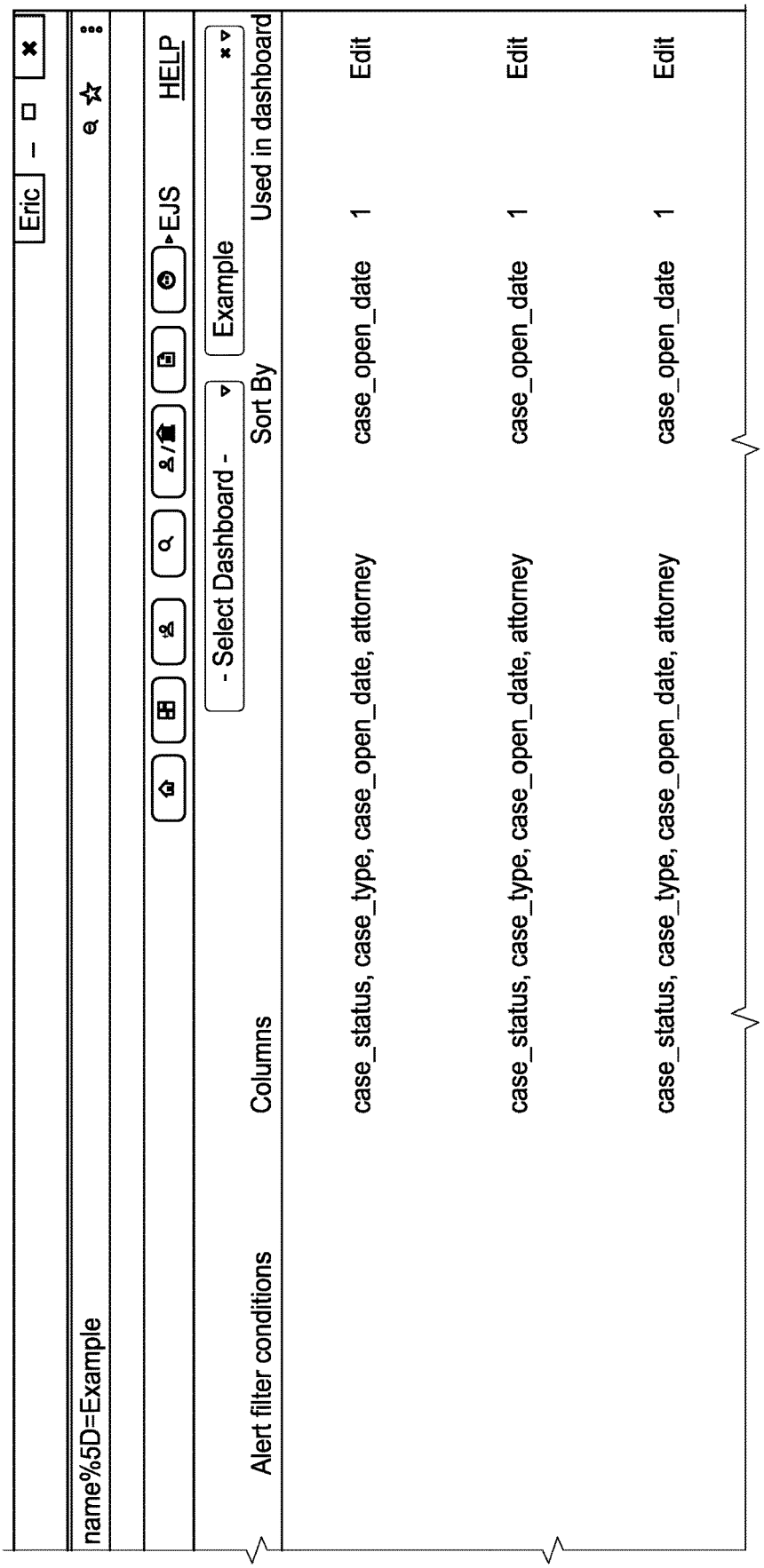
Figure 31D:
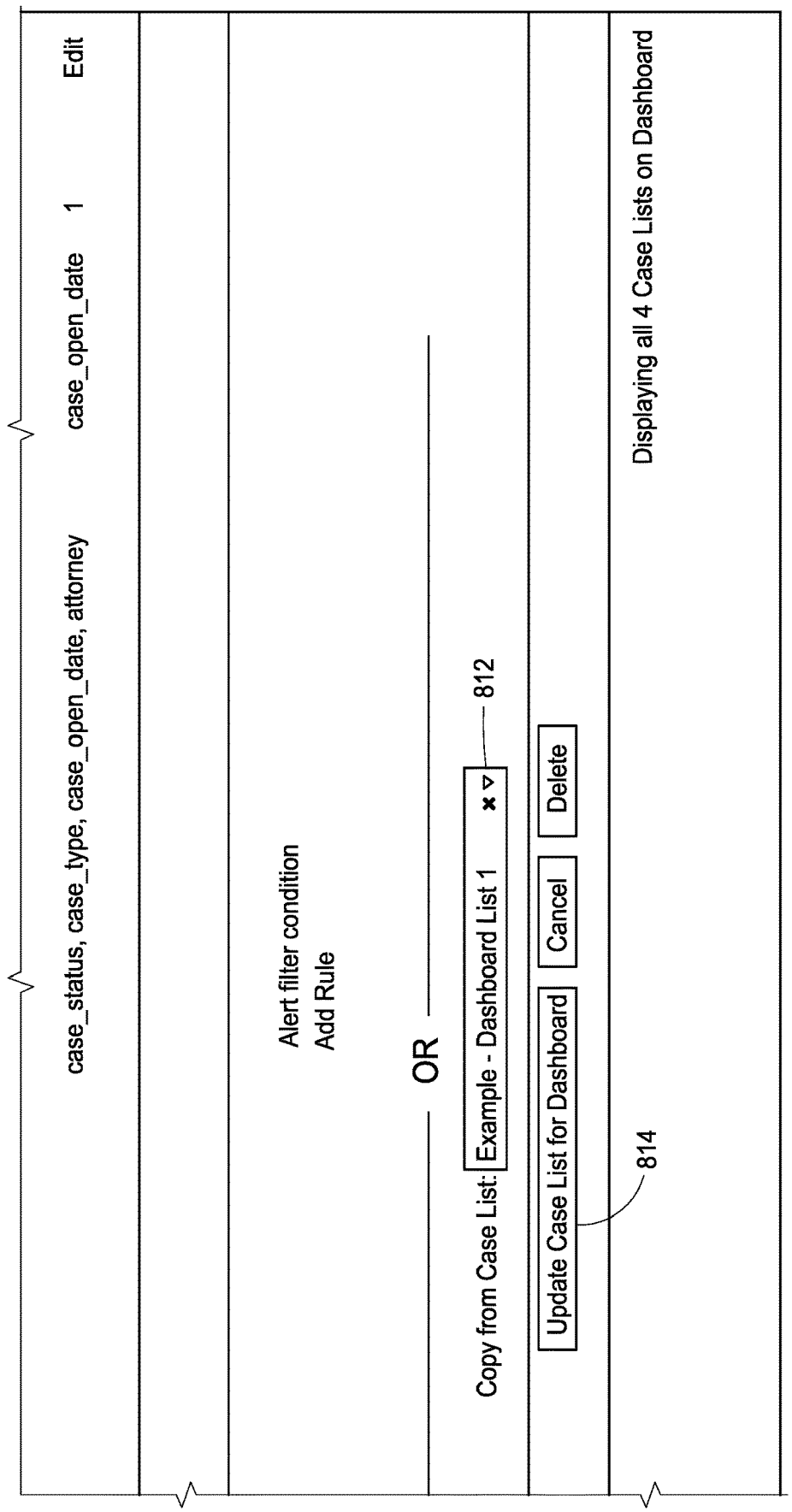
Figure 32A:
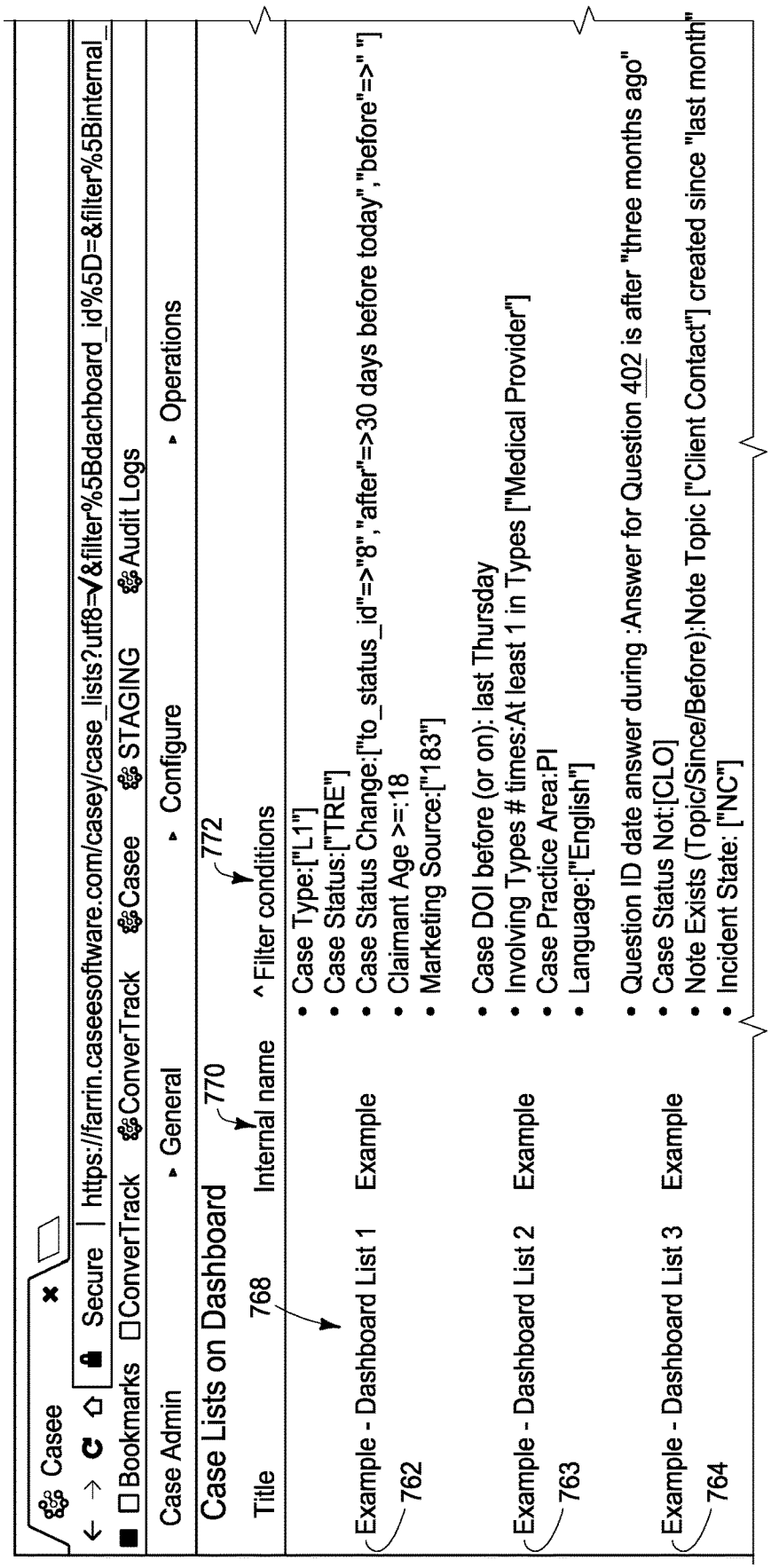
FIGS. 32A, 32B, 32C, and 32D are to be assembled.
Figure 32B:
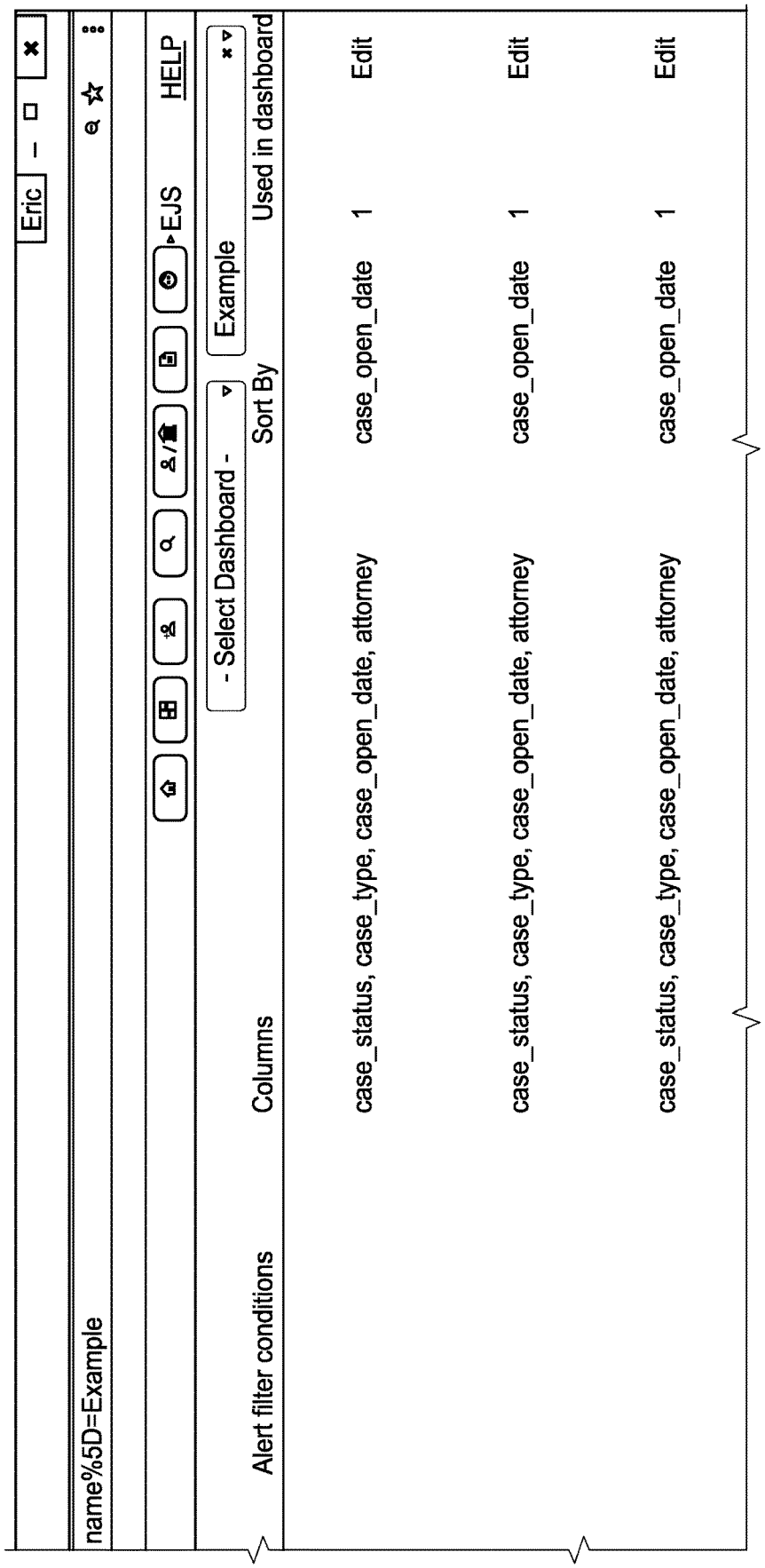
Figure 32C:
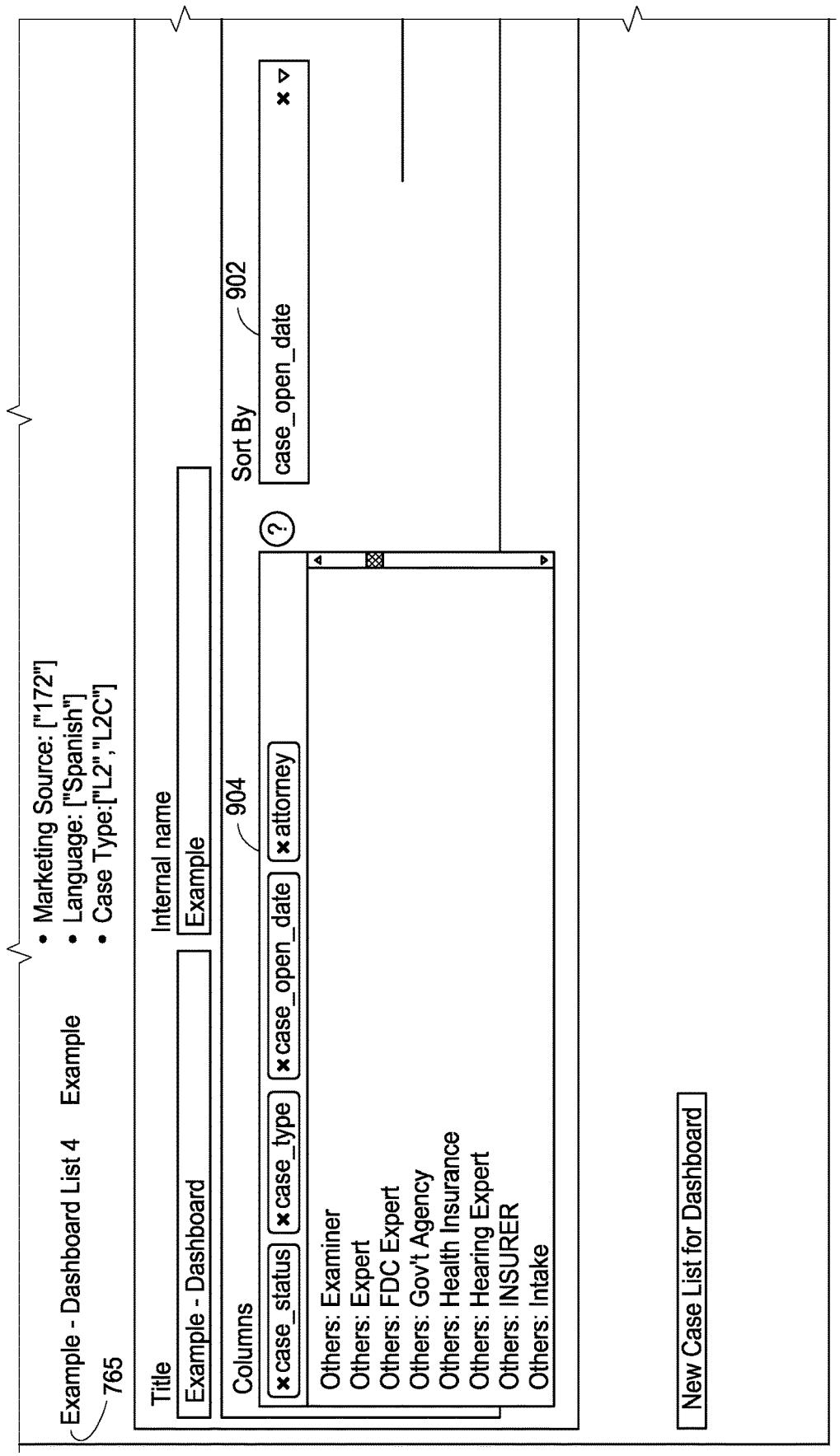
Figure 32D:
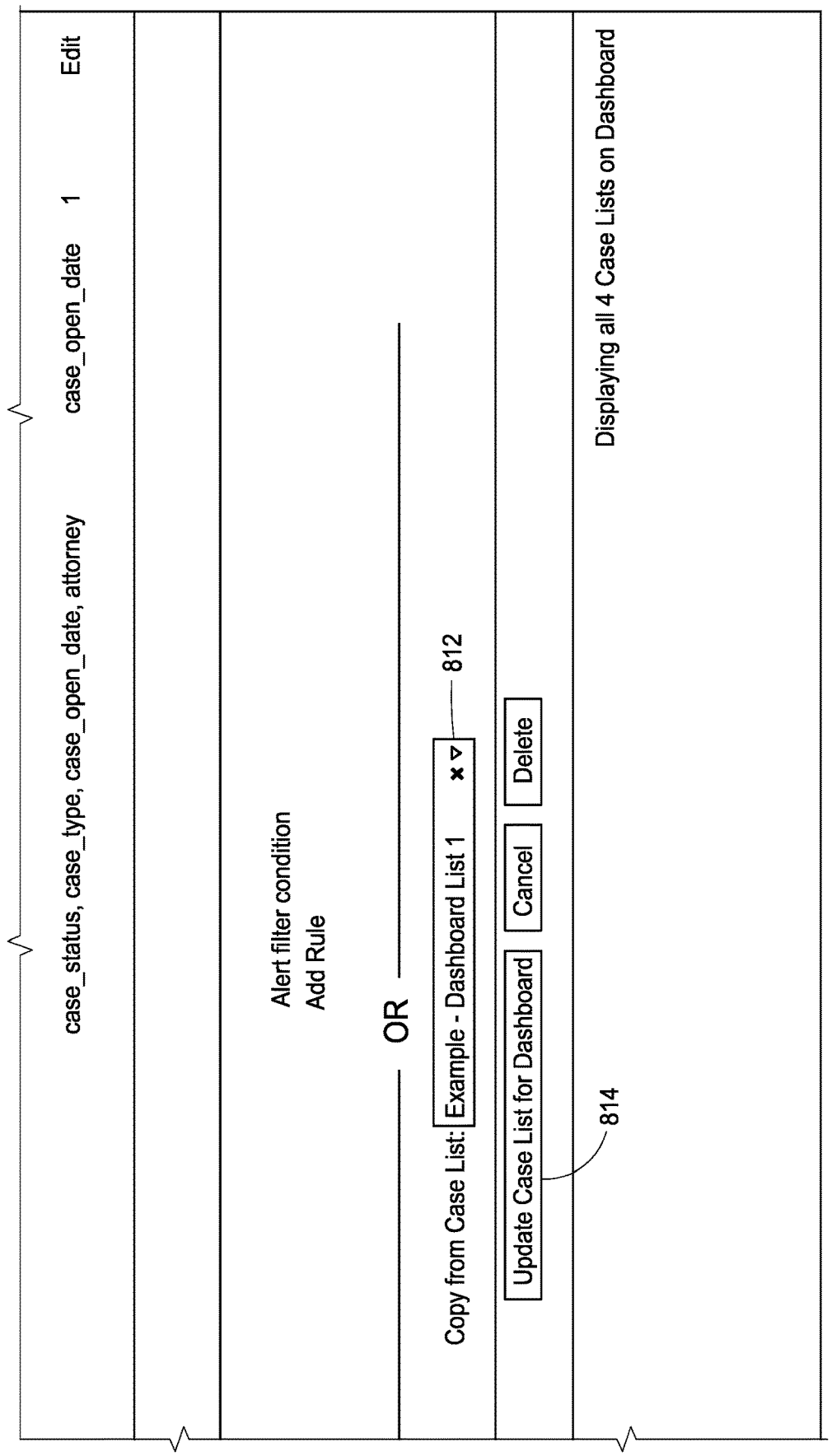
Figure 33A:
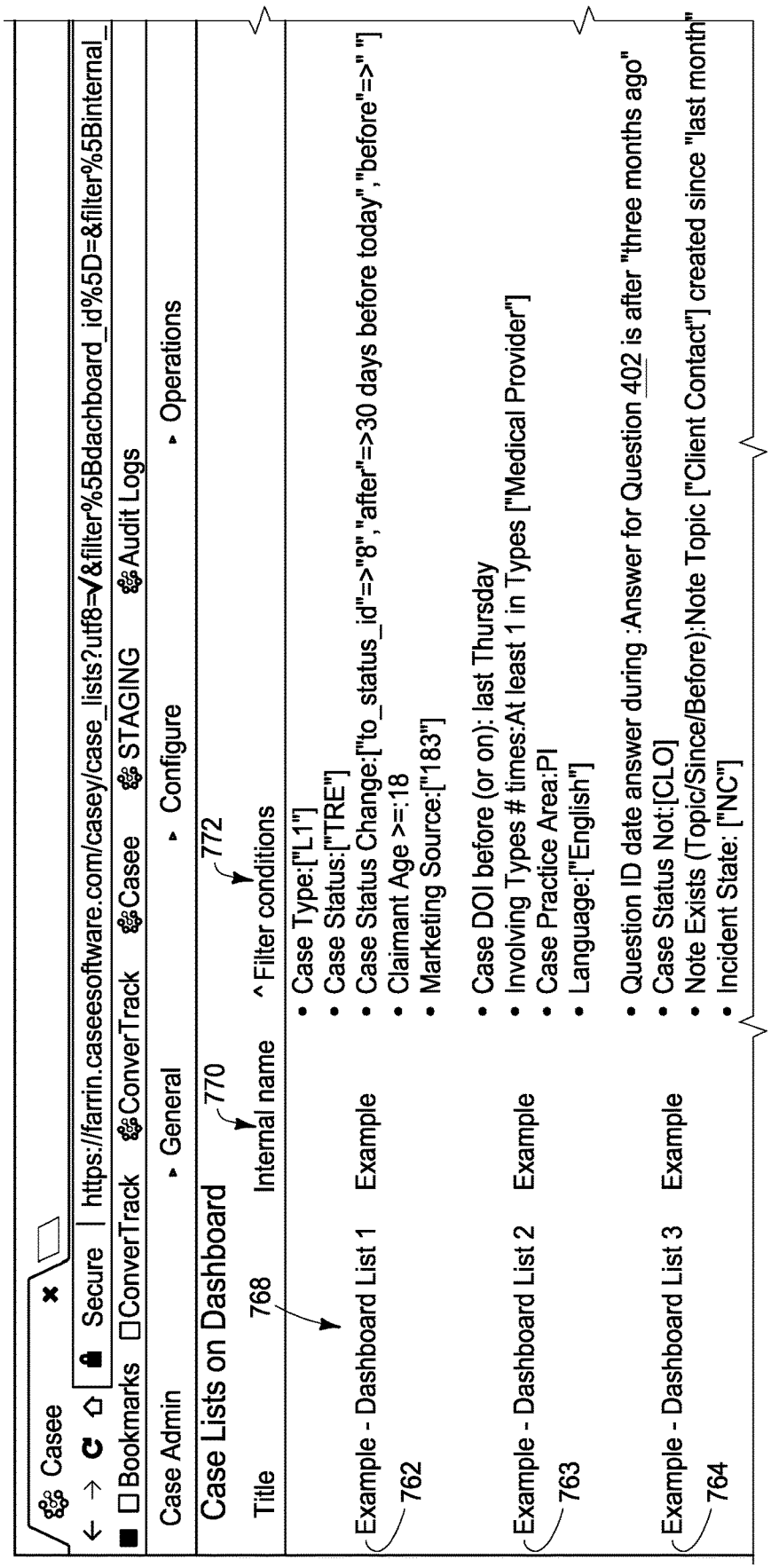
Figure 33B:
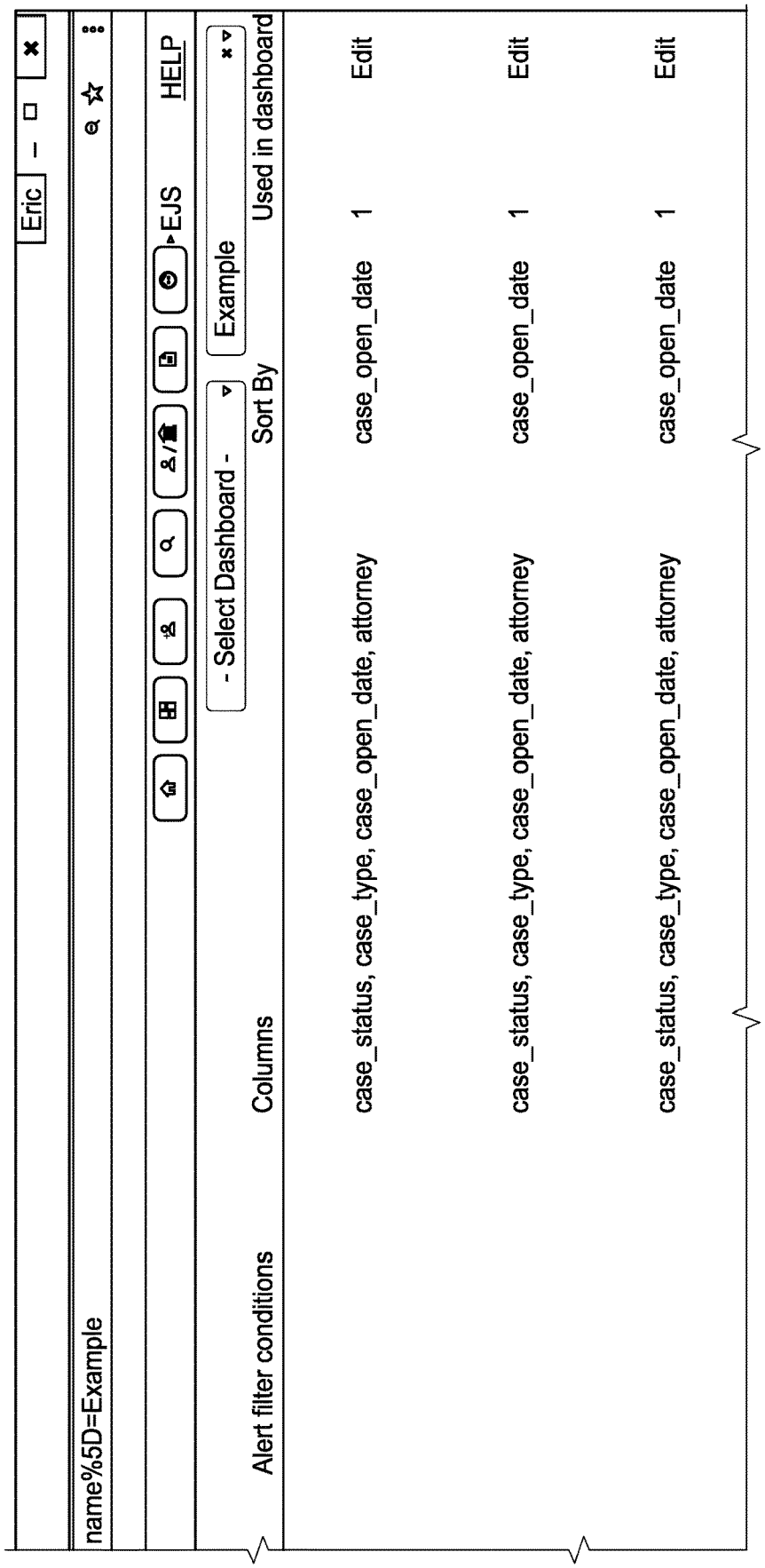
Figure 33D:
Figure 34A:
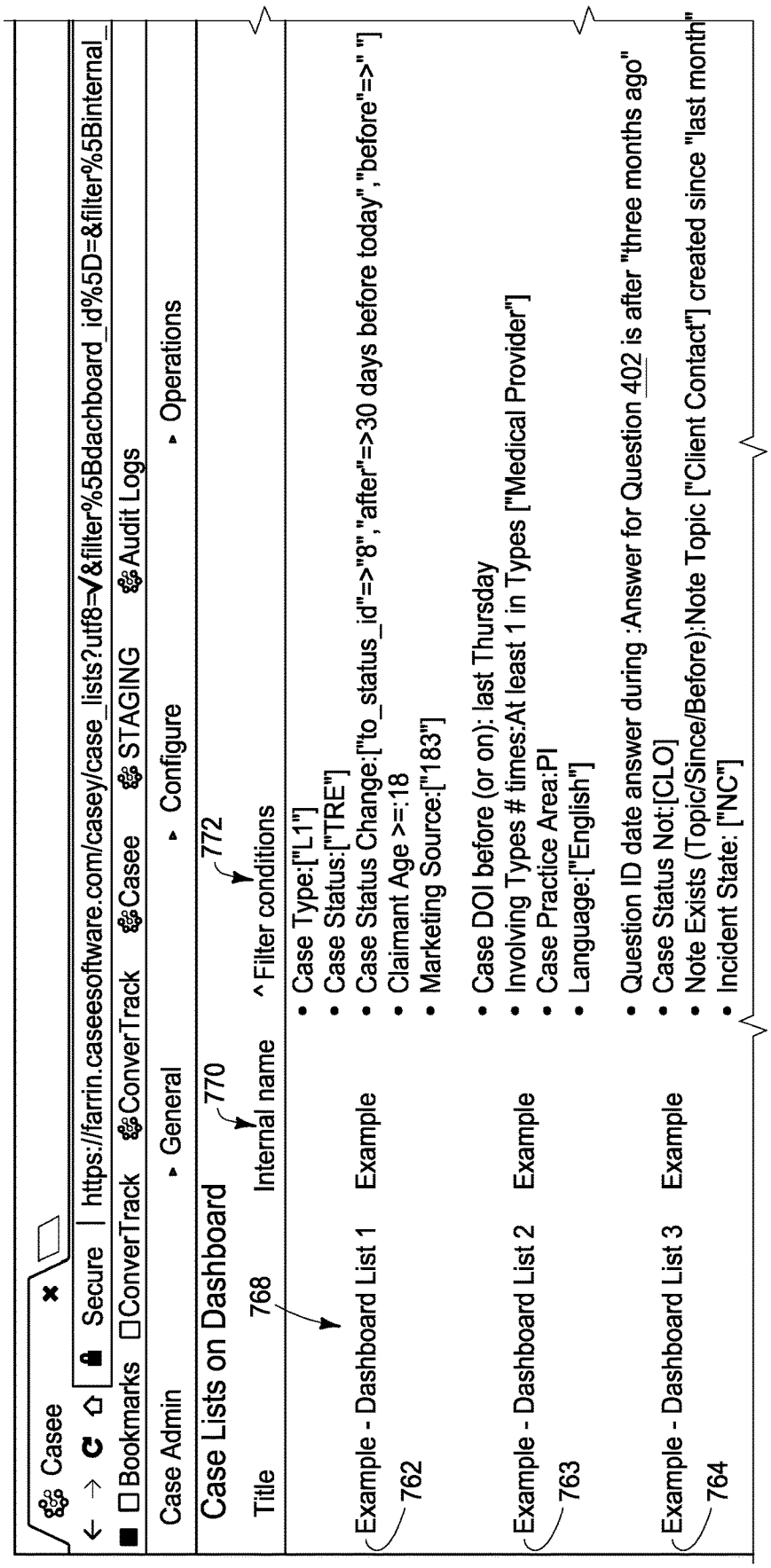
Figure 34:
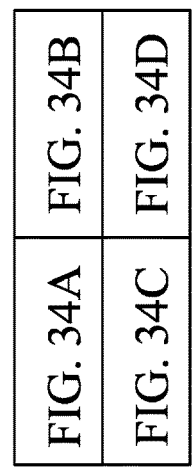
FIG. 34 is a map illustrating how
Figure 34B:
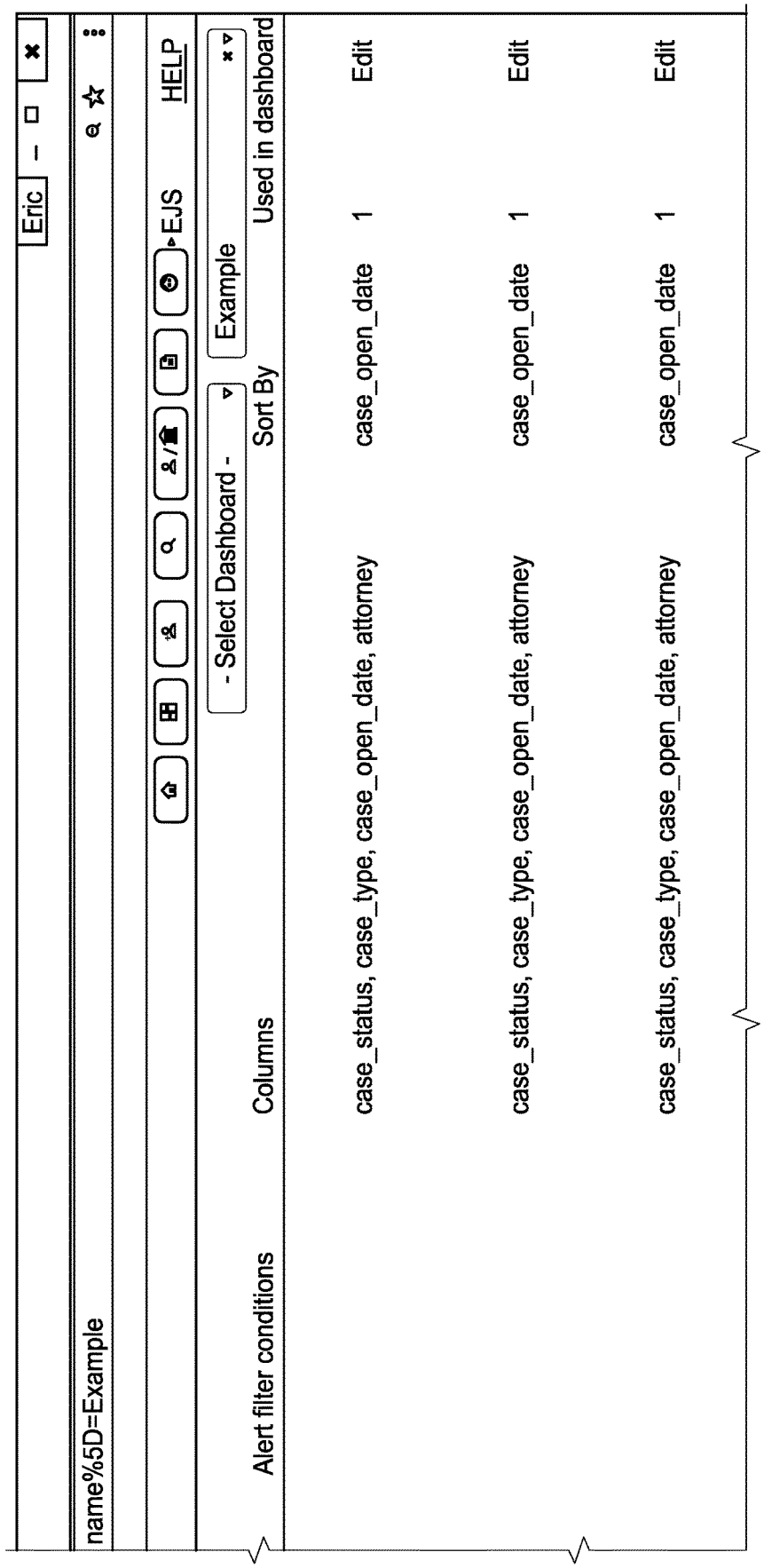
Figure 34D:
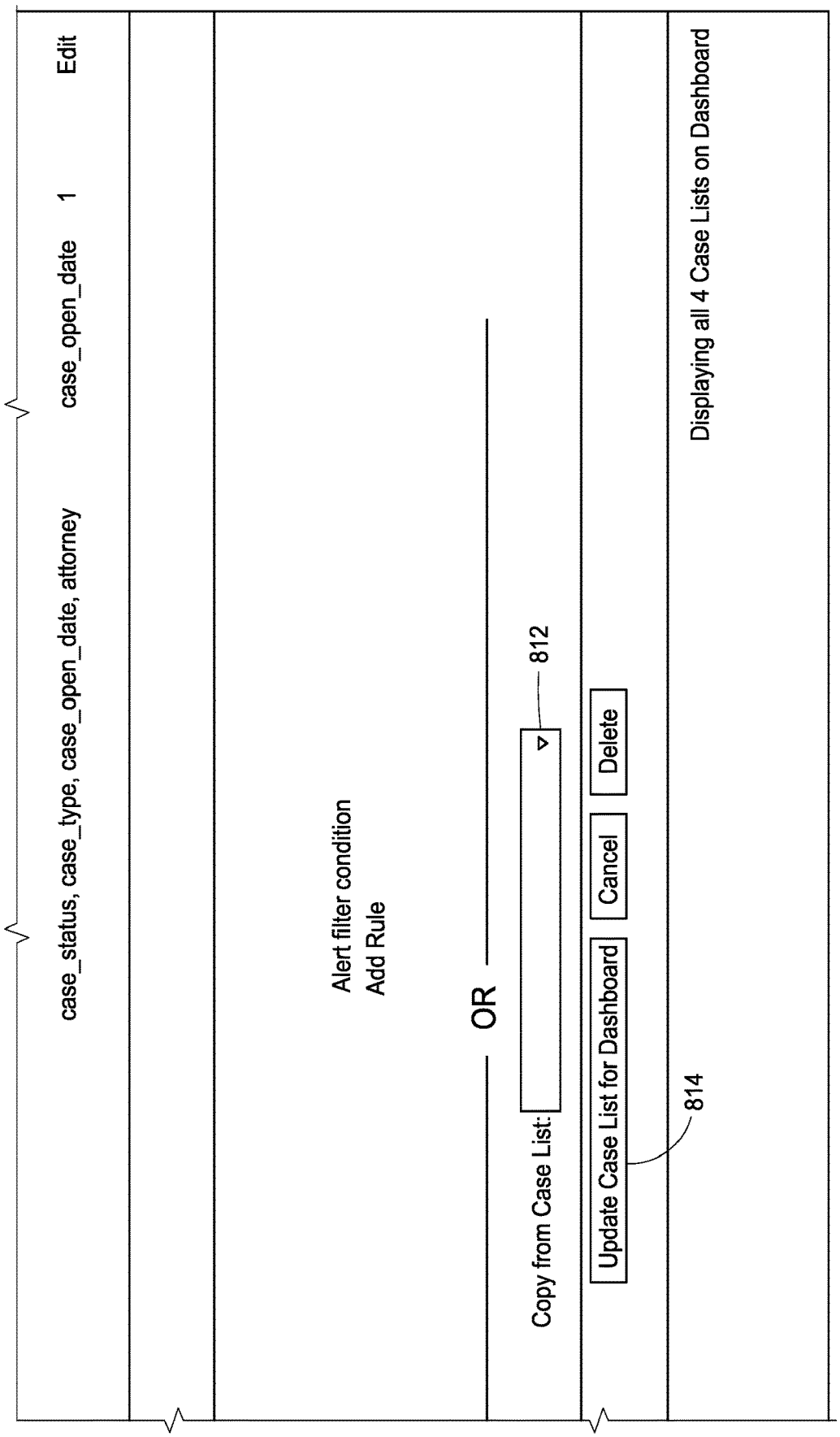
Figure 35B:
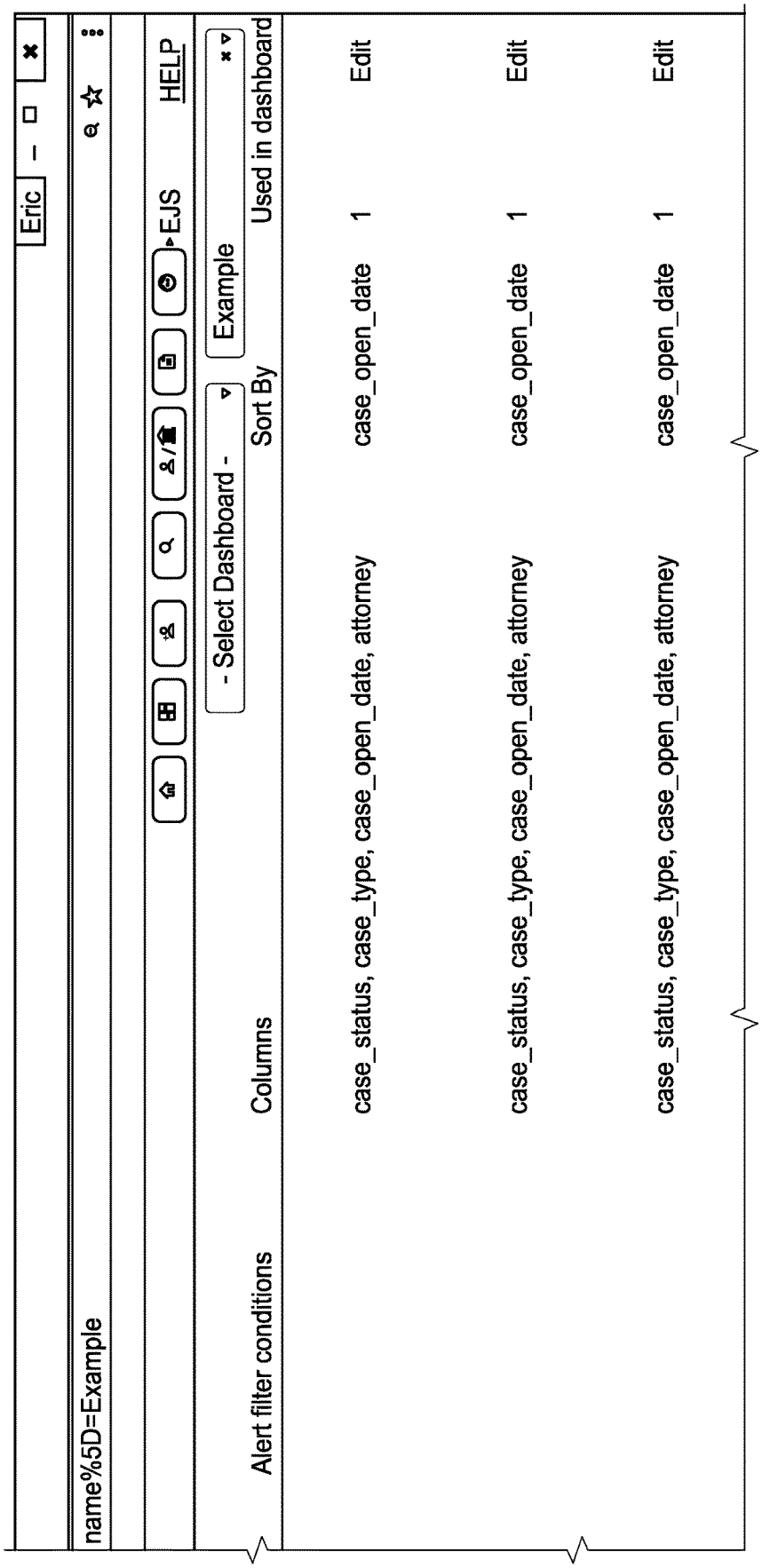
Figure 35D:
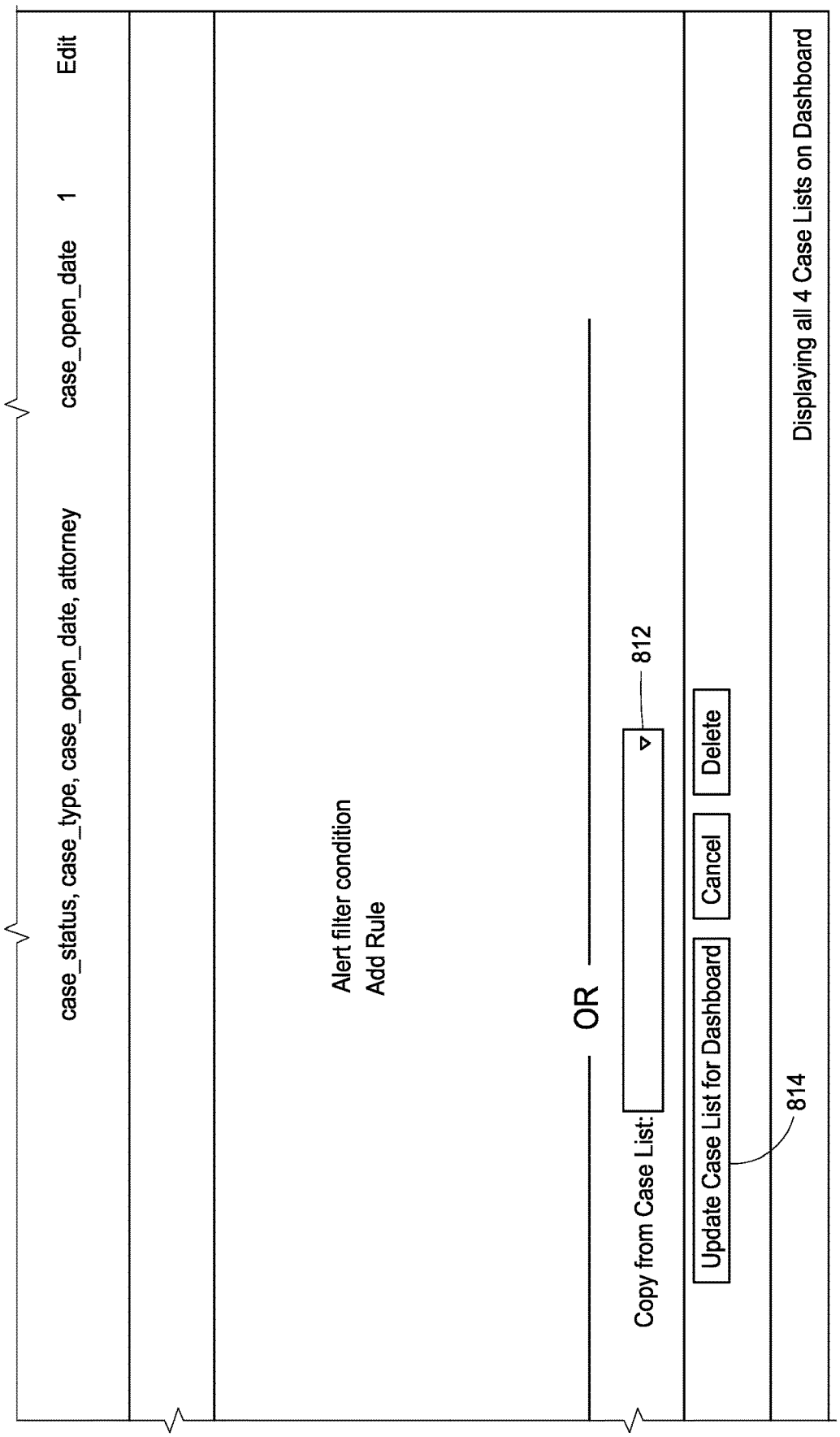
Figure 36A:
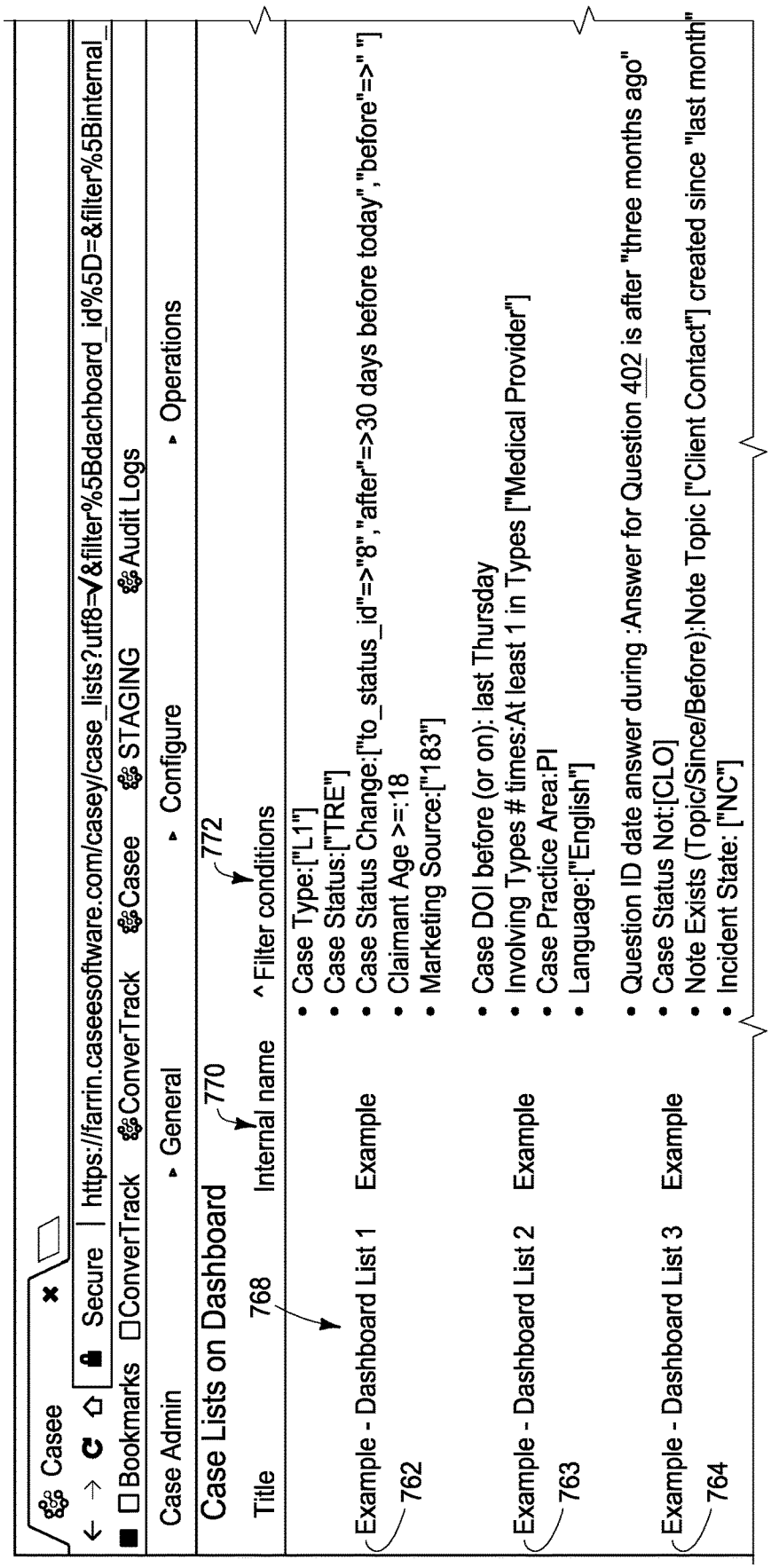
FIGS. 36A, 36B, 36C, and 36D are to be assembled.
Figure 36B:
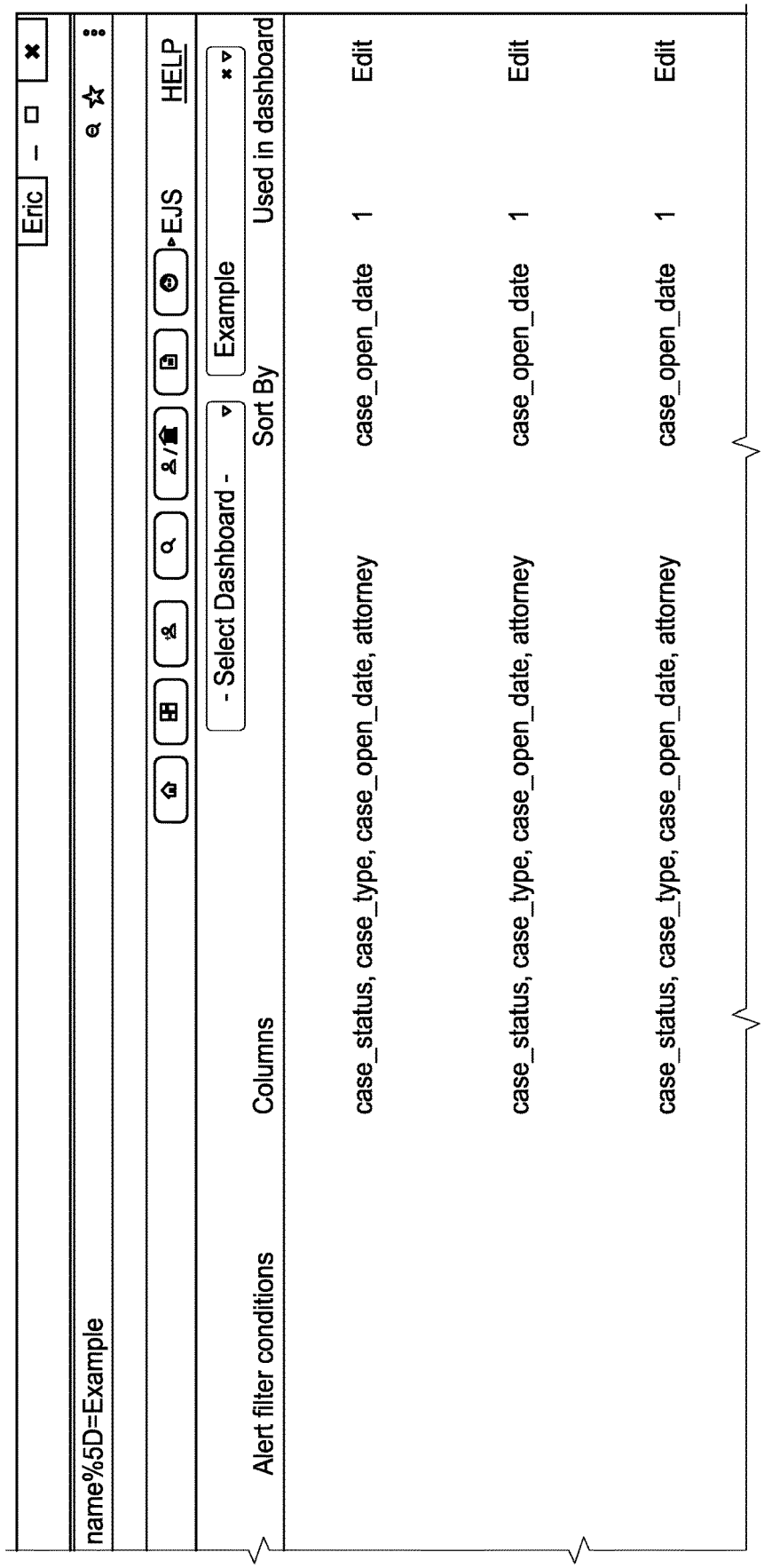
Figure 36C:
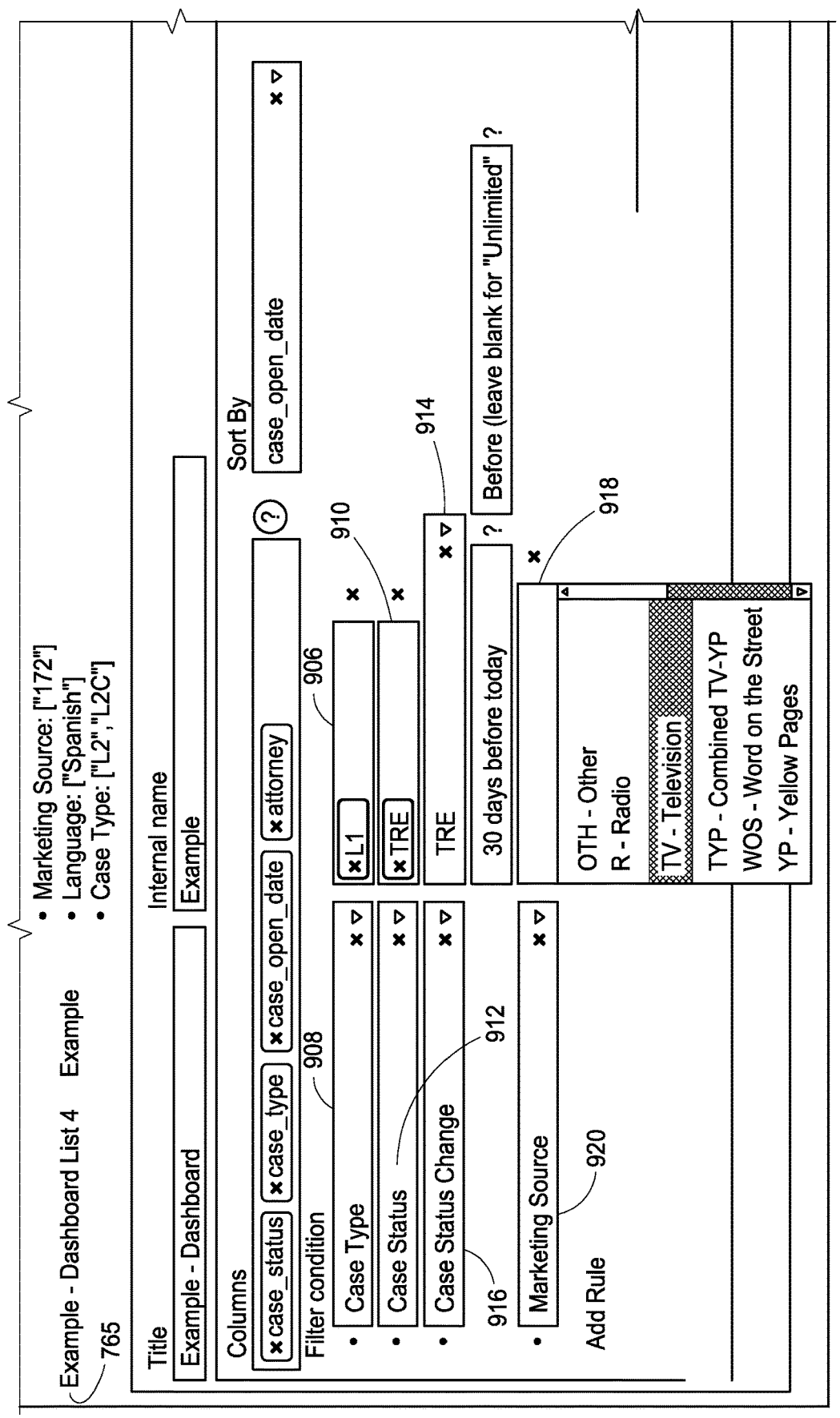
Figure 36D:
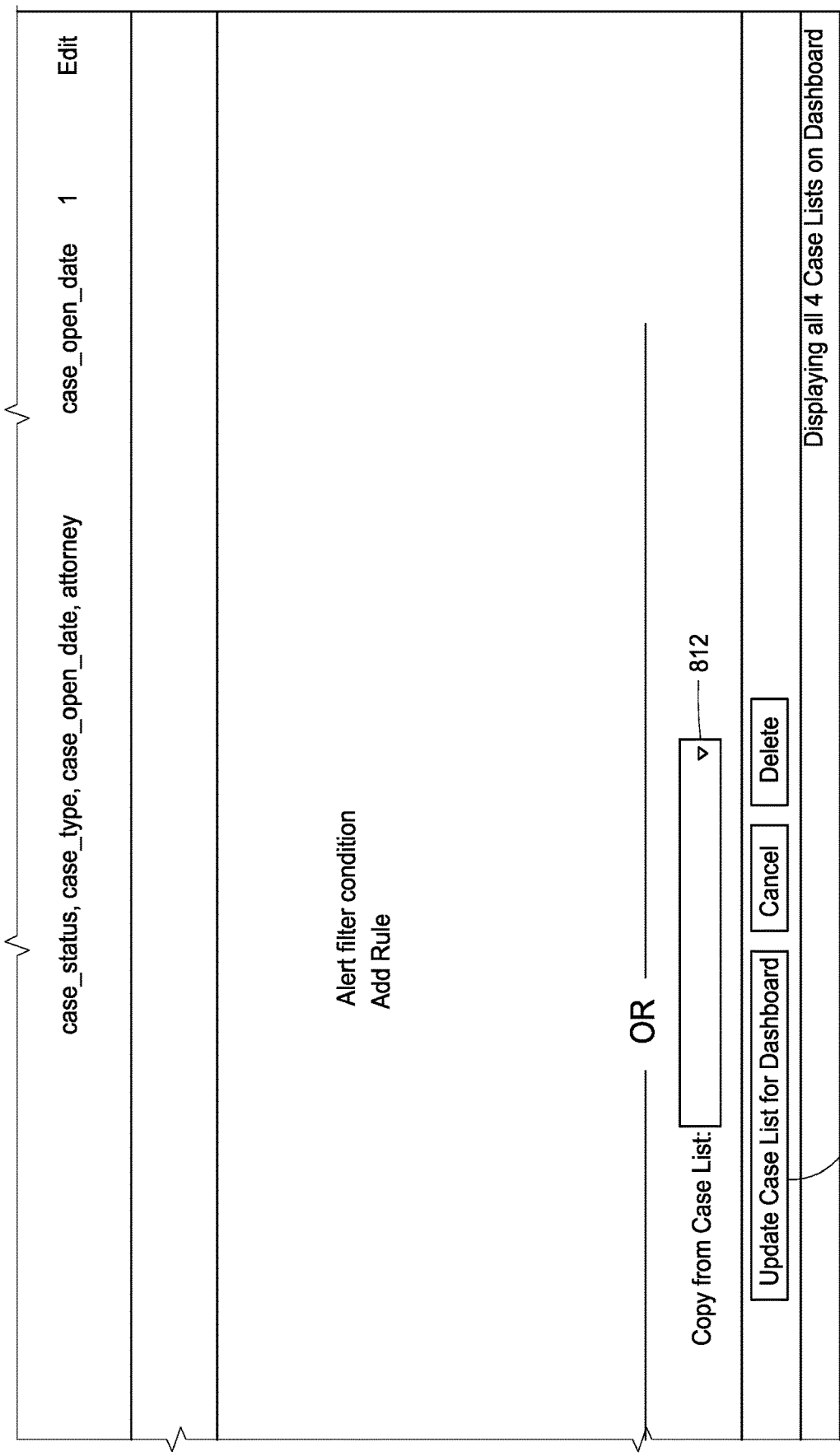

FIGS. 30A, 30B, 30C and 30D illustrate a graphical user interface screen 820, similar to the screens 760 and 790, except showing how dashboard list definition 765 is added. As shown in FIGS. 31A, 31B, 31C, and 31D, a case rule pull down menu 902, corresponding to pull down menu 802 of FIGS. 29A and 29B, is pulled down from the graphical user interface of FIGS. 30A and 30B by a user. FIGS. 32A, 32B, 32C, and 32D show a second case pull down menu 904 being pulled down from the graphical user interface of FIGS. 30A and 30B.

FIGS. 33A, 33B, 33C, and 33D show a rule being added to the definition 765 using pull down menus 906 and 908. In the illustrated embodiments, a rule is being added that requires a case type to be "L1" or level one to appear in the list defined by definition 765.

FIGS. 34A, 34B, 34C, and 34D show another rule, relating to case status in the illustrated embodiments, being added to the definition 765 using pull down menus 910 and 912.

FIGS. 35A, 35B, 35C, and 35D show yet another rule, relating to case status change in the illustrated embodiments, being added to the definition 765 using pull down menus 914 and 916.

FIGS. 36A, 36B, 36C, and 36D show yet another rule, relating to a marketing source in the illustrated embodiments, being added to the definition 765 using pull down menus 918 and 920.

Thus, some embodiments provide a method for displaying task list information in a user interface, the method including: displaying, on a screen, the total number of open matters being handled by a law firm and dynamically adjusting the number as matters are opened and closed; displaying, on the screen, for respective practice areas, the number of open matters for each practice area and dynamically adjusting the numbers as matters are opened and closed; and displaying, on the screen, in a grid, a number of lists, the lists displayed being user selectable from a plurality of available lists, respective lists including rows respectively including a matter number, practice area, matter name, attorney initials, and assistant initials. In some embodiments, the available lists include a list of new matters opened in a certain period of time, such as in the last seven days. In some embodiments, the available lists include a list of cases rejected by the firm in a certain period of time, such as in the last seven days. Each list includes a user-actuatable element which, if actuated, maximizes a list such that only the maximized list is visible, in some embodiments. In some embodiments, the matter numbers are hyperlinks that, if actuated, cause a matter screen to be displayed in which detailed information about the matter is shown, such as client name, date of birth, incident location, incident location, and incident date. In some embodiments, the matter screen further displays notes, reminders and documents. In some embodiments, the matter screen further displays information regarding a source of the client.

Figure 37B:
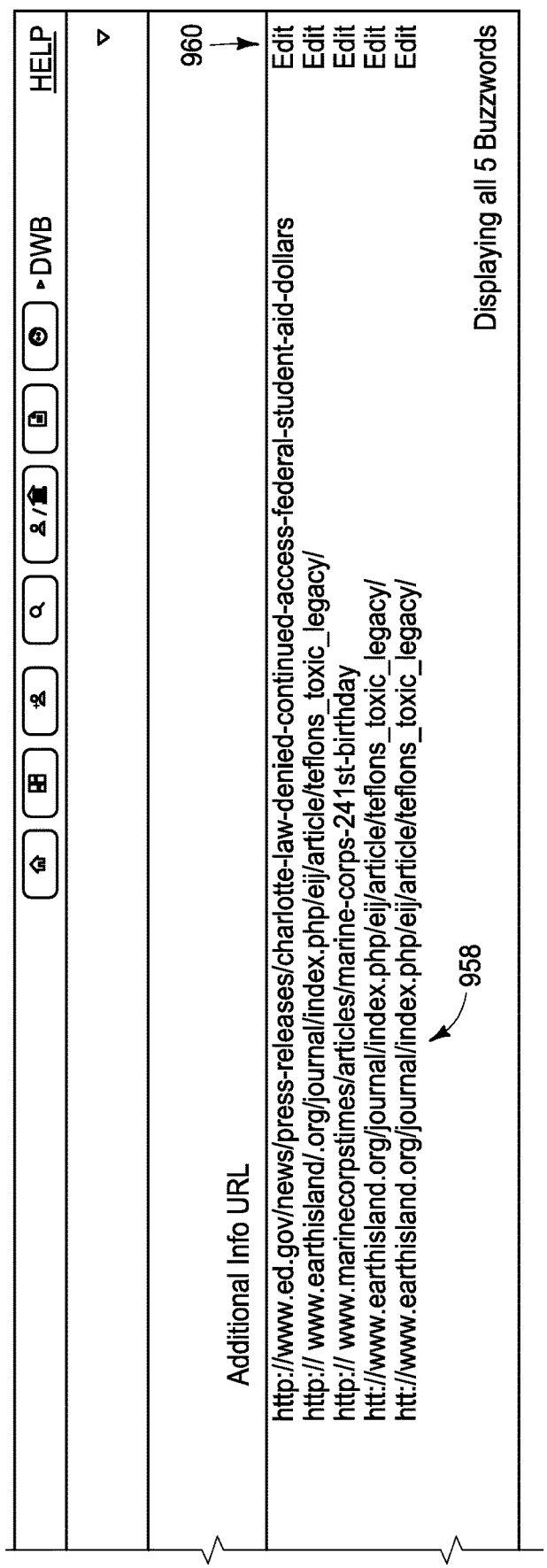

In some embodiments, a list of buzzwords can be created, as will be described below in more detail. FIGS. 37A and 37B show an administrator user interface screen 950 from the case management system 1704 (see FIG. 53) showing a list of rows 952 containing buzzwords. More particularly, in the illustrated embodiments, the rows 952 include a column 954 for buzzwords, a column 956 containing information associated with respective buzzwords, and a column 958 containing hyperlinks such as uniform resource locators (URLs) for websites, or a path to a specific file on the user's network, providing information about respective buzzwords. In the illustrated embodiments, the rows 952 further include Edit links 960. If a link (or button or other element in alternative embodiments) 960 of a row 952 is clicked or actuated by a user, the user can edit the buzzword of the row, using a screen area 962 (shown in FIGS. 38A and 38B). The screen 950 further includes a new buzzword button (or link or other element) 964 which, if actuated, brings up a screen area similar to the screen area 962 except with blank text boxes for setting up a new buzzword.

Figures 38, 38A:
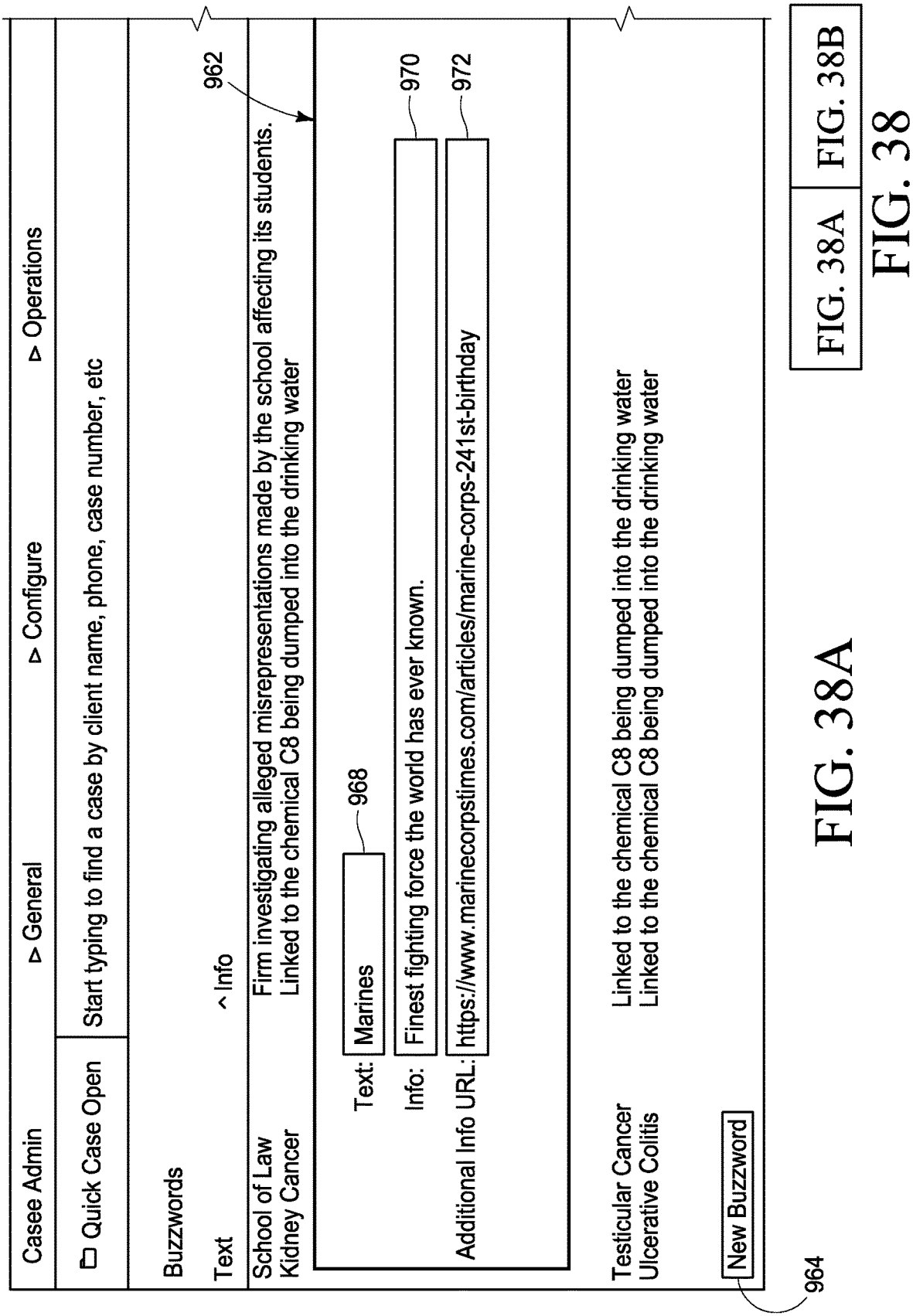
FIG. 38 is a map illustrating how
FIGS. 38A and 38B are to be assembled.
Figure 38B:
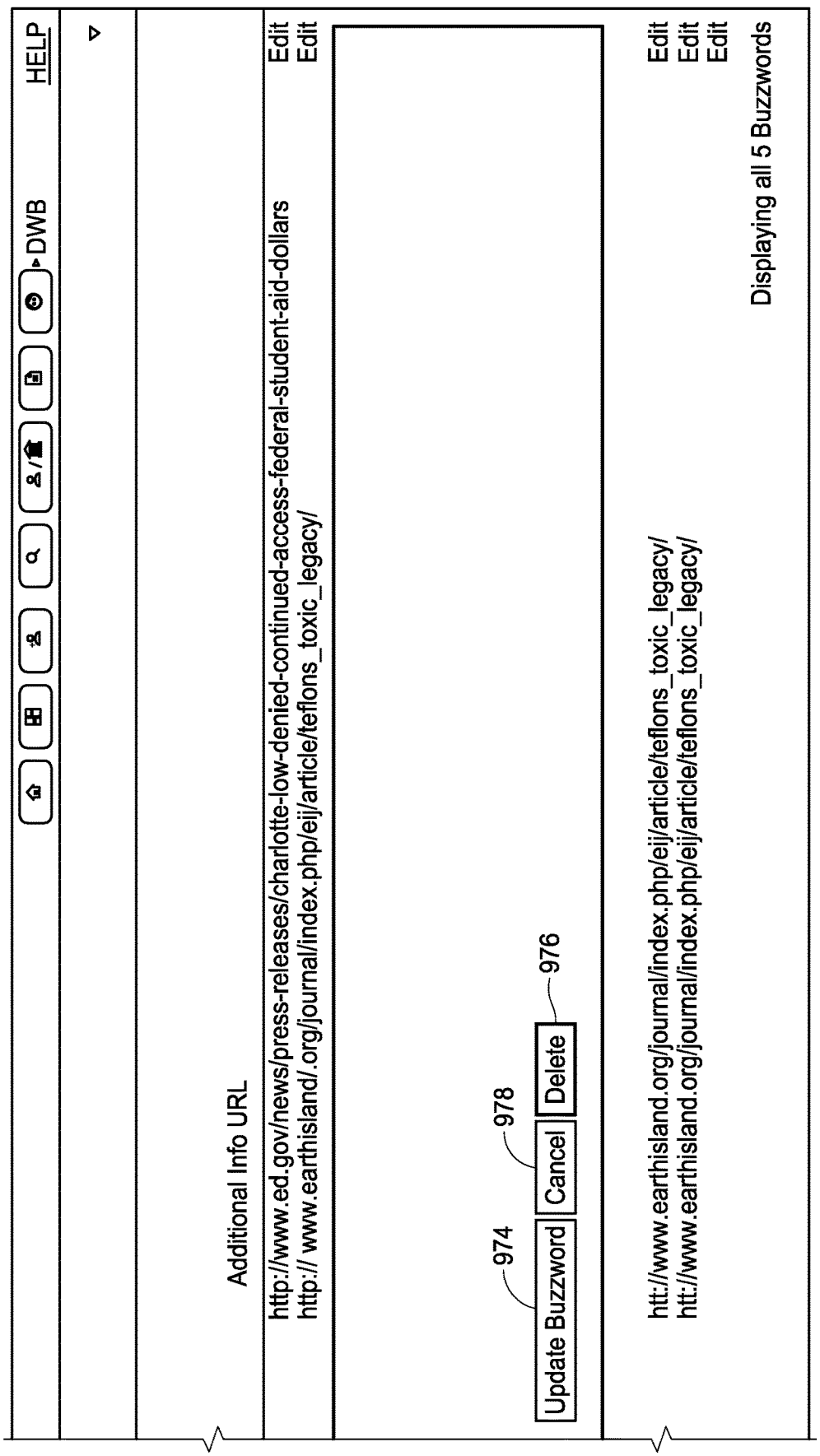
Figures 39, 39A:
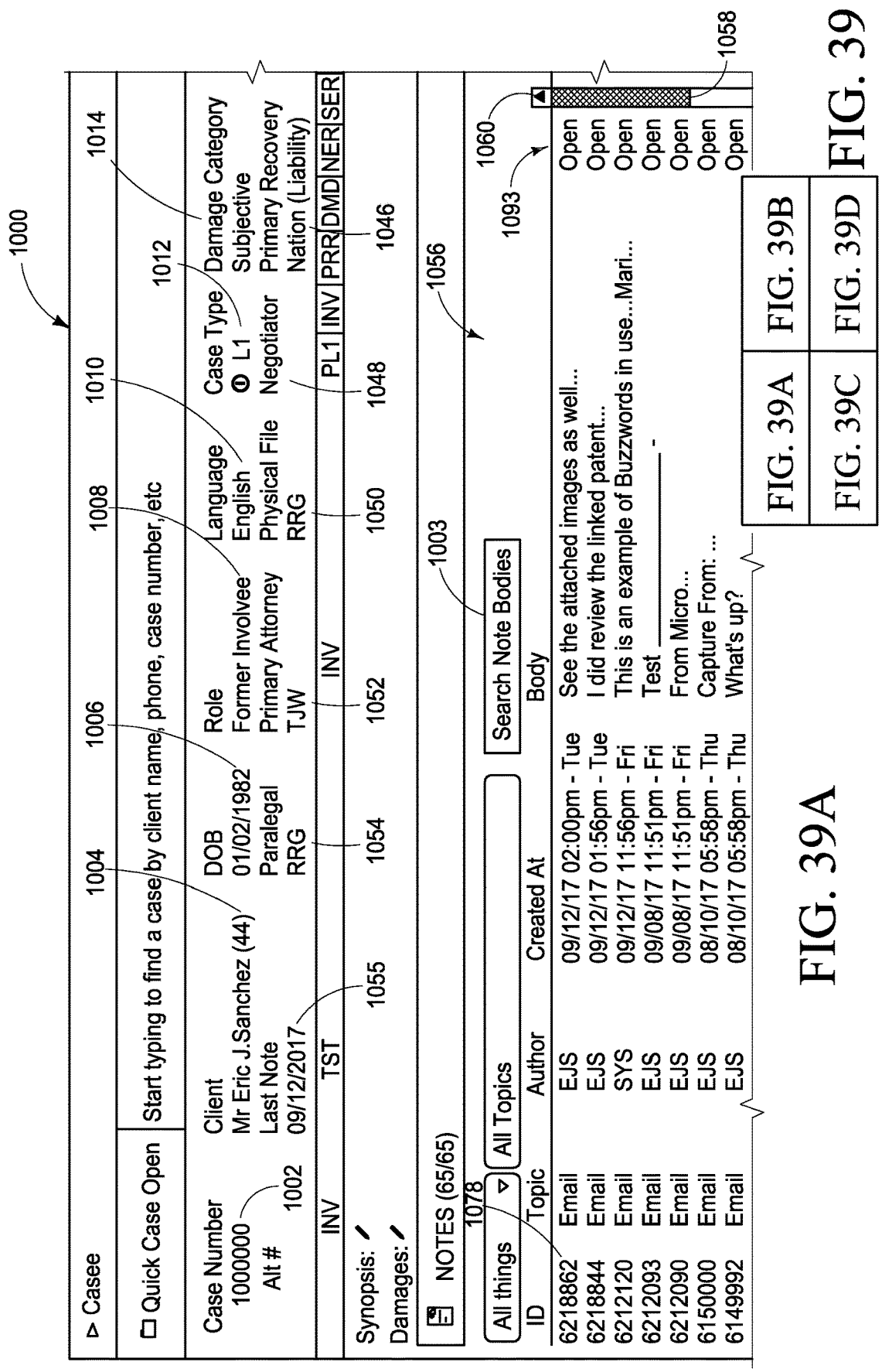
Figure 39D:
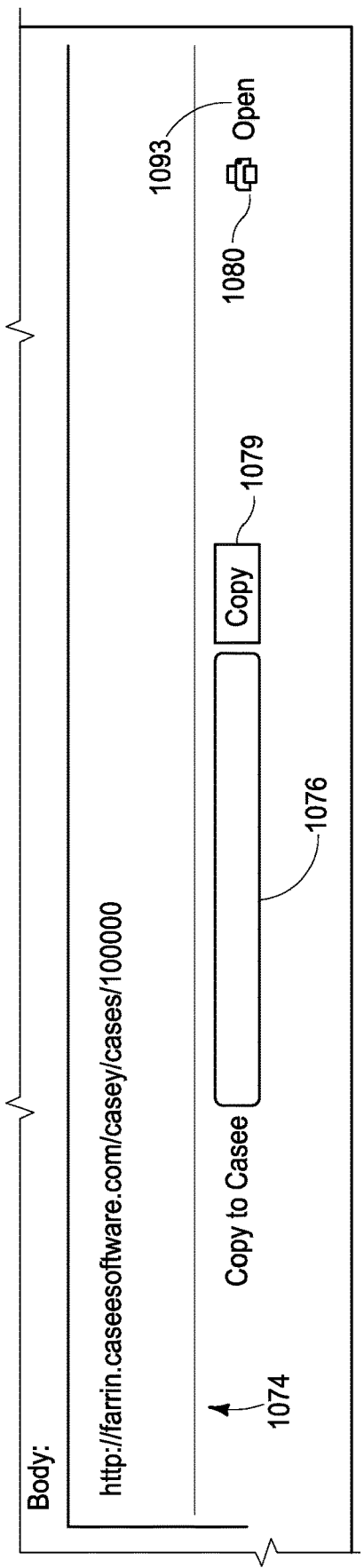
Figure 40D:
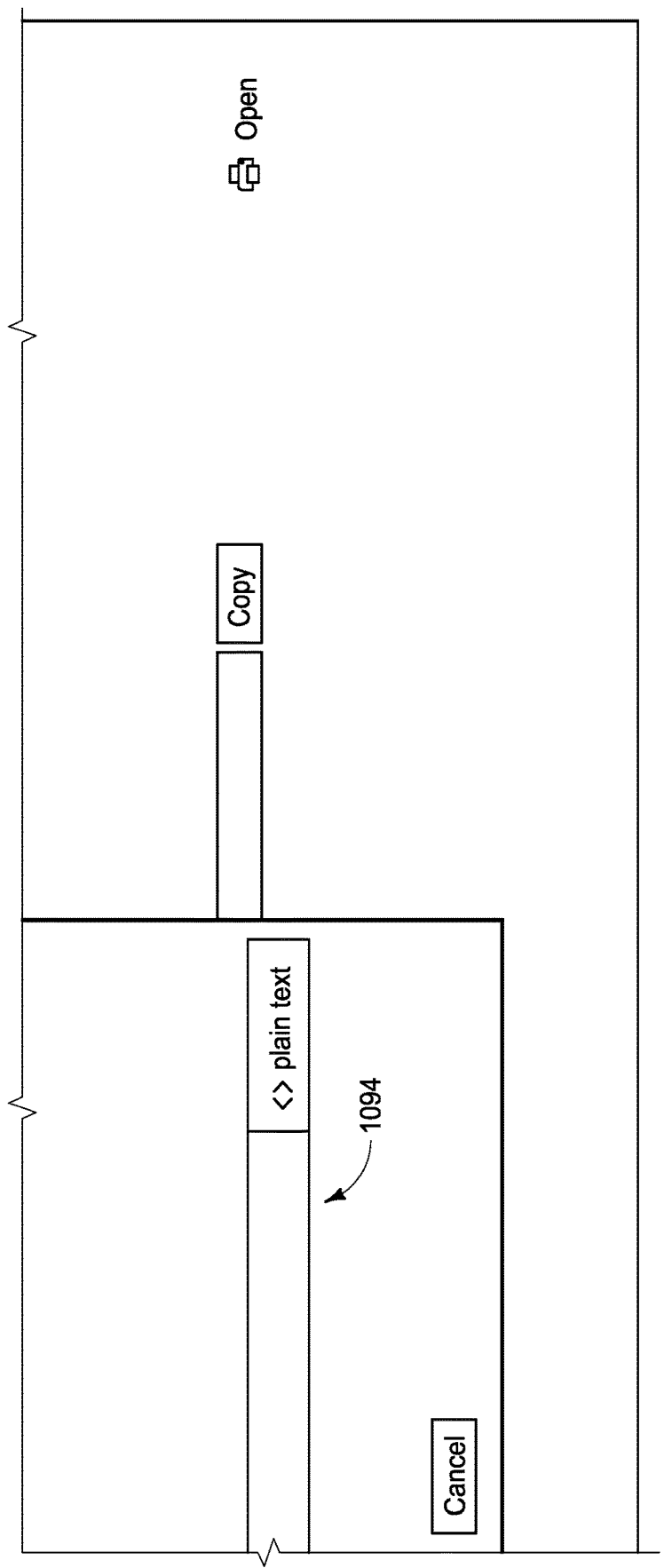
Figure 41D:
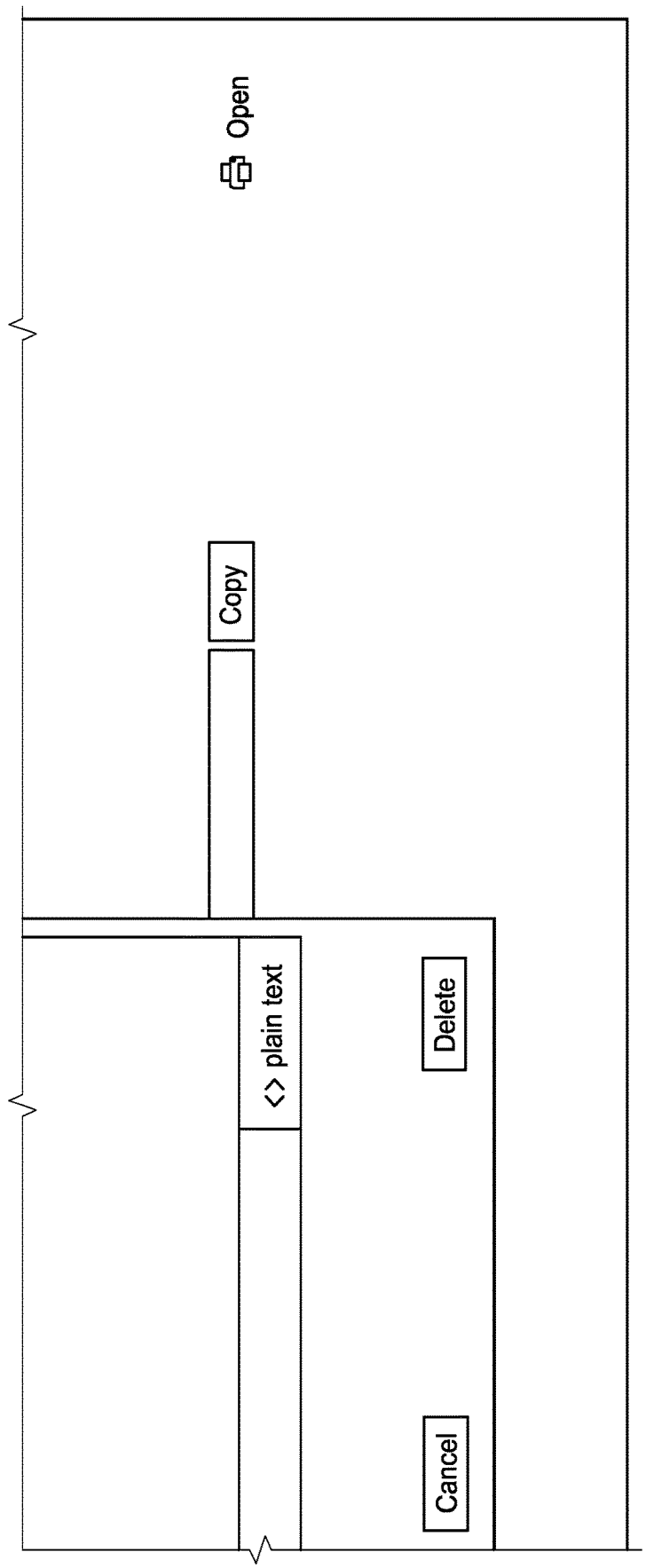

FIGS. 38A and 38B show an administrator user interface screen area 962 for editing or adding a buzzword. In the illustrated embodiments, the screen 962 was generated after a user clicked on a link 960 (see FIG. 37B) for the row 966. In the illustrated embodiments, the screen area 962 is a pop up or expanded area of the screen 950. In some embodiments, where a buzzword is being edited (see FIGS. 38A and 38B), the screen area 962 is a height expanded area or otherwise displayed within the rows 952 of buzzwords. The screen area 962 includes a text box 968 for the buzzword, in the illustrated embodiments. The screen area 962 further includes a text box 970 with the information (from column 956 shown in FIG. 37A) about the buzzword, in box 968, that will be shown to a user when a buzzword is typed, in the illustrated embodiments. The screen area 962 further includes a text box 972 with the hyperlink (from column 958) for the buzzword in box 968, in the illustrated embodiments. Text may be entered or edited in the boxes 968, 970, and 972. The screen area 962 further includes a button 974 which, if clicked by a user, updates a buzzword (or completes the creation of a new buzzword), a button 976 which, if clicked by a user, deletes an existing buzzword, and a button 978 which, if clicked by a user, cancels the editing (or creation) of the buzzword. If a buzzword is being added, the screen area 962 appears below the rows 952 or as a new screen or pop up, in some embodiments.

In some embodiments, only certain users (e.g., administrators), having a higher clearance than other users, may add or edit buzzwords.

FIGS. 39A, 39B, 39C, and 39D show a user interface screen 1000 from the case management system 1704 (FIG. 53). In the illustrated embodiment, the system organizes the database to maintain separate database areas for separate matters, customers, or projects. A matter may be a legal matter, for example. In the illustrated embodiments, a particular matter, as shown in FIGS. 39A, 39B, 39C, and 39D includes information (e.g., stored in fields in one of the databases) for the matter or project number 1002, the name 1004 of the client or customer, the client's date of birth 1006, the client's role 1008, the client's language 1010, the case or project type 1012 (or priority or importance level), a damages category 1014, case status 1016, the department 1018 in the firm handling the matter, the source (if any) 1020 of the client, the name of the person 1022 who referred the client (if applicable), the state 1024 in which the incident occurred, the state 1026 whose statute of limitations controls, the age 1028 of the case, the value 1030 of the case, the tolling date 1032 (if applicable) for the statute of limitations, the statute of limitations date 1034, the incident date 1036, the matter closed date 1038, the matter opened date 1040, the health insurance company 1042, primary recovery source (e.g., insurance company) information 1046, the negotiator 1048, information 1050 about the location of the physical file (if any), the primary attorney 1052 (initials, nickname, or full name), and the paralegal 1054 (if any) (initials, nickname, or full name), and date 1055 of the last note. Fewer, more, or different items can be stored for each matter or project in alternative embodiments depending on the type of matter or business and what data is value for a project or customer. Some items may be left blank for some cases if the information is missing, unknown, or inapplicable.

In some embodiments, the screen 1000 of FIGS. 39A, 39B, 39C, and 39D more particularly includes a notes panel or screen area 1056 that includes all this information for a matter whose number is indicated in 1002, as well as a list of notes 1708 associated with the matter whose number is indicated in 1002. The screen 1000 includes multiple different collapsible and expandable panels including the notes panel 1056. In some embodiments, the panels can be rearranged by a user in any desired order. In the illustrated embodiment, a user can quickly scroll through the area 1056 by dragging a scroll bar 1058 or by actuating down or up arrows 1059 or 1060. A user can also move through notes one row at a time by clicking on a note and then hitting up or down keyboard buttons or clicking on navigate up button 1061 or navigate down button 1063. A user can also navigate to the top of the list of notes by clicking on top button 1065 or bottom button 1067. As a user moves up or down through the list, the details for a note corresponding with a row highlighted in area 1056 are displayed in a preview screen area 1074. Thus, it is not necessary to open the note to see the contents of the note.

The list of notes includes columns for the note's ID 1062, the note's topic 1064, the author 1066 of the note (initials or full name), the note creation time and date 1068 (could be separate columns in alternative embodiments), the start 1070 of the body of the note (or the subject of the note), and an element 1072 indicating whether the note is open or closed. The topic 1064 for a note can be changed by right clicking on the topic name for a note. The user is then presented with a pop up window or area including a list of topics and can click on any of the presented topics.

One of the notes 1708 displayed in the area 1074 can be copied to another matter, case, or file by typing the matter number in the text area 1076 and clicking copy button 1079. Alternative methods of indicating the destination matter are possible, such as by scrolling through a list of cases and clicking on the desired destination. Copying a note can be useful when there are companion cases, for example. There is an ability to search for text anywhere in the matter by typing a search term in a window 1003.

A note can be printed by clicking on a print button 1080, in the illustrated embodiments. A new note can be composed for a matter by clicking on an open button 1082.

The preview area 1074 also displays a note number 1084, a matter number 1086, the author 1088, the recipient or recipients 1089, a subject 1090, and a creation date 1091 and date modified 1092.

A note can be opened, instead of just being previewed, by clicking on a button or element 1093, which brings up a rich text editor window or screen area 1094 as shown in FIGS. 40A, 40B, 40C, and 40D that provides additional functionality.

When composing or editing a note in the area 1094 (FIGS. 40A, 40B, 40C, and 40D), it is possible to use bolding, italics, and underlines (using buttons 1095, 1097, and 1099, respectively), and the note is spellchecked. Each term or word typed is spellchecked against a dictionary which can be an internal or external dictionary to highlight and/or correct common misspellings in accordance with commonly known spellcheckers. In some embodiments, the spellcheck occurs in the manner disclosed in U.S. Pat. No. 5,604,897, which is incorporated herein by reference. In the illustrated embodiments, the spellcheck is performed on the fly as each word is typed. In other embodiments the spellcheck can be performed after the note has been completed. Other features common in rich text editors are also provided, in various embodiments.

In addition to being spellchecked, terms typed into the area 1094 are compared against the buzzwords. If there is a match, a pop up 1096 or other display indication is provided (see FIGS. 41A, 41B, 41C, and 41D) to indicate to the user that there is a match against a buzzword. A buzzword can be, for example, the name of a drug, procedure, product, problem, or other item that can lead to an opportunity for additional marketing or to solve a problem. A certain drug can cause a certain problem, for example. A client may be being treated using that drug in an unrelated matter. When a user types the drug name in the area 1094 for a note in the unrelated matter, the pop up provides an indication to speak to other staff members or to consider opening a new matter, for example. Further, buzzwords can include common misspellings of other buzzwords so that the buzzword comparison captures relevant occurrences even if the potential buzzword is spelled incorrectly. For example, if a buzzword is created for the word "Antihistamine," the buzzword list can include common misspellings such as "antihystamine," "anti-histamin," "antihisstamin," auntyhistamine," "anthistamyn," "antihystamyn," "antihistimyne" and "antyhistimin," etc.

Figure 42:
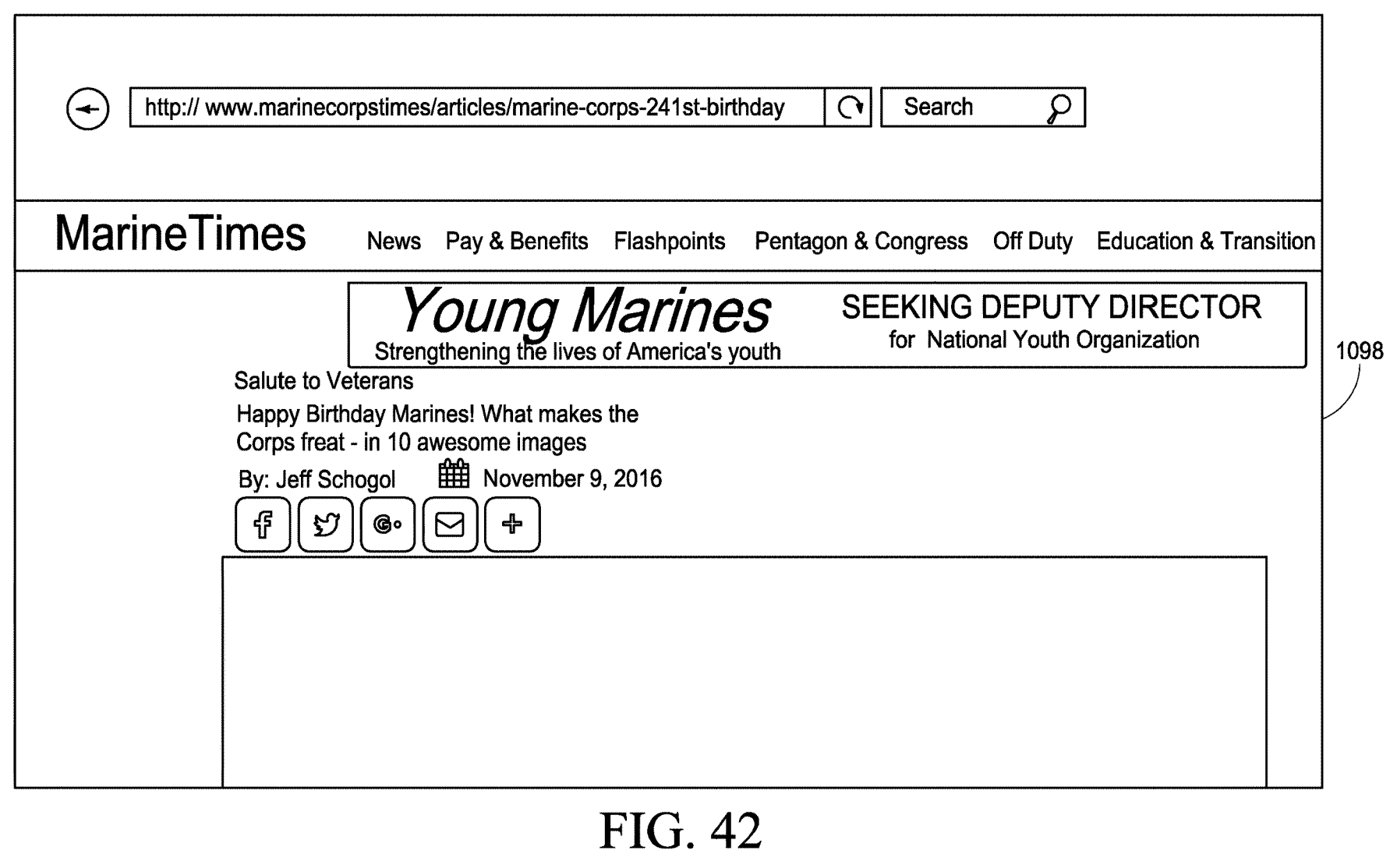

If the user interacts with the buzzword, such as by clicking on the pop up or display area 1096, a new window or display area 1098 appears (see FIG. 42) that provides information about the term that triggered the pop up. In the illustrated embodiments, the display area 1098 is a browser window that is launched with a hyperlink that is shown in the area 972 of the administrative screen of FIGS. 38A and 38B. Such display areas are collectively referred to as descriptive pages.

Figure 43:
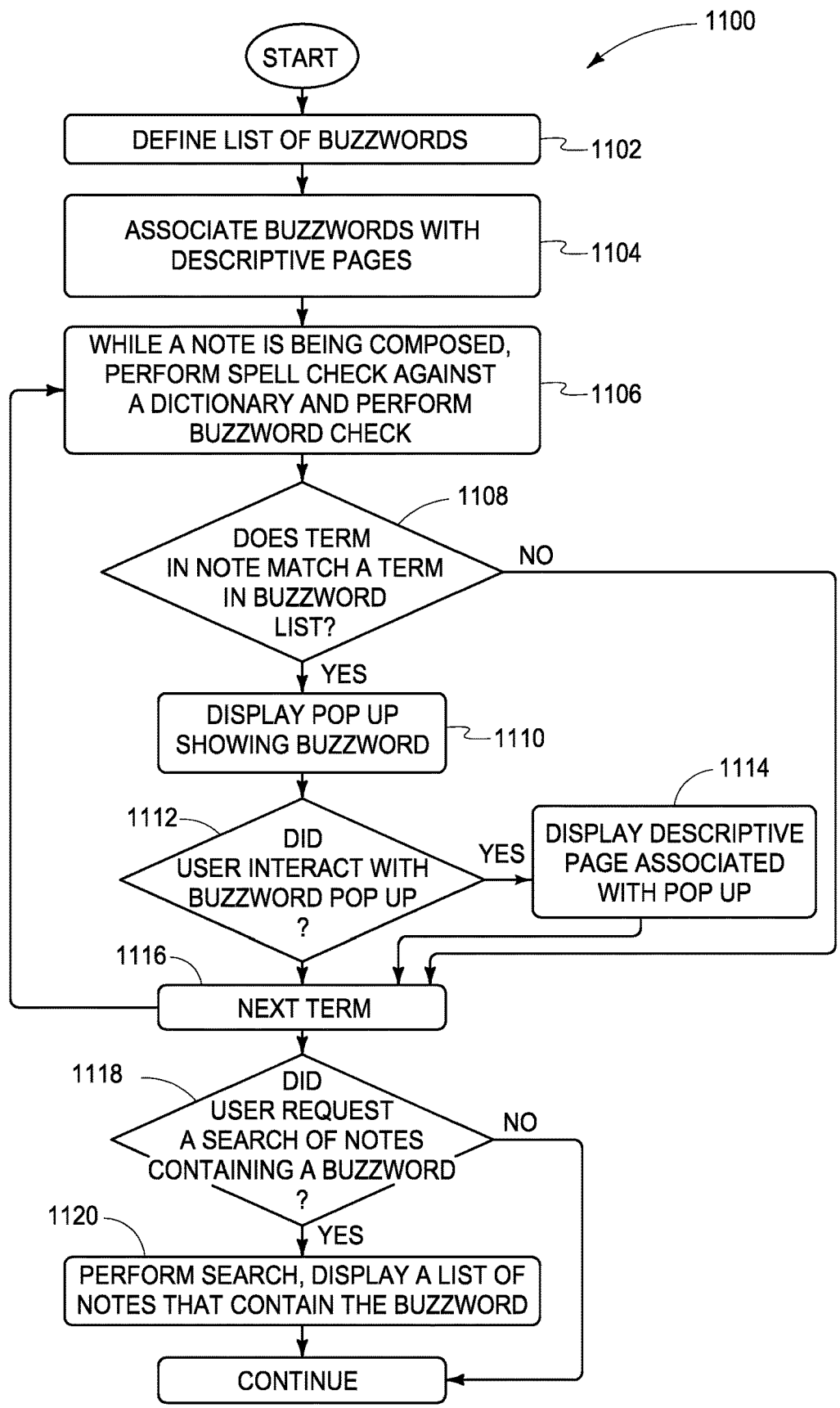
FIG. 43 is a flowchart illustrating operation of a method of using the case management system of FIG. 27A-D.

FIG. 43 is a flowchart illustrating operation of method 1100. In 1102, a list of buzzwords is defined; e.g., in a database such as database 40 or 42.

In 1104, each buzzword is associated with a descriptive page, such as by making an entry in the database associating each word with a hyperlink or document. The descriptive pages can be, for example, web pages defining or describing the significance of the buzzword.

In 1106, while a note is being composed (e.g., in a rich text window), each term or word typed is compared to terms in the buzzword list. In some, but not all embodiments, each term or word typed is also spellchecked against a dictionary which, in the illustrated embodiments, is separate from the buzzword list. In the illustrated embodiments, the buzzword check is performed on the fly as each word is typed. In other embodiments, the buzzword check can be performed after a note has been completed.

In 1108, a determination is made as to whether a term in the note matches a term in the buzzword list.

If so, in 1110, a pop up or other element is displayed to indicate to the user that the term matches a buzzword. The user may then consider (or seek clarification from other people in the organization) whether there is an opportunity for cross-selling or for selling additional services. If not, the process continues to 1116.

In 1114, the descriptive page is displayed to the user. The descriptive page may be a webpage for the hyperlink associated with the buzzword, a document in a word processor, or some other type of document in an application or browser helper that exists on the Internet or on the user's network (including possibly on the user's own computer). The descriptive page display may take over the screen or may be in a separate window that appears. The user may close the page, such as by interacting with a graphical element, as any browser or word processor is closed, to return to the note being typed.

In 1116, the process proceeds to the next word or term being typed in the note until the note is completed. Upon completion, the note is saved to a particular matter or customer file.

A user can also search notes for all files to look for a buzzword or a new term. In 1118, a determination is made as to whether the user requested a search of notes to determine if a particular buzzword can be found in any of the notes.

If so, in 1120, the process performs the search and displays a list of hits (notes that contain the searched buzzword).

For example, if it is newly determined that a certain drug causes a certain disease, the notes of existing and completed client matters can be searched for that drug name (or the chemical composition of the drug or the name of generic equivalents). This may lead to existing or previous clients who may have a need to start a new matter. This provides a marketing opportunity.

The method of FIG. 43 can also be employed in a customer relationship management system for any type of business (not necessarily a law business).

Email is a form of communication that is frequently used in businesses. In many cases, email clients are used apart from a business entity's CRM or CMS. Users typically need to "copy-and-paste" email data into the CMS to associate the email data with a particular file, matter, or customer. Human "copying-and-pasting" is time consuming and, at times, prone to error as text may be omitted inadvertently.

If there is an attachment (e.g. .PDF) the attachment is typically held in a separate location (e.g. network file server) or, for a more advanced CRM or CMS, can be manually uploaded into a document section of the CRM or CMS.

In various embodiments, the system 10 includes a mail server 1702 (see FIG. 53) and users have email client applications at their workstations, in addition to the case management system 1704 described herein. Frequently, the users will receive email from clients (customers), other attorneys, adjusters, or other people concerning a matter in the case management system 1704. They do not need to cut and paste the content into the case management system 1704 in the illustrated embodiments.

In various embodiments, the case management system 1704 database structures have case numbers, file IDs, or file numbers for each file (e.g., case number "1000000"). The case number serves as the customer or client file address within the case management system 1704, in the illustrated embodiments.

The case management system 1704 is configured to have a system email address (e.g., CMS@InnovativeCMS.com) in various embodiments. This allows for any email client of any kind to send an email to the case management system 1704. When a case number is included in the subject line and identified by predefined special characters such as brackets (e.g., "[1000000]") and sent to the system email address (e.g., CMS@InnovativeCMS.com), the email is "captured" into the client record automatically, and if any file attachments present, the files are held in the file section of the client management system.

Figure 44:
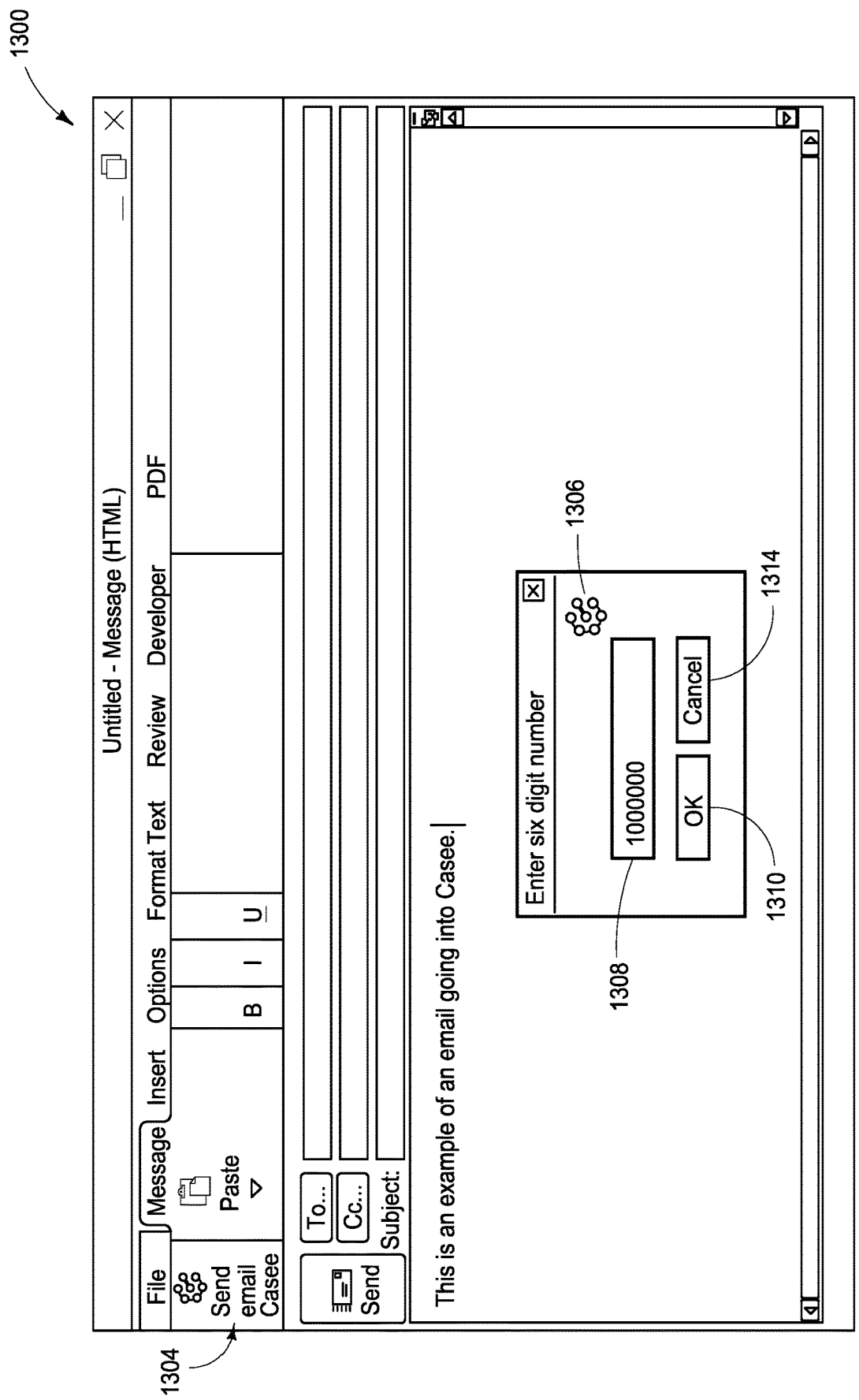
FIG. 44 is a screen shot illustrating sending an email from a third party email client to the case management system.
Figure 45B:
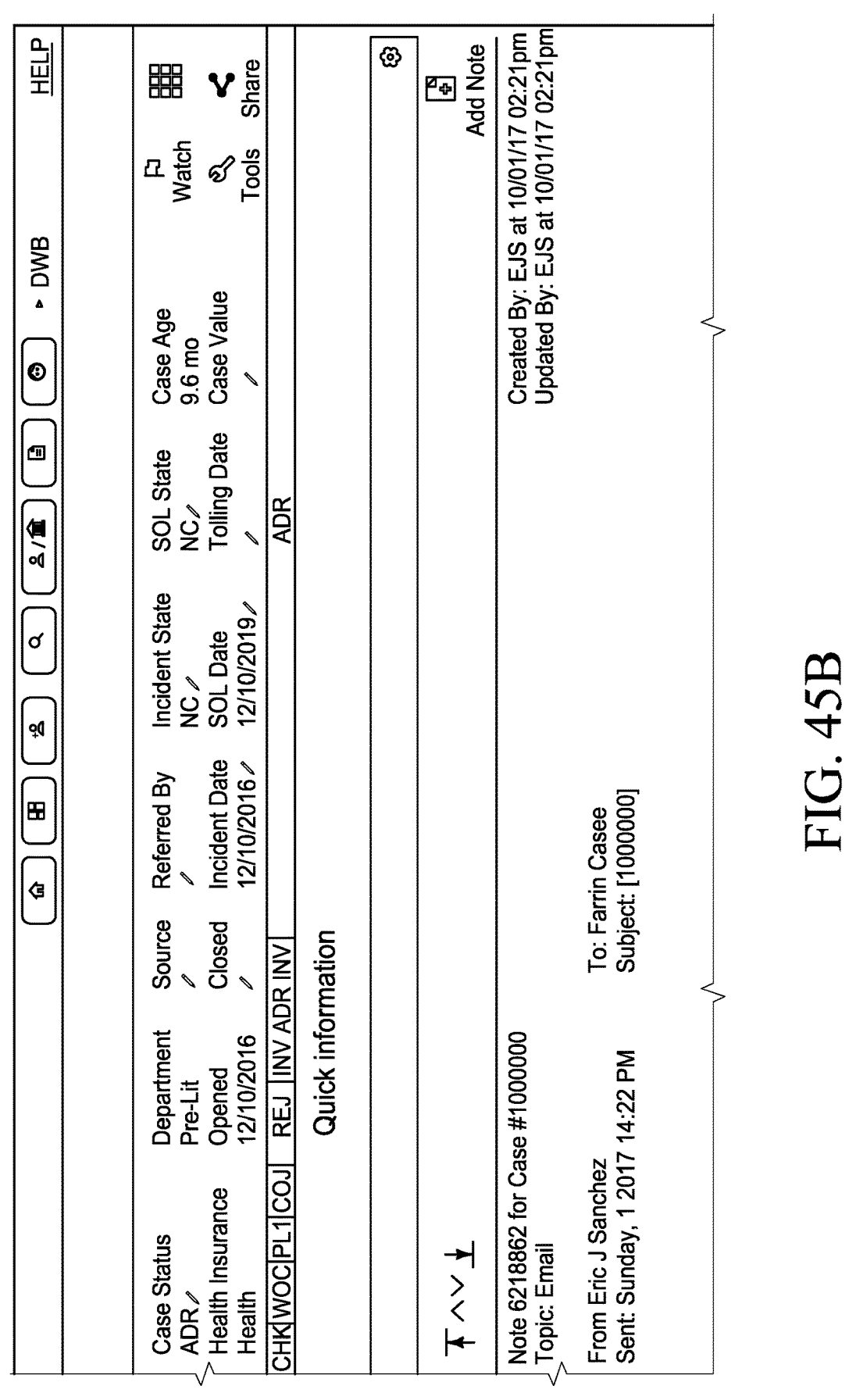
Figure 45D:
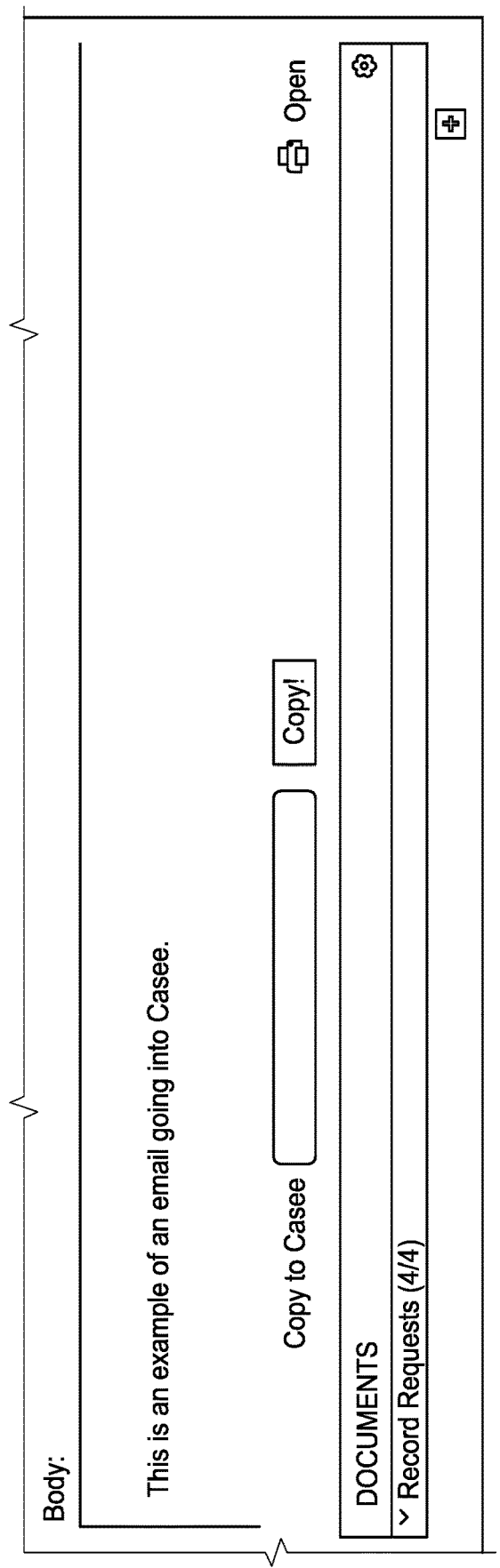

Some embodiments of the system 10 provide (see FIG. 44) widgets or add-ons (including command menu items) to email clients application interfaces 1300 that add menu items or buttons, e.g., 1304 to allow a user to send an email directly to the notes area for a specific case or matter (see FIG. 45A-45D) in the case management system 1704 using an email client external of the case management system 1704. In some embodiments, when the user actuates a button 1304, while composing an email, the user is prompted for a case number in a screen area or (e.g., pop-up) window 1306. After typing the case number into a text area 1308 and clicking on an OK button 1310 (or hitting an enter key on the user's keyboard), the external email becomes a note (described above) of the case management system 1704 and is shown as a new row 1312 in the list of the area 1056. The screen area 1306 also includes a cancel button 1314 for cancelling the email. The email is also stored as a sent item in the email client application. It is also possible to right click on a message from the email client, such as from an inbox or from a list of sent email items, which brings up a command menu containing a menu option to send an email to the case management system 1704. When this menu option is selected, the window or screen area 1306 pops up or appears having the text box 1308 into which a case number or identifier can be entered. The sent message is then sent to the case management system 1704 and becomes a new note shown in the top row in FIGS. 45A, 45B, 45C, and 45D. A preview 1314 of the new note is shown in a preview area in FIGS. 45B and 45D.

Figure 46:
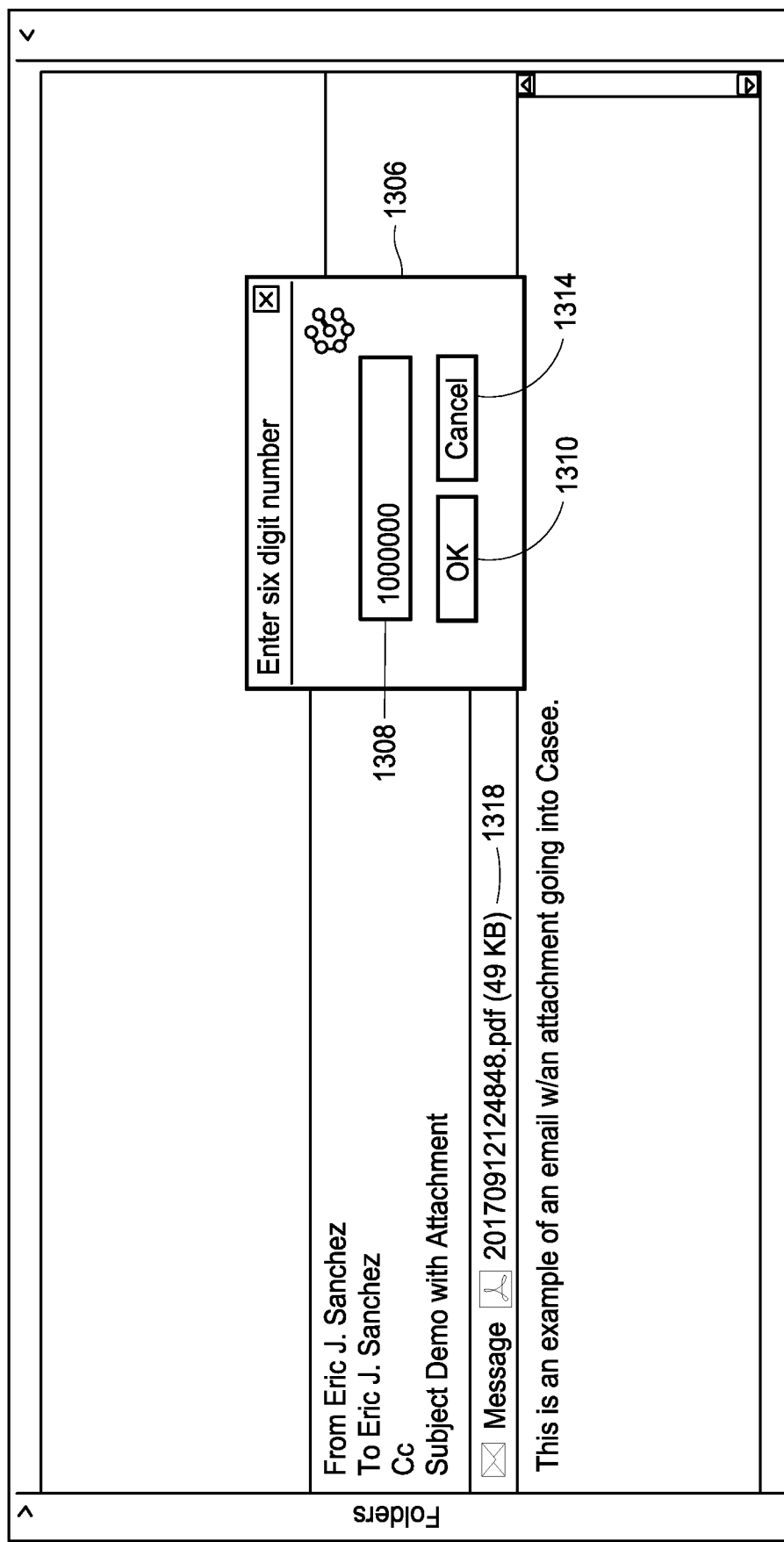
Figure 47B:
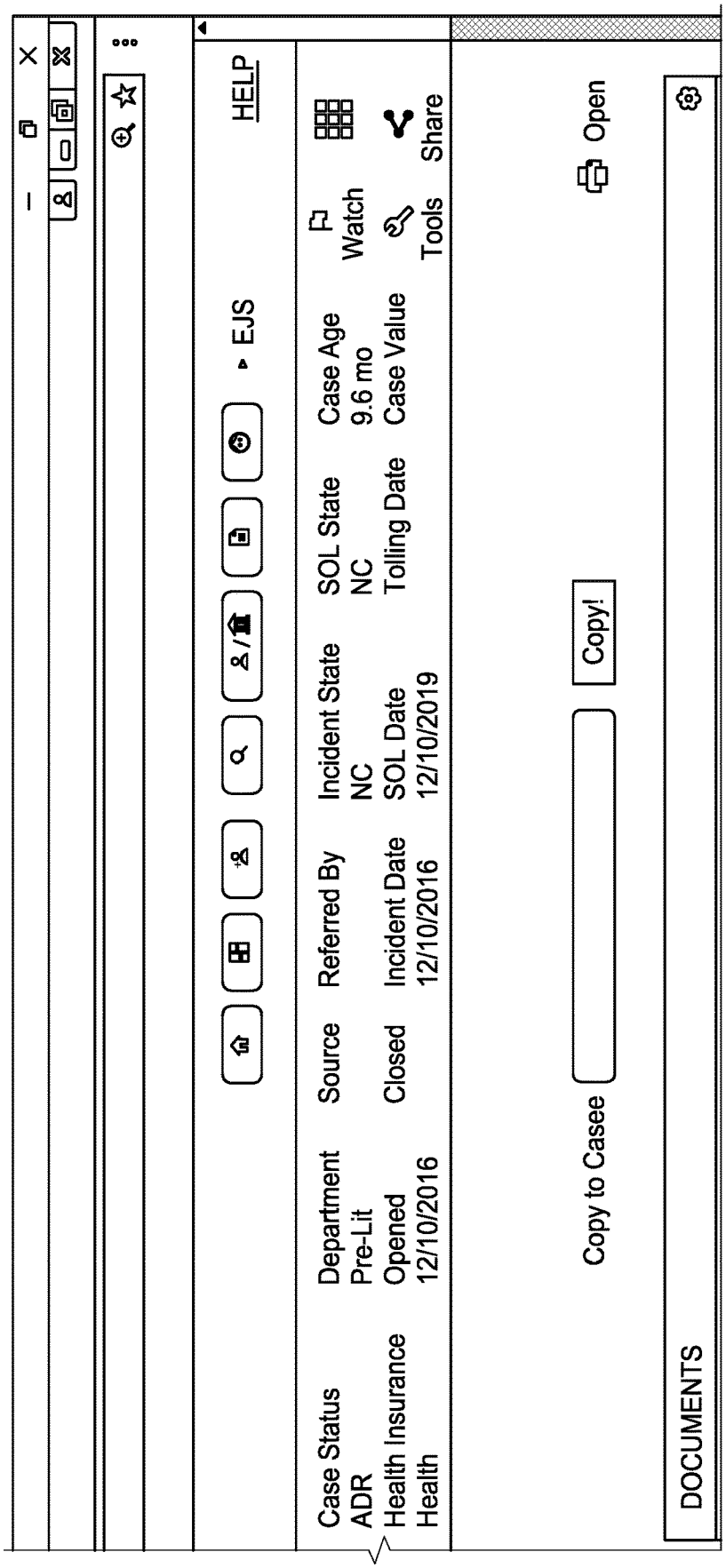

FIG. 46 shows a user interface from an external email client using with an email is being composed that includes an attachment. FIGS. 47A, 47B, 47C, and 47D show a screen 1350 from the case management system 1704. When an external email that is sent to the case management system 1704 includes an attachment 1318, the system 1704 automatically saves the attachment in (and the attachment is later available from) a files area 1320 of the case management system 1704 containing files for each case, separate from the notes. Files in the files area 1320 can be organized based on labels or tags. The system 1704 provides filter buttons in the documents area of the user interface that allow certain documents to be shown to the exclusion of other documents. The user interface shown in FIGS. 47A, 47B, 47C, and 47D includes filter buttons 1324-1329 that allow a user to change the items shown in the area 1320 by filtering based on labels associated with the files by clicking on the desired filter buttons. The filtered files are shown in a list 1322 in the files area. The list 1322 includes rows 1352-1357, each row representing a different document. Each file row includes, in the illustrated embodiment, a column 1334 for a file name, a column 1336 for a category, a column 1338 for initials for the creator of the file, and a column 1340 for a creation date. The row 1352 indicates that the attachment from FIG. 46 has been received into the case area for the case whose file number was indicated in text box 1308 of FIG. 46.

The rows 1352-1357 define hyperlinks in the illustrated embodiments. Clicking on a row 1352-1357, in the illustrated embodiment, brings up a preview of the file or additional commands in the same area 1320, such as in an area immediately below the row describing the file. Clicking on the preview or on a link in the preview area 1360 results in the file being launched in a viewer (e.g., a Chrome viewer or plug-in) or an application appropriate for the file type. In other embodiments, or for certain file types, clicking on a row 1352-1357 for a file launches a viewer or application that opens the file.

Email messages can also be sent directly from the case management system 1704. FIGS. 48A and 48B show a user interface screen 1400 for a case or matter whose case number is shown in area 1402. The screen 1400 includes a share button 1404 which, if clicked by a user, brings up a menu or screen area with a plurality of share option elements including a print button 1406, an external email button 1408 (e.g., for sending email externally from the case management system 1704), an intake button 1410 for bringing up a client intake screening questionnaire as described above, such as the one shown in FIG. 7 for example, and an internal email button 1412 (e.g., for sending an email within the case management system 1704 to another user of the case management system 1704 or to a specific case or matter. Other buttons or screen areas for launching an email could be employed. After the button 1408 is clicked, a compose email screen or screen area 1420 pops up or is displayed (see FIGS. 49A and 49B).

The screen area 1420 displays at 1422 an indication of the case number from which the email originates, and has a text box 1424 in which the sender's email address is pre-filled and can be changed. By default, the attorney responsible for the case is pre-filled as the sender, in some embodiments. The screen area 1420 also has a text box 1426 in which the addressee's initials or email address can be typed. Initials are resolved into an email address for users of the case management system, in some embodiments. Multiple addressees can be provided by separating their addresses or initials with a space or comma. The screen area 1420 also has text boxes 1428 and 1430 for closed copying and blind closed copying additional recipients. The screen area 1420 further has a text box 1432 for a subject. In some embodiments, the case number for the case from which the email was launched is indicated in the subject text box 1432 (e.g., the case number is prefilled in part 1434 of the subject text box 1432). More particularly, in the illustrated embodiments, the case number is surrounded by predetermined special characters such as square brackets when prefilled in the subject text box 1432. The subject text box 1432 can be edited by the user, if desired, such as to add more information.

The screen area 1420 further includes an email body area 1436 for the body of the email. In the illustrated embodiments, the email body area 1436 contains a hyperlink 1438 to the case. The recipient can use the hyperlink 1438 to access the case in the case management system 1704 if they are an authenticated user (e.g., they have credentials that allow them to access the case management system 1704 and are either logged in or able to log in). The hyperlink 1438 takes them directly to the area for the case such as to the screen 1400. The body area 1436 can be edited by the user, if desired, such as to add more information or otherwise change the text. In the illustrated embodiments, the screen area 1420 further includes a list 1440 of files available in the files area of a case, that can be attached to an email. In the illustrated embodiment, a user can select which of the files the user wants to attach, such as by checking checkboxes; e.g., 1442 or by using other selection devices provided in the user interface. The screen area 1420 also includes a send button 1446 which, if clicked by a user, causes the email and its file attachments to be sent. The screen area 1420 also includes a cancel button 1448 which, if clicked by a user, cancels the email.

FIGS. 50A and 50B show a user interface screen 1500 from the external email client showing an email 1502 received from the client management system and including an attachment that was selected by checking checkboxes. The email was sent from the client management system using a screen such as the screen 1420 and has an attachment 1446 that was sent in FIGS. 49A and 49B. The subject line 1424 of the email includes the case number of the case from which the email was sent, using the case management system 1704. More particularly, the subject 1424 of the email includes the prefilled part 1434 of the subject text box 1432 unless it was changed by the user. The email also includes, in its body, the hyperlink 1438, in some embodiments. Clicking on the hyperlink 1438 brings up the case in the case management system. The attachment or attachments selected using checkboxes such as the checkboxes 1442 and 1444 are attached. Only one attachment is shown in screen area 1446.

FIGS. 51A, 51B, 51C, and 51D show a user interface screen 1550 for the case or matter whose case number is shown in area 1552. The case is the same as the case from which the email was sent in FIGS. 50A and 50B. The sent email 1502 is shown in the notes section 1554 for the case and a preview of the email 1502 is shown in the preview area 1556.

FIG. 52 is a flowchart illustrating a method 1600 of using an email client external of the system 10 to send an email to the case management system 1704.

In 1602, the system 10 receives an email from an external email client.

In 1604, the system 10 makes a determination as to whether or not the email is a system inbound email. To be a system inbound email, it would have to be addressed to the predefined system email address (e.g., CMS@InnovativeCMS.com). If so, the system proceeds to 1608. If not, the system proceeds to 1606.

In 1606, the system 10 rejects the email. In various embodiments, no rejection reply is sent in case the sender is a spammer and receiving a reply may validate that they have reached an active email address. In some embodiments, 1604 and 1606 are performed by the email server 1702 of the system 10 (see FIG. 53), which may be an Exchange server.

In 1608, the system 10 makes a determination as to whether the email is being sent from an approved domain. Domains of known users are whitelisted by an administration, in various embodiments. If so, the system proceeds to 1610. If not, the system proceeds to 1606 where the email is rejected.

In 1610, the system 10 makes a determination as to whether the email contains a valid case number in its subject line (e.g., enclosed with special characters such as brackets, in some embodiments). If so, the system proceeds to 1612. If not, the system proceeds to 1606 where the email is rejected. In some embodiments, 1610 is performed by the email server 1702 of the system 10 (see FIG. 53), which may be an Exchange server.

In 1612, the system 10 routes the email to the notes section of the case whose case number is indicated in the subject line and, if there are attachments, the attachments are renamed (in some embodiments, such as to use a standardized naming convention) and are added to the case. In some embodiments, but not all, in 1612 a reminder is created for the primary professional responsible for that case. In some embodiments, 1612 is performed by the system 1704.

FIG. 53 is a hardware block diagram showing the case management system 1704 and the email server 1702. The email server 1702 can be an Exchange server, for example, and includes a processor (or multiple processors or multiple cores) 1710, a network adapter 1712 for coupling the server 1702 to the network 20 (e.g., to the Internet), and a memory 1714 which, among other things, stores emails.

The case management system 1704 uses the processor 30, network adapter 32, and memory 33 described previously. In various embodiments, the memory 33 includes a database (e.g., 40) that stores, for each case, a case number 1714, notes 1708, dashboards 1709, documents 1320, and checklists 1706 as described above, as well as client information 1720, reminders 1722, ledger entries 1724 (e.g., payments and receipts for a case such as payments to medical providers or payments from insurance companies), litigation information 1726, settlement administration information 1728, incident information 1730, coverage information 1732 (e.g., insurance company coverage), involvement information 1734, and related case information 1736. The database also includes buzzwords 1740-1743 and, for each buzzword, an associated description 1750-1753, and an associated hyperlink 1760-1763.

While various specific graphical user elements have been shown and described, just as pull down menus, buttons, hyperlinks, text boxes, checkboxes, etc., other types of graphical user interface elements that perform similar functions could be employed.

While certain functions are illustrated as being performed in certain blocks, it should be understood that various functions may be performed in other blocks or in a combination of blocks. The blocks do not necessarily correspond to software functions or routines, to integrated circuits or to circuit blocks. Multiple blocks may be defined by a single function, routine or integrated circuit or a single block may be defined by multiple functions, routines or integrated circuits.

While some embodiments disclosed herein are implemented in software, alternative embodiments comprise hardware, such as hardware including digital logic circuitry. Still other embodiments are implemented in a combination of software and digital logic circuitry.

Various embodiments comprise a computer-usable or computer-readable medium, such as a hard drive, solid state memory, flash drive, floppy disk, CD (read-only or rewritable), DVD (read-only or rewritable), tape, optical disk, floptical disk, RAM, ROM (or any other medium capable of storing program code excluding a carrier wave or propagation signal) bearing computer program code which, when executed by a computer or processor, or distributed processing system, performs various of the functions described above.

Some embodiments provide a carrier wave or propagation signal embodying such computer program code for transfer of such code over a network or from one device to another. The term "non-transitory," if used in the claims, is meant to exclude only such a carrier wave or propagation signal. In compliance with the patent laws, the subject matter disclosed herein has been described in language more or less specific as to structural and methodical features.

However, the scope of protection sought is to be limited only by the following claims, given their broadest possible interpretations. The claims are not to be limited by the specific features shown and described, as the description above only discloses example embodiments.

We claim:

1. A system comprising:
   a server having a system email address for receiving emails for multiple users and the server including:
      a processor; and
      a memory coupled to the processor and defining a database organized to store data for respective matters having matter numbers, the database including a notes location associated with each matter, and the database including, for respective matters, a files location for storing files other than notes;
   the system being configured to provide a graphical user interface to a workstation using which a user can review information relating to matters, including notes, the system being further configured, in response to receiving an email having a subject line and body, to determine whether the email is from a whitelisted domain and, if not, reject the email, and if the email is not rejected, the system being configured to route at least a portion of the non-rejected email to the notes location of the matter having the matter number that matches the number contained in the email subject line, wherein a user can access the non-rejected email pertaining to a matter from a screen showing notes for the matter; and
   a workstation including a display screen configured to show the graphical user interface.

2. A system in accordance with claim 1 wherein, in response to receiving an email having an attachment, if the email is not rejected, the system is further configured to rename the attachment.

3. A system in accordance with claim 1 wherein, in response to receiving an email having an attachment, if the email is not rejected, the system is further configured to rename the attachment and add the attachment to the files location of the matter having the matter number that matches the number contained in the subject line.

4. A system in accordance with claim 1 wherein the server is configured to determine if the email subject line contains a matter number matching a database matter number and, if not, reject the email.

5. A system in accordance with claim 1 wherein for respective matters the database further includes fields for a client's date of birth, language spoken, insurance company, incident state, and incident date.

6. A system in accordance with claim 1 wherein the database includes fields, for respective notes, for a note number, a user-selectable note type, an author identifier, and a body.

7. A method comprising:
   providing a server having a system email address for receiving emails for multiple users, and the server including a processor and a memory coupled to the processor and defining a database organized to store data for a plurality of customer matters, respective matters having matter numbers, and, for each matter, the database including a notes location associated with the matter, and the database including, for respective matters, a files location for storing files other than notes;

providing, using a workstation, a graphical user interface using which a user can review information relating to matters, including notes;

determining, in response to receiving an email having a subject line and body, whether the email is from an approved domain and, if not, rejecting the email;

determining if the email subject line contains a matter number matching a database matter number and, if not, rejecting the email; and if the email is not rejected, routing at least a portion of the non-rejected email to the notes location of the matter having the matter number that corresponds to the number contained in the email subject line, wherein a user can access the non-rejected email pertaining to a matter directly from a screen showing notes for the matter.

8. A method in accordance with claim 7 and further comprising, in response to receiving an email having an attachment, if the email is not rejected, renaming the attachment.

9. A method in accordance with claim 7, the method further comprising, in response to receiving an email having an attachment, if the email is not rejected, renaming the attachment and adding the attachment to the files location of the matter having the matter number that corresponds to the number contained in the subject line.

10. A method in accordance with claim 7 and further comprising determining, using the server, whether the email is addressed to a system email address for the server and, if not, rejecting the email.

11. A method in accordance with claim 7 and further comprising determining, using the server, if the email subject line contains a matter number corresponding to a database matter number and, if not, rejecting the email.

12. A method in accordance with claim 7 wherein for respective matters the database further includes customer relationship management fields.

13. A method in accordance with claim 7 wherein for respective matters the database further includes law firm case management fields including fields for a customer's date of birth, insurance company, incident location, and incident date.

14. A method in accordance with claim 7 wherein the database includes fields, for respective notes, for a note number, an author identifier, and a body.

15. A method in accordance with claim 7 and further including preapproving a plurality of domains including the approved domain prior to determining whether the email is from the approved domain.

16. A system comprising:
a server having a system email address for receiving emails for multiple users, the server including:
a processor; and
a memory coupled to the processor and defining a database organized to store data for respective matters having matter numbers, the database including a notes location associated with each matter, and the database further includes a files location associated with respective matters for storing files other than notes;
the system being configured to provide a graphical user interface to a workstation using which a user can review information relating to matters, including notes, the system being further configured, in response to receiving an email, to determine whether the email is from a whitelisted domain and, if not, reject the email, and if the email is not rejected, the system being configured to route at least a portion of the non-rejected email to the notes location of one of the matters, wherein a user can access the non-rejected email pertaining to a matter from a screen showing notes for the matter; and
a workstation including a display screen configured to show the graphical user interface.

17. A system in accordance with claim 16 wherein the server determines whether the email is addressed to a system email address for the server and, if not, rejects the email.

18. A system in accordance with claim 16 wherein the server determines if the email subject line contains a matter number matching a database matter number and, if not, rejects the email.

19. A system in accordance with claim 16 wherein for respective matters the database further includes fields for a client's date of birth, insurance company, incident state, and incident date.

20. A system in accordance with claim 16 wherein the database includes fields, for respective notes, for a note number, a user-selectable note type, an author identifier, and a body.

\* \* \* \* \*